(12) United States Patent
Sasagawa et al.

(10) Patent No.: US 6,852,806 B2
(45) Date of Patent: Feb. 8, 2005

(54) HYDROGENATED COPOLYMER

(75) Inventors: Masahiro Sasagawa, Yokohama (JP);
Shigeki Takayama, Tokyo (JP);
Shigeru Sasaki, Yokohama (JP);
Takahiro Hisasue, Yokohama (JP);
Katsumi Suzuki, Kawasaki (JP);
Shigeo Nakajima, Fujisawa (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 71 days.

(21) Appl. No.: 10/432,194

(22) PCT Filed: Oct. 23, 2002

(86) PCT No.: PCT/JP02/10973
§ 371 (c)(1),
(2), (4) Date: May 20, 2003

(87) PCT Pub. No.: WO03/035705
PCT Pub. Date: May 1, 2003

(65) Prior Publication Data
US 2004/0039128 A1 Feb. 26, 2004

(30) Foreign Application Priority Data

Oct. 23, 2001 (JP) ........................................ 2001-325476
Mar. 1, 2002 (JP) ........................................ 2002-055388
Jun. 28, 2002 (JP) ........................................ 2002-189562
Jul. 15, 2002 (JP) ........................................ 2002-205350

(51) Int. Cl.⁷ ................................................. C08F 8/04
(52) U.S. Cl. ...................... 525/332.9; 525/98; 525/314; 525/338; 521/148; 428/500
(58) Field of Search ...................... 525/98, 314, 332.9, 525/338; 521/148; 428/500

(56) References Cited

U.S. PATENT DOCUMENTS

| 4,226,952 | A | | 10/1980 | Halasa et al. |
|---|---|---|---|---|
| 4,501,857 | A | * | 2/1985 | Kishimoto et al. ......... 525/338 |
| 4,673,714 | A | | 6/1987 | Kishimoto et al. |
| 5,109,069 | A | | 4/1992 | Shibata et al. |
| 5,331,058 | A | | 7/1994 | Shepherd et al. |
| 5,527,753 | A | | 6/1996 | Engel et al. |
| 5,702,810 | A | | 12/1997 | Koseki et al. |
| 5,708,092 | A | | 1/1998 | Schwindeman et al. |

FOREIGN PATENT DOCUMENTS

| JP | 42-8704 | | 4/1967 |
|---|---|---|---|
| JP | 3-185058 | A | 8/1991 |
| JP | 3-188114 | A | 8/1991 |
| JP | 6-287365 | A | 10/1994 |
| JP | 6-287229 | A | 11/1994 |
| JP | 8-109219 | A | 4/1996 |
| JP | 2000-297183 | A | 10/2000 |
| WO | WO98/12240 | A1 | 3/1998 |

* cited by examiner

*Primary Examiner*—Fred Teskin
(74) *Attorney, Agent, or Firm*—Birch, Stewart, Kolasch & Birch, LLP

(57) ABSTRACT

Disclosed is a hydrogenated copolymer obtained by hydrogenating an unhydrogenated copolymer comprising conjugated diene monomer units and vinyl aromatic monomer units, the unhydrogenated copolymer having at least one polymer block (H) of vinyl aromatic monomer units, wherein the hydrogenated copolymer has the following characteristics (1) to (5): (1) a content of the vinyl aromatic monomer units of from more than 60% by weight to less than 90% by weight, based on the weight of the hydrogenated copolymer; (2) a content of the polymer block (H) of from 1 to 40% by weight, based on the weight of the unhydrogenated copolymer; (3) a weight average molecular weight of from more than 100,000 to 1,000,000; (4) a hydrogenation ratio of 85% or more, as measured with respect to the double bonds in the conjugated diene monomer units; and (5) substantially no crystallization peak observed at −50 to 100° C. in a differential scanning calorimetry (DSC) chart obtained with respect to the hydrogenated copolymer.

16 Claims, 4 Drawing Sheets

HYDROGENATED COPOLYMER

This application is the national phase under 35 U.S.C. §371 of PCT International Application No. PCT/JP02/10973 which has an International filing date of Oct. 23, 2002, which designated the United States of America.

BACKGROUND OF THE INVENTION

1. Field of the Invention

The present invention relates to a hydrogenated copolymer. More particularly, the present invention is concerned with a hydrogenated copolymer obtained by hydrogenating an unhydrogenated copolymer comprising conjugated diene monomer units and vinyl aromatic monomer units, the unhydrogenated copolymer having at least one polymer block (H) of vinyl aromatic monomer units, wherein the content of the vinyl aromatic monomer units, content of the polymer block (H), weight average molecular weight, and hydrogenation ratio (as measured with respect to the double bonds in the conjugated diene monomer units) of the hydrogenated copolymer are, respectively, within specific ranges, and substantially no crystallization peak is observed at −50 to 100° C. in a differential scanning calorimetry (DSC) chart obtained with respect to the hydrogenated copolymer. The hydrogenated copolymer of the present invention not only has excellent flexibility, impact resilience and scratch resistance, but also has excellent handling property (antiblocking property). The "anti-blocking property" means a resistance to adhesion phenomena (which is generally referred to as "blocking") wherein when, for example, stacked resin shaped articles or a rolled resin film (which have or has resin surfaces which are in contact with each other) are or is stored for a long time, unfavorably strong adhesion occurs between the resin surfaces, so that it becomes difficult to separate the resin surfaces from each other. Further, the present invention also relates to a hydrogenated copolymer composition comprising the above-mentioned hydrogenated copolymer (a), and at least one polymer (b) selected from the group consisting of a thermoplastic resin other than the hydrogenated copolymer (a) and a rubbery polymer other than the hydrogenated copolymer (a). The hydrogenated copolymer composition comprising the excellent hydrogenated copolymer of the present invention exhibits excellent properties, such as high impact resistance, moldability and abrasion resistance. Each of the hydrogenated copolymer and hydrogenated copolymer composition of the present invention can be advantageously used as a foam, various shaped articles, a building material, a vibration damping, soundproofing material, an electric wire coating material and the like.

2. Prior Art

A copolymer comprising a conjugated diene and a vinyl aromatic hydrocarbon (hereinafter, frequently referred to as a "conjugated diene/vinyl aromatic hydrocarbon copolymer") has unsaturated double bonds, so that such a copolymer have poor thermal stability, weatherability and ozone resistance. As a method for improving these properties of the conjugated diene/vinyl aromatic hydrocarbon copolymer, there has long been known a method in which the unsaturated double bonds of the copolymer are hydrogenated. Such a method is disclosed in, for example, Unexamined Japanese Patent Application Laid-Open Specification No. Sho 56-30447 and Unexamined Japanese Patent Application Laid-Open Specification No. Hei 2-36244.

On the other hand, a hydrogenation product of a conjugated diene/vinyl aromatic hydrocarbon block copolymer exhibits, even if not vulcanized, not only excellent elasticity at room temperature, which is comparable to that of a conventional vulcanized natural or synthetic rubber, but also excellent processibility at high temperatures, which is comparable to that of a conventional thermoplactic resin. Therefore, the hydrogenated block copolymer is widely used in various fields, such as modifiers for plastics, adhesive agents, automobile parts, and parts for medical equipment. In recent years, it has been attempted to obtain a random copolymer of a conjugated diene and a vinyl aromatic hydrocarbon, which has characteristics similar to those of the hydrogenated block copolymer as mentioned above.

For example, Unexamined Japanese Patent Application Laid-Open Specification No. Hei 2-158643 (corresponding to U.S. Pat. No. 5,109,069) discloses a composition containing a hydrogenated diene copolymer and a polypropylene resin, wherein the hydrogenated diene copolymer is obtained by hydrogenating a random copolymer of a conjugated diene and a vinyl aromatic hydrocarbon, which random copolymer has a vinyl aromatic hydrocarbon content of 3 to 50% by weight, a molecular weight distribution (weight average molecular weight (Mw)/number average molecular weight (Mn)) of 10 or less, and a vinyl bond content of 10 to 90% as measured with respect to the conjugated diene monomer units in the copolymer. Further, Unexamined Japanese Panent Application Laid-Open Specification No. Hei 6-287365 discloses a composition containing a hydrogenated diene copolymer and a polypropylene resin, wherein the hydrogenated diene polymer is obtained by hydrogenating a random copolymer of a conjugated diene and a vinyl aromatic hydrocarbon, which random copolymer has a vinyl aromatic hydrocarbon content of 5 to 60% by weight, and a vinyl bond content of 60% or more as measured with respect to the conjugated diene monomer units in the copolymer.

With respect to the above-mentioned hydrogenated diene copolymers, it has been attempted to use the copolymers as substitutes for a flexible vinyl chloride resin. The flexible vinyl chloride resin causes environmental problems, such as generation of halogen gas when the resin is on fire, and generation of enrivonmental hormones due to the plasticizer used in the resin. Therefore, there is a pressing need for development of a substitute material for the flexible vinyl chloride resin. However, the above-mentioned hydrogenated diene copolymers are unsatisfactory with resepct to the properies (such as impact resilience, and scratch resistance) which are needed for a material used as a substitute for the flexible vinyl chloride resin.

Further, with respect to molding materials containing the above-mentioned hydrogenated diene copolymer in combination with vairous theremoplastic resins or rubbers, it has been desired to improve the mechanical strength and moldability of the hydrogenated diene copolymer.

WO98/12240 discloses a molding material composed mainly of, as a polymer similar to the vinyl chloride resin, a hydrogenated block copolymer comprising a polymer block composed mainly of styrene and a polymer block composed mainly of butadiene and styrene. Further, Unexamined Japanese Patent Application Laid-Open Specification No. Hei 3-185058 discloses a resin composition comprising a polyphenylene ether resin, a polyolefin resin, and a hydrogenation product of a vinyl aromatic hydrocarbon/conjugated diene copolymer, wherein the same hydrogenated block copolymer as used in the above-mentioned WO98/12240 is used as the hydrogenation product of a vinyl aromatic hydrocarbon/conjugated diene copolymer. However, the hydrogenated copolymer used in each of the above-mentioned patent documents is a crystalline polymer and, hence, has poor flexibility and is not suitable for use as a substitute for the flexible vinyl chloride resin.

Thus, although there has been a pressing need for development of a substitute material for the flexible vinyl chloride resin, a material having excellent properties (such as flexibility and scratch resistance) which are comparable to those of the flexible vinyl chloride resin has not yet been obtained.

SUMMARY OF THE INVENTION

In this situation, the present inventors have made extensive and intensive studies with a view toward solving the above-mentioned problems accompanying the prior art. As a result, it has unexpectedly been found that the above-menitoned problem can be solved by a hydrogenated copolymer obtained by hydrogenating an unhydrogenated copolymer comprising conjugated diene monomer units and vinyl aromatic monomer units, the unhydrogenated copolymer having at least one polymer block (H) of vinyl aromatic monomer units, wherein the content of the vinyl aromatic monomer units, content of the polymer block (H), weight average molecular weight and hydrogenation ratio (as measured with respect to the double bonds in the conjugated diene monomer units) of the hydrogenated copolymer are, respectively, within specific ranges, and substantially no crystallization peak is observed at −50 to 100° C. in a differential scanning calorimetry (DSC) chart obtained with respect to the hydrogenated copolymer.

Accordingly, it is an object of the present invention to provide a hydrogenated copolymer which not only has excellent flexibility, impact resilience and scratch resistance, but also has excellent handling property (anti-blocking property).

It is another object of the present invention to provide a hydrogenated copolymer composition obtained by blending the above-mentioned hydrogenated copolymer with a thermoplastic resin and/or rubbery polymer which are/is other than the hydrogenated copolymer, which composition has excellent properties, such as high impact resistance, tensile strength, moldability and abrasion resistance.

The foregoing and other objects, features and advantages of the present invention will be apparent from the following detailed description and appended claims taken in connection with the accompanying drawing.

BRIEF DESCRIPTION OF THE DRAWINGS

In the drawings:

FIG. 2(*b*) is an explanatroy diagrammatic side view of the powder feeding box of FIG. 2(*a*);

FIG. 2(*c*) is an explanatroy diagrammatic view of the powder feeding box of FIG. 2(*a*) as viewed from above the powder feeding box;

FIG. 2(*d*) is an explanatory diagrammatic side view of the powder feeding box of FIG. 2(*a*) which contains a powder of the hydrogenated copolymer composition, and which has attached thereto an electroformed nickel mold having a granulated inner surface, shown with a partly broken wall of the box in order to show the interior of the box.

DESCRIPTION OF REFERENCE NUMERALS

Figure 1:
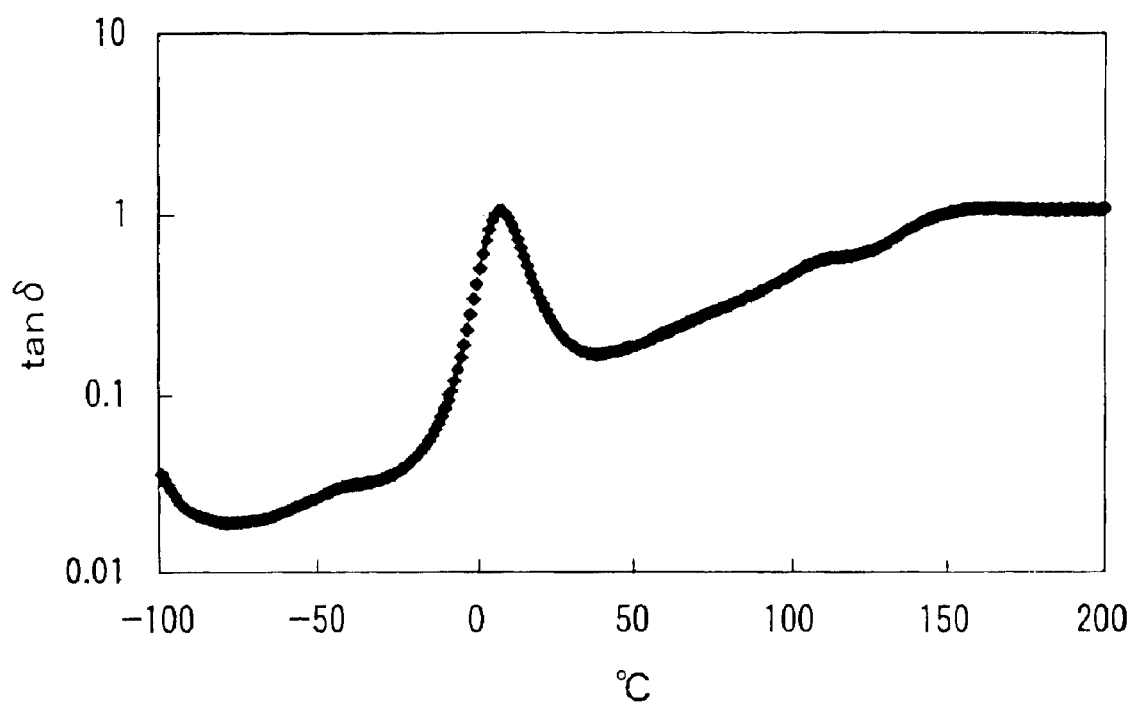
FIG. 1 is a chart showing a dynamic viscoelastic spectrum of the composition obtained in Example 18.

1. Single-shaft rotation handle
2. Revolution shaft
3. Powder feeding box
4. Electroformed nickel mold having a granulated inner surface
5. Hydrogenated copolymer composition powder
6. Flat portion of the powder slush molded article
7. Undercut portion of the powder slush molded article

DETAILED DESCRIPTION OF THE INVENTION

In one aspect of the present invention, there is provided a hydrogenated copolymer obtained by hydrogenating an unhydrogenated copolymer comprising conjugated diene monomer units and vinyl aromatic monomer units, the unhydrogenated copolymer having at least one polymer block (H) of vinyl aromatic monomer units, the hydrogenated copolymer having the following characteristics (1) to (5):

(1) a content of the vinyl aromatic monomer units of from more than 60% by weight to less than 90% by weight, based on the weight of the hydrogenated copolymer, (2) a content of the polymer block (H) of from 1 to 40% by weight, based on the weight of the unhydrogenated copolymer, (3) a weight average molecular weight of from more than 100,000 to 1,000,000, (4) a hydrogenation ratio of 85% or more, as measured with respect to the double bonds in the conjugated diene monomer units, and (5) substantially no crystallization peak observed at −50 to 100° C. in a differential scanning calorimetry (DSC) chart obtained with respect to the hydrogenated copolymer.

For easy understanding of the present invention, the essential features and various preferred embodiments of the present invention are enumerated below.

1. A hydrogenated copolymer obtained by hydrogenating an unhydrogenated copolymer comprising conjugated diene monomer units and vinyl aromatic monomer units, the unhydrogenated copolymer having at least one polymer block (H) of vinyl aromatic monomer units, the hydrogenated copolymer having the following characteristics (1) to (5):

(1) a content of the vinyl aromatic monomer units of from more than 60% by weight to less than 90% by weight, based on the weight of the hydrogenated copolymer, (2) a content of the polymer block (H) of from 1 to 40% by weight, based on the weight of the unhydrogenated copolymer, (3) a weight average molecular weight of from more than 100,000 to 1,000,000, (4) a hydrogenation ratio of 85% or more, as measured with respect to the double bonds in the conjugated diene monomer units, and (5) substantially no crystallization peak observed at −50 to 100° C. in a differential scanning calorimetry (DSC) chart obtained with respect to the hydrogenated copolymer.

2. The hydrogenated copolymer according to item 1 above, wherein the unhydrogenated copolymer is a block copolymer selected from the group consisting of block copolymers which are, respectively, represented by the following formulae:

$$S-H \tag{1},$$

$$S-H-S \tag{2},$$

$$(S-H)_m-X \tag{3}$$

and $$(S-H)_n-X-(H)_p \tag{4},$$

wherein each S independently represents a random copolymer block comprised of conjugated diene monomer units and vinyl aromatic monomer units, each H independently represents a polymer block of vinyl aromatic monomer units, each X independently represents a residue of a coupling agent, m represents an integer of 2 or more, and each of n and p independently represents an integer of 1 or more.

3. The hydrogenated copolymer according to item 2 above, wherein the unhydrogenated copolymer is a block copolymer represented by the formula (1).

4. The hydrogenated copolymer according to any one of items 1 to 3 above, which is a foam.

5. The hydrogenated copolymer according to any one of items 1 to 3 above, which is a shaped article.

6. The hydrogenated copolymer according to item 5 above, which is a multilayer film or a multilayer sheet.

7. The hydrogenated copolymer according to item 5 above, which is a shaped article produced by a method selected from the group consisting of an extrusion molding, an injection molding, a blow molding, air-pressure molding, a vacuum molding, a foam molding, a multilayer extrusion molding, a multilayer injection molding, a high frequency weld molding and a slush molding.

8. The hydrogenated copolymer according to any one of items 1 to 3 above, which is a building material, a vibration damping, soundproofing material or an electric wire coating material.

9. A crosslinked, hydrogenated copolymer obtained by subjecting the hydrogenated copolymer of any one of items 1 to 3 above to a crosslinking reaction in the presence of a vulcanizing agent.

10. A hydrogenated copolymer composition comprising:
1 to 99 parts by weight of the hydrogenated copolymer (a) of item 1 above, and
99 to 1 part by weight of at least one polymer (b) selected from the group consisting of a thermoplastic resin other than the hydrogenated copolymer (a) and a rubbery polymer other than the hydrogenated copolymer (a).

11. The hydrogenated copolymer composition according to item 10 above, which is a foam.

12. The hydrogenated copolymer composition according to item 10 above, which is a shaped article.

13. The hydrogenated copolymer composition according to item 12 above, which is a multilayer film or a multilayer sheet.

14. The hydrogenated copolymer composition according to item 12 above, which is a shaped article produced by a method selected from the group consisting of an extrusion molding, an injection molding, a blow molding, air-pressure molding, a vacuum molding, a foam molding, a multilayer extrusion molding, a multilayer injection molding, a high frequency weld molding and a slush molding.

15. The hydrogenated copolymer composition according to item 10 above, which is a building material, a vibration damping, soundproofing material or an electric wire coating material.

16. A crosslinked, hydrogenated copolymer composition obtained by subjecting the hydrogenated copolymer composition of item 10 above to a crosslinking reaction in the presence of a vulcanizing agent.

Hereinbelow, the present invention is described in detail.

In the present invention, the monomer units of the polymer are named in accordance with a nomenclature wherein the names of the original monomers from which the monomer units are derived are used with the term "unit" attached thereto. For example, the term "vinyl aromatic monomer unit" means a monomer unit which is formed in a polymer obtained by the polymerization of the vinyl aromatic monomer. The vinyl aromatic monomer unit has a molecular structure wherein the two carbon atoms of a substituted ethylene group derived from a substituted vinyl group respectively form linkages to adjacent vinyl aromatic monomer units. Similarly, the term "conjugated diene monomer unit" means a monomer unit which is formed in a polymer obtained by the polymerization of the conjugated diene monomer. The conjugated diene monomer unit has a molecular structure wherein the two carbon atoms of an olefin corresponding to the conjugated diene monomer respectively form linkages to adjacent conjugated diene monomer units.

The hydrogenated copolymer of the present invention is obtained by hydrogenating an unhydrogenated copolymer comprising conjugated diene monomer units and vinyl aromatic monomer units, and has at least one polymer block (H) of vinyl aromatic monomer units. The hydrogenated copolymer of the present invention has a content of the vinyl aromatic monomer units of from more than 60% by weight to less than 90% by weight, based on the weight of the hydrogenated copolymer. When the content of the vinyl aromatic monomer units is more than 60% by weight, the hydrogenated block copolymer exhibits excellent anti-blocking property (handling property) and scratch resistance. When the content of the vinyl aromatic monomer units is less than 90% by weight, the hydrogenated copolymer is advantageous not only in that it exhibits excellent flexibility and impact resilience, but also in that a resin composition containing such a hydrogenated copolymer exhibits excellent impact resistance. The content of the vinyl aromatic monomer units is preferably in the range of from 62 to 88% by weight, more preferably from 64 to 86% by weight, still more preferably from 65 to 80% by weight. The content of the vinyl aromatic monomer units can be measured by means of an ultraviolet spectrophotometer. In the present invention, the content of the vinyl aromatic monomers in the copolymer prior to the hydrogenation (i.e., unhydrogenated copolymer) may be used as the content of the vinyl aromatic monomer units in the hydrogenated copolymer of the present invention.

In the hydrogenated copolymer of the present invention, the content of the polymer block (H) of vinyl aromatic monomer units (hereinafter, frequently referred to as "vinyl aromatic polymer block (H)") is in the range of from 1 to 40% by weight, based on the weight of the unhydrogenated copolymer. When the content of the vinyl aromatic polymer block (H) is 1% by weight or more, the hydrogenated copolymer exhibits excellent anti-blocking property and impact resilience. When the content of the vinyl aromatic polymer block (H) is 40% by weight or less, the hydrogenated copolymer exhibits excellent scratch resistance. In the present invention, the content of the vinyl aromatic polymer block (H) is preferably in the range of from 5 to 35% by weight, more preferably from 10 to 30% by weight, still more preferably from 13 to 20% by weight. In the present invention, the content of the vinyl aromatic polymer block (H) can be measured by the following method. The weight of the vinyl aromatic polymer block (H) is obtained by a method in which the unhydrogenated copolymer is subjected to oxidative degradation in the presence of osmium tetraoxide as a catalyst using tert-butyl hydroperoxide (i.e., method described in I. M. KOLTHOFF, et al., J. Polym. Sci. 1, 429 (1946)) (hereinafter, frequently referred to as "osmium tetraoxide degradation method"). Using the obtained weight of the vinyl aromatic polymer block (H), the content of the vinyl aromatic polymer block (H) in the hydrogenated copolymer is calculated by the following formula, with the proviso that, among the polymer chains (formed by the oxidative degradation) corresponding to the vinyl aromatic polymer blocks (H), the polymer chains having an average polymerization degree of 30 or less are not taken into consideration in the measurement of the content of the vinyl aromatic polymer block (H).

Content of the vinyl aromatic polymer block (H) (% by weight)=(weight of the vinyl aromatic polymer block (H) in the copolymer prior to the hydrogenation/weight of the copolymer prior to the hydrogenation) ×100.

In the present invention, the vinyl aromatic polymer block (H) of the hydrogenated copolymer content can also be measured by a method using a nuclear magnetic resonance (NMR) apparatus (i.e., NMR method which is described in Y. Tanaka et al., "RUBBER CHEMISTRY and TECHNOLOGY 54", 685 (1981), published by American Chemical Society, Inc., U.S.A.). However, in the present invention, the vinyl aromatic polymer block (H) content measured by the above-mentioned osmium tetraoxide degradation method (which is simpler than the NMR method) is used as the vinyl aromatic polymer block (H) content of the hydrogenated copolymer. There is a correlation between the vinyl aromatic polymer block (H) content (hereinafter, referred to as an "Os value") obtained by the osmium tetraoxide degradation method and the vinyl aromatic polymer block (H) content (hereinafter, referred to as an "Ns value") obtained by the NMR method. More specifically, as a result of the studies made with respect to various copolymers having different contents of vinyl aromatic polymer block (H), it has been found that the above-mentioned correlation is represented by the following formula:

$$Os \text{ value} = -0.012(Ns \text{ value})^2 + 1.8(Ns \text{ value}) - 13.0$$

In the present invention, when the vinyl aromatic polymer block (H) content is obtained by the NMR method, the obtained Ns value is converted into the Os value, utilizing the above-mentioned formula representing the correlationship between the Os value and the Ns value.

The hydrogenated copolymer of the present invention has a weight average molecular weight of more than 100,000 and 1,000,000 or less. When the weight average molecular weight is more than 100,000, the hydrogenated copolymer exhibits excellent impact resilience and scratch resistance. When the weight average molecular weight is 1,000,000 or less, the hydrogenated copolymer exhibits excellent moldability. The weight average molecular weight of the hydrogenated copolymer is preferably in the range of from 130,000 to 800,000, more preferably from 150,000 to 500,000. The weight average molecular weight can be measured by gel permeation chromatography (GPC) using a calibration curve obtained using a chromatogram of standard polystyrene samples commercially available (the calibration curve is obtained by the use of the peak molecular weights of the standard polystyrene samples).

With respect to the molecular weight distribution of the hydrogenated copolymer, from the viewpoint of moldability thereof, the molecular weight distribution is preferably in the range of from 1.5 to 5.0, more preferably from 1.6 to 4.5, still more preferably from 1.8 to 4.0. The molecular weight distribution can also be obtained by GPC as in the case of the measurement of the weight average molecular weight, in terms of a ratio (Mw/Mn) of the weight average molecular weight (Mw) to the number average molecular weight (Mn).

In the hydrogenated copolymer of the present invention, the hydrogenation ratio is 85% or more, as measured with respect to the double bonds in the conjugated diene monomer units in the hydrogenated copolymer. Due to such a high hydrogenation ratio of the double bonds of the conjugated diene monomer units, the hydrogenated copolymer of the present invention exhibits excellent anti-blocking property and scratch resistance. In the present invention, the hydrogenation ratio is preferably 90% or more, more preferably 92% or more, still more preferably 95% or more. With respect to the copolymer (unhydrogenated copolymer) prior to the hydrogenation, the vinyl bond content of the conjugated diene monomer units can be measured by a method (Hampton method) using an infrared spectrometer. The hydrogenation ratio of the hydrogenated copolymer can be measured by means of a nuclear magnetic resonance (NMR) apparatus.

The hydrogenated copolymer of the present invention has a characteristic that substantially no crystallization peak is observed at −50 to 100° C. in a differential scanning calorimetry (DSC) chart obtained with respect to the hydrogenated copolymer. In the present invention, "substantially no crystallization peak is observed at −50 to 100° C." means that no peak indicating the occurrence of crystallization (i.e., crystallization peak) is observed within the above-mentioned temperature range, or that a crystallization peak is observed within the above-mentioned temperature range but the quantity of heat at the crystallization peak is less than 3 J/g, preferably less than 2 J/g, more preferably less than 1 J/g. In the present invention, it is most preferred that no crystallization peak is observed within the above-mentioned temperature range. When a hydrogenated copolymer has a crystallization peak within the above-mentioned temperature range, such a hydrogenated copolymer has markedly poor flexibility and, hence, is not suitable as a substitute material for a flexible vinyl chloride resin, which substitute material is aimed at in the present invention. The hydrogenated copolymer exhibiting substantially no crystallization peak at −50 to 100° C. can be obtained by the use of an unhydrogenated copolymer which is obtained by a polymerization reaction conducted using the below-described vinyl bond formation-controlling agent under the below-described conditions.

It is one of the characteristic features of the hydrogenated copolymer of the present invention that the hydrogenated copolymer exhibits excellent flexibility, so that the hydrogenated copolymer exhibits an advantageously low value with respect to the 100% modulus in a tensile test. It is recommended that the 100% modulus of the hydrogenated polymer of the present invention is 120 kg/cm² or less, preferably 90 kg/cm² or less, more preferably 60 kg/cm² or less.

With respect to the structure of the hydrogenated copolymer of the present invention, there is no particular limitation, and the hydrogenation copolymer may have any structure. However, as the unhydrogenated copolymer used in the present invention, it is preferred to use at least one block copolymer selected from the group consisting of block copolymers represented by the following formulae (1) to (4):

S—H (1),

S—H—S (2),

(S—H)$_m$—X (3) and

(S—H)$_n$—X—(H)$_p$ (4), wherein each S independently represents a random copolymer block comprised of conjugated diene monomer units and vinyl aromatic monomer units, each H independently represents a polymer block of vinyl aromatic monomer units, each X independently represents a residue of a coupling agent, m represents an integer of 2 or more, and each of n and p independently represents an integer of 1 or more.

From the viewpoint of productivity and flexibility of the hydrogenated copolymer, it is especially preferred to use the block copolymer of the above-mentioned formula (1).

In the present invention, the hydrogenated copolymer may be in the form of a mixture of hydrogenated products of at least two block copolymers selected from the group consisting of the above-mentioned block copolymer of formulae (1) to (4). Further, the hydrogenated copolymer of the present invention may be in the form of a mixture thereof with a vinyl aromatic polymer.

With respect to each of the block copolymers of the above formulae (1) to (4), there is no particular limitation with respect to the distribution of the vinyl aromatic monomer units in the random copolymer block S. For example, the vinyl aromatic monomer units may be uniformly distributed or may be distributed in a tapered configuration in the random copolymer block S. The random block copolymer S may have a plurality of segments in which the vinyl aromatic monomer units are uniformly distributed and/or may have a plurality of segments in which the vinyl aromatic monomer units are distributed in a tapered configuration. Further, the random copolymer block S may have a plurality of segments having different vinyl aromatic monomer unit contents. In the above-mentioned formula (3), m represents an integer of 2 or more, more preferably from 2 to 10. In the above-mentioned formula (4), each of n and p independently represents an integer of 1 or more, preferably from 1 to 10.

In the present invention, the conjugated diene monomer is a diolefin having a pair of conjugated double bonds. Examples of conjugated diene monomers include 1,3-butadiene, 2-methyl-1,3-butadiene (isoprene), 2,3-dimethyl-1,3-butadiene, 1,3-pentadiene, 2-methyl-1,3-pentadiene and 1,3-hexadiene. Of these, especially preferred are 1,3-butadiene and isoprene. The above conjugated diene monomer can be used individually or in combination. Examples of vinyl aromatic monomers include styrene, α-methylstyrene, p-methylstyrene, divinylbenzene, 1,1-diphenylethylene, N,N-dimethyl-p-aminoethylstyrene and N,N-diethyl-p-aminoethylstyrene. These vinyl aromatic monomers can be used individually or in combination.

In the present invention, the microstructure (including the amounts of a cis bond, a trans bond, and a vinyl bond) of the conjugated diene monomer units in the copolymer prior to the hydrogenation can be appropriately controlled by using the below-described polar compound and the like. When 1,3-butadiene (which is addition-polymerized through a cis-1,4 bond, a trans-1,4 bond or a 1,2-vinyl bond) is used as the conjugated diene monomer, it is generally recommended that the 1,2-vinyl bond content is in the range of from 5 to 80 mol % preferably from 10 to 60 mol %, still more preferably from 12 to 50 mol %, based on the total molar amount of the cis-1,4 bond, trans-1,4 bond and 1,2-vinyl bond. For obtaining a copolymer having excellent flexibility, it is preferred that the 1,2-vinyl bond content is 12 mol % or more. When isoprene is used as the conjugated diene monomer, it is generally recommended that the total content of the 1,2-vinyl bond and 3,4-vinyl bond is in the range of from 3 to 75 mol %, preferably from 5 to 60%, based on the total molar amount of the cis-1,4 bond, trans-1,4 bond, 1,2-vinyl bond and 3,4-vinyl bond. In the present invention, the total content of the 1,2-vinyl bond and 3,4-vinyl bond (or the content of the 1,2-vinyl bond in the case where 1,3-butadiene is used as the conjugated diene monomer) is defined as the vinyl bond content.

Further, in the present invention, from the viewpoint of the desired impact resilience of the hydrogenated copolymer, it is recommended that the difference between the maximum value and minimum value of the vinyl bond content of the unhydrogenated copolymer is 10 mol % or less, preferably 8 mol % or less, more preferably 6 mol % or less. The difference between the maximum value and minimum value of the vinyl bond content of the unhydrogenated copolymer can be obtained by the following method. For example, in the case where the production of the unhydrogenated copolymer is conducted in a batchwise manner in which monomers are stepwise fed to the reactor, a sample of the copolymer is taken just before each of the monomer feeding steps, and the vinyl bond content is measured with respect to each of the obtained samples. With respect to the obtained values of the vinyl bond content, the difference between the maximum value and the minimum value is calculated. In the unhydrogenated copolymer, the vinyl bonds may be uniformly distributed or may be distributed in a tapered configuration. The difference in the vinyl bond content between the above-mentioned samples is caused by the influence of polymerization conditions, such as the type and amount of the vinyl bond formation-controlling agent (such as a tertiary amine compound or an ether compound) and polymerization reaction temperature. Therefore, the difference between the maximum value and minimum value of the vinyl bond content of the unhydrogenated copolymer can be controlled by, for example, adjusting the polymerization reaction temperature. When the type and amount of the vinyl bond formation-controlling agent (such as a tertiary amine or an ether compound) are not changed during the polymerization reaction, the amount of the vinyl bonds formed in the resultant copolymer is influenced only by the polymerization reaction temperature. Therefore, in this case, when the polymerization reaction is conducted at a constant polymerization reaction temperature, the vinyl bonds are uniformly distributed in the resultant copolymer. On the other hand, when the polymerization is conducted while elevating the polymerization reaction temperature, the resultant copolymer has a non-uniform distribution with respect to the vinyl bonds, wherein a portion of the copolymer which is formed at an early stage of the polymerization (where the polymerization reaction temperature is low) has a high vinyl bond content and a portion of the copolymer which is formed at a late stage of the polymerization (where the polymerization reaction temperature is high) has a low vinyl bond content. Therefore, in the present invention, it is recommended that the change in the reaction temperature during the polymerization is suppressed as much as possible, and that, more specifically, the difference between the highest reaction temperature and the lowest reaction temperature is 20° C. or less, preferably 15° C. or less, more preferably 10° C. or less.

The copolymer prior to the hydrogenation (i.e., unhydrogenated copolymer) can be produced, for example, by a living anionic polymerization conducted in a hydrocarbon solvent using a polymerization initiator, such as an organic alkali metal compound. Examples of hydrocarbon solvents include aliphatic hydrocarbons, such as n-butane, isobutane, n-pentane, n-hexane, n-heptane and n-octane; alicyclic hydrocarbons, such as cyclohexane. cycloheptane and methylcycloheptane; and aromatic hydrocarbons, such as benzene, toluene, xylene and ethylbenzene.

As the polymerization initiator, it is possible to use aliphatic hydrocarbon-alkali metal compounds, aromatic hydrocarbon-alkali metal compounds, organic amino-alkali metal compounds, which are generally known to have a living anionic polymerization activity with respect to a conjugated diene and a vinyl aromatic compound. Examples of alkali metals include lithium, sodium and potassium. As preferred examples of organic alkali metal compounds, there can be mentioned lithium compounds having at least one lithium atom in a molecule of a $C_1$–$C_{20}$ aliphatic or aromatic hydrocarbons (such as a dilithium compound, a trilithium compound and a tetralithium compound). Specific examples of lithium compounds include n-propyllithium, n-butyllithium, sec-butyllithium, tert-butyllithium, a reaction product of diisopropenylbenzene and sec-butyllithium, and a reaction product obtained by reacting divinylbenzene, sec-butyllithium and a small amount of 1,3-butadiene. Further, it is also possible to use any of the organic alkali metal compounds described in U.S. Pat. No. 5,708,092, GB Patent No. 2,241,239 and U.S. Pat. No. 5,527,753.

In the present invention, when the copolymerization of a conjugated diene monomer and a vinyl aromatic monomer is performed in the presence of the organic alkali metal compound as a polymerization initiator, it is possible to use a tertiary amine compound or an ether compound as a vinyl bond formation-controlling agent, which is used for controlling the amount of vinyl bonds (i.e., a 1,2-vinyl bond and a 3,4-vinyl bond) formed by the conjugated diene monomers, and for controlling the occurrence of a random copolymerization of a conjugated diene and a vinyl aromatic compound. As the tertiary amine compound, it is possible to use a compound represented by the formula: $R^1R^2R^3N$, wherein each of $R^1$, $R^2$ and $R^3$ independently represents a $C_1$–$C_{20}$ hydrocarbon group or a $C_1$–$C_{20}$ hydrocarbon group substituted with a tertiary amino group. Specific examples of tertiary amine compounds include N,N-dimethylaniline, N-ethylpiperidine, N-methylpyrrolidine, N,N,N',N'-tetramethylethylenediamine, N,N,N',N'-tetramethylethylenediamine, 1,2-dipiperidinoethane, trimethylaminoethylpiperazine, N,N,N',N",N"-pentamethylethylenetriamine and N,N'-dioctyl-p-phenylenediamine.

As the above-mentioned ether compound, it is possible to use a linear ether compound and a cyclic ether compound. Examples of linear ether compounds include dimethyl ether; diethyl ether; diphenyl ether; ethylene glycol dialkyl ethers, such as ethylene glycol dimethyl ether, ethylene glycol diethyl ether and ethylene glycol dibutyl ether; and diethylene glycol dialkyl ethers, such as diethylene glycol dimethyl ether, diethylene glycol diethyl ether and diethylene glycol dibutyl ether. Examples of cyclic ether compounds include tetrahydrofuran, dioxane, 2,5-dimethyloxolane, 2,2,5,5-tetramethyloxolane, 2,2-bis(2-oxolanyl)propane and an alkyl ether of a furfuryl alcohol.

In the present invention, the copolymerization of a conjugated diene monomer and a vinyl aromatic monomer in the presence of the organic alkali metal compound as a polymerization initiator can be conducted either in a bacthwise manner or in a continuous manner. Further, the copolymerization may be conducted in a manner wherein a batchwise operation and a continuous operation are used in combination. For achieving a molecular weight distribution suitable for improving the processability of the hydrogenated copolymer, it is preferred to conduct the copolymerization in a continuous manner. The reaction temperature for the copolymerization is generally in the range of from 0 to 180° C., preferably from 30 to 150° C. The reaction time for the copolymerization varies depending on other conditions, but is generally within 48 hours, preferably in the range of from 0.1 to 10 hours. It is preferred that the atmosphere of the copolymerization reaction system is an atmosphere of an inert gas, such as nitrogen gas. With respect to the polymerization reaction pressure, there is no particular limitation so long as the pressure is sufficient for maintaining each of the monomers and the solvent in a liquid state. Further, care must be taken to prevent the intrusion of impurities (such as water, oxygen and carbon dioxide), which deactivate the catalyst and/or the living polymer, into the polymerization reaction system.

In the production of the hydrogenated copolymer of the present invention, after completion of the copolymerization reaction, a multifunctional coupling agent may be added to the polymerization reaction mixture to perform a coupling reaction. As a bifunctional coupling agent, any of the conventional coupling agents can be used. Specific examples of bifunctional coupling agents include dihalides, such as dimethyldichlorosilane and dimethyldibromosilane; and acid esters, such as methyl benzoate, ethyl benzoate, phenyl benzoate and a phthalic ester. Also as a tri- or more-functional coupling agent, any of the conventional coupling agents can be used. Specific examples of tri- or more-functional coupling agents include tri- or more-valent polyols; multivalent epoxy compounds, such as epoxydized soy bean oil and diglycidylbisphenol A; polyhalogenated compounds, such as a halogenated silicon compound represented by the formula: $R_{4-n}SiX_n$, wherein each R independently represents a $C_1$–$C_{20}$ hydrocarbon group, X represents a halogen atom, and n represents an integer of 3 or 4, and a halogenated tin compound represented by the formula: $R_{4-n}SnX_n$, wherein each R independently represents a $C_1$–$C_{20}$ hydrocarbon group, X represents a halogen atom, and n represents an integer of 3 or 4. Specific examples of the above-mentioned halogenated silicon compound include methylsilyl trichloride, t-butylsilyl trichloride, silicon tetrachloride and brominated products thereof. Specific examples of the above-mentioned halogenated tin compound include methyltin trichloride, t-butyltin trichloride and tin tetrachloride. Also, dimethyl carbonate or diethyl carbonate can be used as a multifunctional coupling agent.

By hydrogenating the thus obtained copolymer (unhydrogenated copolymer) in the presence of a hydrogenation catalyst, the hydrogenated copolymer of the present invention can be produced. With respect to the hydrogenation catalyst, there is no particular limitation, and any of the conventional hydrogenation catalysts can be used. Examples of hydrogenation catalysts include:

(1) a carried, heterogeneous hydrogenation catalyst comprising a carrier (such as carbon, silica, alumina or diatomaceous earth) having carried thereon a metal, such as Ni, Pt, Pd or Ru;

(2) the so-called Ziegler type hydrogenation catalyst which uses a transition metal salt (such as an organic acid salt or acetylacetone salt of a metal, such as Ni, Co, Fe or Cr) in combination with a reducing agent, such as an organoaluminum; and (3) a homogeneous hydrogenation catalyst, such as the so-called oraganometal complex of an organometal compound containing a metal, such as Ti, Ru, Rh or Zr.

Specific examples of hydrogenation catalysts include those which are described in Examined Japanese Patent Publication Nos. Sho 42-8704 and Hei 1-37970. As preferred examples of hydrogenation catalysts, there can be mentioned a titanocene compound and a mixture of a titanocene compound and a reductive organometal compound.

Examples of titanocene compounds include those which are described in Unexamined Japanese Patent Application Laid-Open Specification No. Hei 8-109219. As specific examples of titanocene compounds, there can be mentioned compounds, each independently having at least one ligand (e.g., biscyclopentadienyltitanium dichloride and monopentamethylcyclopentadienyltitanium trichloride) having a (substituted) cyclopentadienyl skeleton, an indenyl skeleton or a fluorenyl skeleton. Examples of reductive organometal compounds include organic alkali metal compounds, such as an organolithium compound; an organomagnesium compound; an organoaluminum compound; an organoboron compound; and an organozinc compound.

The hydrogenation reaction for producing the hydrogenated copolymer of the present invention is generally conducted at 0 to 200° C., preferably 30 to 150° C. The hydrogen pressure in the hydrogenation reaction is generally in the range of from 0.1 to 15 MPa, preferably from 0.2 to 10 MPa, more preferably from 0.3 to 5 MPa. The hydrogenation reaction time is generally in the range of from 3 minutes to 10 hours, preferably from 10 minutes to 5 hours. The hydrogenation reaction may be performed either in a batchwise manner or in a continuous manner. Further, the hydrogenation reaction may be performed in a manner wherein a batchwise operation and a continuous operation are used in combination.

By the hydrogenation reaction of the unhydrogenated copolymer, a solution of a hydrogenated copolymer in a solvent used is obtained. From the obtained solution, the hydrogenated copolymer is separated. If desired, before the separation of the hydrogenated copolymer, a catalyst residue may be separated from the solution. Examples of methods for separating the hydrogenated copolymer from the solution include a method in which a polar solvent (which is a poor solvent for the hydrogenated copolymer) is added to the solution containing the hydrogenated copolymer, thereby precipitating the hydrogenated copolymer, followed by recovery of the hydrogenated copolymer; a method in which the solution containing the hydrogenated copolymer is added to hot water, while stirring, followed by removal of the solvent by steam stripping; and a method in which the solution containing the hydrogenated copolymer is directly heated to evaporate the solvent.

The hydrogenated copolymer of the present invention may further contain any of the conventional stabilizers, such as phenol type stabilizers, phosphorus type stabilizers, sulfur type stabilizers and amine type stabilizers.

The hydrogenated copolymer of the present invention may be graft-modified using an $\alpha,\beta$-unsaturated carboxylic acid or a derivative (such as an anhydride, an ester or an amide) thereof. The thus obtained graft-modified product can also be used in the below-described composition of the present invention. Specific examples of $\alpha,\beta$-unsaturated carboxylic acids or derivatives thereof include maleic anhydride, maleic acid imide, acrylic acid or an ester thereof, methacrylic acid or an ester thereof, and endo-cis-bicyclo(2,2,1)-5-heptene-2,3-dicarboxylic acid or an anhydride thereof. The amount of the $\alpha,\beta$-unsaturated carboxylic acid or a derivative thereof is generally in the range of from 0.01 to 20 parts by weight, preferably from 0.1 to 10 parts by weight, relative to 100 parts by weight of the hydrogenated copolymer.

In another aspect of the present invention, there is provided a hydrogenated copolymer composition comprising:

1 to 99 parts by weight of the hydrogenated copolymer (a) of the present invention, and 99 to 1 part by weight of at least one polymer (b) selected from the group consisting of a thermoplastic resin other than the hydrogenated copolymer (a) and a rubbery polymer other than the hydrogenated copolymer (a).

By the combined use of the hydrogenated copolymer (a) of the present invention and the other polymer (b) (such as a thermoplastic resin and a rubbery polymer), it becomes possible to obtain a hydrogenated copolymer composition which can be advantageously used as various molding materials. With respect to the amounts of the hydrogenated copolymer (a) (hereinafter, frequently referred to as "component (a)") and the thermoplastic resin and/or the rubbery polymer (hereinafter, frequently referred to as "component (b)"), the component (a)/component (b) weight ratio is in the range of from 1/99 to 99/1, preferably from 2/98 to 90/10, more preferably from 5/95 to 70/30.

When the hydrogenated copolymer (a) of the present invention is mixed with the thermoplastic resin (b), the resultant hydrogenated copolymer composition exhibits excellent impact resistance and moldability.

Examples of thermoplastic resins usable as component (b) include a block copolymer of a conjugated diene monomer and a vinyl aromatic monomer, which has a vinyl aromatic monomer unit content of more than 60% by weight, and a hydrogenation product thereof (other than the hydrogenated copolymer (a) of the present invention); a polymer of the above-mentioned vinyl aromatic monomer; a copolymer of the above-mentioned vinyl aromatic monomer with at least one vinyl monomer (other than the vinyl aromatic monomer), such as ethylene, propylene, butylene, vinyl chloride, vinylidene chloride, vinyl acetate, acrylic acid and an ester thereof (e.g., methyl acrylate), methacrylic acid and an ester thereof (e.g., methyl methacrylate), acrylonitrile and methacrylonitrile; a rubber-modified styrene resin (HIPS); an acrylonitrile/butadiene/styrene copolymer resin (ABS); a methacrylic ester/butadiene/styrene copolymer resin (MBS); an ethylene polymer, such as polyethylene, a copolymer of ethylene with a comonomer copolymerizable with ethylene, which has an ethylene content of 50% by weight or more (e.g., an ethylene/propylene copolymer, an ethylene/butylene copolymer, an ethylene/hexene copolymer, an ethylene/octene copolymer, or an ethylene/vinyl acetate copolymer or a hydrolyzed product thereof), an ethylene/acrylic acid ionomer, or a chlorinated polyethylene; a propylene polymer, such as polypropylene, a copolymer of propylene with a comonomer copolymerizable with propylene, which has a propylene content of 50% by weight or more (e.g., a propylene/ethylene copolymer and a propylene/ethyl acrylate copolymer), or a chlorinated polypropylene; a cyclic olefin type resin, such as an ethylene/norbornene resin; a polybutene resin; a polyvinyl chloride resin; a polyvinyl acetate resin or a hydrolyzed product thereof; a polymer of acrylic acid, or an ester or an amide thereof; a polyacrylate resin; a polymer of acrylonitrile and/or methacrylonitrile; a nitrile resin which is a copolymer of an (meth)acrylonitrile with a comonomer copolymerizable with the (meth)acrylonitrile, which has a (meth)acrylonitrile content of 50% by weight or more; a polyamide resin, such as nylon-46, nylon-6, nylon-66, nylon-610, nylon-11, nylon-12 and nylon-6/nylon-12 copolymer; a polyester resin; a thermoplastic polyurethane resin; a carbonate polymer, such as poly-4,4'-dioxydiphenyl-2,2'-propane carbonate; a thermoplastic polysulfone, such as a polyether sulfone and a polyallylsulfone; a polyoxymethylene resin; a polyphenylene ether resin, such as poly(2,6-dimethyl-1,4-phenylene) ether; a polyphenylene sulfide resin, such as polyphenylene sulfide, poly-4,4'-diphenylene sulfide; a polyallylate resin; an ether ketone homopolymer or copolymer; a polyketone resin; a fluororesin; a polyoxybenzoyl type polymer; a polyimide resin; and a polybutadiene resin, such as 1,2-polybutadiene or transpolybutadiene. Each of these thermoplastic resins (b) may have bonded thereto a group containing a polar group, such as a hydroxyl group, an epoxy group, an amino group, a carboxyl group or an acid anhydride group. The number average molecular weight of the thermoplastic resin (b) used in the present invention is generally 1,000 or more, preferably in the range of from 5,000 to 5,000,000, more preferably in the range of from 10,000 to 1,000,000. The number average molecular weight of the thermoplastic resin (b) also can be measured by GPC as in the case of the hydrogenated copolymer of the present invention.

When the hydrogenated copolymer of the present invention is mixed with the rubbery polymer (b), the resultant hydrogenated copolymer composition exhibits excellent tensile strength and elongation properties, and excellent moldability.

Examples of rubbery polymers usable as component (b) include a butadiene rubber and a hydrogenation product thereof; a styrene/butadiene rubber and a hydrogenation product thereof (other than the hydrogenated copolymer (a) of the present invention); an isoprene rubber; an acrylonitrile/butadiene rubber and a hydrogenation product thereof; an olefin type elastomer, such as a chloroprene rubber, an ethylene/propylene rubber, an ethylene/propylene/diene rubber, an ethylene/butane/diene rubber, an ethylene/butene rubber, an ethylene/hexene rubber or an ethylene/octene rubber; an olefin type thermoplastic elastomer (TPE) containing an ethylene/propylene/diene terpolymer (EPDM) or an ethylene/propylene copolymer (EPM) as a soft segment; a butyl rubber; an acrylic rubber; a fluororubber; a silicone rubber; a chlorinated polyethylene rubber; an epichlorohydrin rubber; an $\alpha,\beta$-unsaturated nitrile/acrylic ester-conjugated diene copolymer rubber; a urethane rubber; a polysulfide rubber; a styrene/butadiene block copolymer and a hydrogenation product thereof; a styrene/isoprene block copolymer and a hydrogenation product thereof; a styrene type elastomer having a styrene content of 60% by weight or less, such as a styrene/butadiene/isoprene block copolymer or a hydrogenation product thereof; and a natural rubber. Each of these rubbery polymers may be modified by introducing thereto a functional group, such as a carboxyl group, a carbonyl group, an acid anhydride group, a hydroxyl group, an epoxy group, an amino group, a silanol group and an alkoxysilane group. The number average molecular weight of the rubbery polymer (b) used in the present invention is generally 10,000 or more, preferably in the range of from 20,000 to 1,000,000, more preferably in the range of from 30,000 to 800,000. The number average molecular weight of the rubbery polymer (b) also can be measured by GPC as in the case of the hydrogenated copolymer of the present invention.

The above-exemplified thermoplastic resins (b) and rubbery polymers (b) may be used individually or in any combination. With respect to the combination of different polymers as component (b), there is no particular limitation. For example, as component (b), it is possible to use a plurality of different thermoplastic resins or a plurality of different rubbery polymers. Further, it is also possible to use the thermoplastic resin and the rubbery polymer in combination. Specifically, for example, with respect to the composition of the present invention which is a resinous composition (i.e., a composition containing a large amount of the thermoplastic resin (b)), it is possible to improve the impact strength of the composition and to soften the composition by adding the rubbery polymer (b) thereto. On the other hand, with respect to the composition of the present invention which is a rubbery composition (i.e., a composition containing a large amount of the rubbery polymer (b)), it is possible to improve the strength and heat resistance of the copolymer by adding the thermoplastic resin (b) thereto.

In the present invention, if desired, an additive may be added to the hydrogenated copolymer and the hydrogenated copolymer composition. With respect to the additive, there is no particular limitation, and any additives which are conventionally used in thermoplastic resins or rubbery polymers can be used. For example, in the present invention, the additives as described in "Gomu Purasuchikku Haigou Yakuhin (Additives for Rubber and Plastic)" (Rubber Digest Co., Ltd., Japan) can be used. Specific examples of additives include inorganic fillers, such as a reinforcing filler (described below), calcium sulfate and barium sulfate; pigments, such as carbon black and iron oxide; lubricants, such as stearic acid, behenic acid, zinc stearate, calcium stearate, magnesium stearate and ethylene bis-stearamide; blocking-preventive reagents, such as stearic acid amide, erucic acid amide, oleic acid amide, stearic acid monoglyceride, an stearyl alcohol, a petroleum wax (e.g., microcrystalline wax) and a low molecular weight vinyl aromatic resin; mold release agents; plasticizers, such as an organopolysiloxane and a mineral oil; antioxidants, such as a hindered phenol type antioxidant and a phosphorus type thermal stabilizer; hindered amine type light stabilizers; benzotriazole type ultraviolet absorbers; flame retardants; antistatic agents; reinforcing agents, such as an organic fiber, a glass fiber, a carbon fiber and a metal whisker; coloring agents; and mixtures thereof.

With respect to the method for producing the hydrogenated copolymer composition of the present invention, there is no particular limitation, and any of the conventional methods can be employed. For example, the hydrogenated copolymer composition of the present invention can be produced by melt-kneading method using a conventional mixing machine, such as a Banbury mixer, a single-screw extruder, a twin-screw extruder, a co-kneader, a multi-screw extruder, or a method in which the components for the composition are added to a solvent, to thereby obtain a solution or dispersion of a mixture of the components in the solvent, followed by heating to remove the solvent. From the viewpoint of productivity of the composition and uniform mixing of the components of the composition, it is preferred to use the melt-kneading method using an extruder. With respect to the form of the hydrogenated copolymer composition, there is no particular limitation, and the composition may be in the form of pellets, a sheet, a strand or a chip. Further, immediately after the melt-kneading, the resultant molten composition can be directly formed into a shaped article.

As mentioned above, the hydrogenated copolymer or hydrogenated copolymer composition of the present invention, if desired, can be used in the form of a mixture thereof with any of various conventional additives, and such a mixture may be used in various fields. Preferred examples of specific forms of the hydrogenated copolymer and hydrogenated copolymer composition of the present invention (each in the form of a mixture thereof with an additive) include (i) a reinforcing filler-containing composition, (ii) a crosslinked product, (iii) a foam, (iv) a molded article, such as a multilayer film and a multilayer sheet, (v) a building material, (vi) a vibration damping, soundproofing material, (vii) an electric wire coating material, (viii) a high frequency welding composition, (ix) a slush molding material, (x) an adhesive composition, and (xi) an asphalt composition. Especially, the hydrogenated copolymer and hydrogenated copolymer composition of the present invention can be advantageously used as any of the cross-linked product of item (ii) above, the foam of item (iii) above, the molded article of item (iv) above, such as a multilayer film and a multilayer sheet, the building material of item (v) above, the vibration damping, soundproofing material of item (vi) above, and the electric wire coating material of item (vii) above. Hereinbelow, explanations are made with respect to the above-mentioned specific forms.

(i) Reinforcing Filler-Containing Composition

The reinforcing filler-containing composition can be produced by mixing either the hydrogenated copolymer or hydrogenated copolymer composition of the present invention with at least one reinforcing filler (which is, hereinafter, frequently referred to as "component (c)") selected from the group consisting of a silica type inorganic filler, a metal oxide, a metal hydroxide, a metal carbonate and carbon black. The amount of the component (c) is generally in the range of from 0.5 to 100 parts by weight, preferably from 5 to 100 parts by weight, more preferably from 20 to 80 parts by weight, relative to 100 parts by weight of the hydrogenated copolymer or the hydrogenated copolymer composition. For producing the reinforcing filler-containing composition using the hydrogenated copolymer composition of the present invention, it is suitable to use the hydrogenated copolymer composition containing the component (b) (i.e., a thermoplastic resin and/or a rubbery polymer) in an amount of 0 to 500 parts by weight, preferably 5 to 300 parts by weight, more preferably 10 to 200 parts by weight, relative to 100 parts by weight of the hydrogenated copolymer (component (a)) of the present invention.

The silica type inorganic filler used as the reinforcing filler is a solid particle composed mainly of $SiO_2$. Examples of silica type inorganic fillers include silica, clay, talc, kaolin, mica, wollastonite, montmorillonite, zeolite and a fibrous inorganic substance, such as a glass fiber. Further, a silica type inorganic filler having its surface rendered hydrophobic and a mixture of the silica type inorganic filler and a nonsilica type inorganic filler may also be used as the reinforcing filler. Among the above-exemplified silica type inorganic fillers, preferred are silica and a glass fiber. Specific examples of silica include a white carbon produced by the dry process, a white carbon produced by the wet process, a synthetic silicate type white carbon and the so-called colloidal silica. The preferred average particle diameter of the silica type inorganic filler is generally in the range of from 0.01 to 150 μm. For achieving the effects of addition of the silica type inorganic filler, it is preferred to disperse the filler finely in the composition such that the average particle diameter of the silica type inorganic filler dispersed in the composition is in the range of from 0.05 to 1 μm, preferably from 0.05 to 0.5 μm.

The metal oxide used as the reinforcing filler is a solid particle composed mainly of $M_xO_y$ (wherein M represents a metal atom, and each of x and y independently represents an integer of from 1 to 6). Examples of metal oxides include alumina, titanium oxide, magnesium oxide and zinc oxide. Further, the metal oxide may be used in the form of a mixture thereof with an inorganic filler other than the metal oxide.

The metal hydroxides used as the reinforcing filler are hydrated type inorganic fillers, such as aluminum hydroxide, magnesium hydroxide, zirconium hydroxide, hydrated aluminum silicate, hydrated magnesium silicate, basic magnesium carbonate, hydrotalcite, calcium hydroxide, barium hydroxide, hydrated tin oxide and hydrated inorganic metal compounds, such as borax. Of these, preferred are magnesium hydroxide and aluminum hydroxide.

Examples of metal carbonates used as the reinforcing filler include calcium carbonate, and magnesium carbonate.

Further, as the reinforcing filler, carbon blacks of various grades, such as FT, SRF, FEF, HAF, ISAF and SAF, can be used. It is preferred that the carbon black used has a specific surface area (measured by the nitrogen adsorption method) of 50 mg/g or more, and a DBT (dibutyl phthalate) oil absorption of 80 ml/100 g or more.

The reinforcing filler-containing composition, which comprises the hydrogenated copolymer or hydrogenated copolymer composition of the present invention and a reinforcing filler, may further contain a silane coupling agent (which is, hereinafter, frequently referred to as "component (d)"). The silane coupling agent is used to strengthen the interaction between the hydrogenated copolymer and the reinforcing filler, and is a compound having a group which exhibits an affinity or bonding ability to either or both of the hydrogenated copolymer and the reinforcing filler. As a preferred example of the silane coupling agent, there can be mentioned a compound having a polysulfide linkage containing a silanol group or an alkoxysilane in combination with two or more sulfur atoms, wherein any of the sulfur atoms may be present in the form of a mercapto group. Specific examples of silane coupling agents include bis[3-(triethoxysilyl)propyl]tetrasulfide, bis[3-(triethoxysilyl)propyl]disulfide, bis[2-(triethoxysilyl)ethyl]tetrasulfide, 3-mercaptopropyltrimethoxysilane, 3-triethoxysilylpropyl-N,N-dimethylthiocarbamoyltetrasulfide, and 3-triethoxysilylpropylbenzothiazoletetrasulfide. From the viewpoint of obtaining the desired effect, the amount of the silane coupling agent is generally in the range of from 0.1 to 30% by weight, preferably from 0.5 to 20% by weight, more preferably from 1 to 15% by weight, based on the weight of the reinforcing filler.

The reinforcing filler-containing composition, which comprises the hydrogenated copolymer or hydrogenated copolymer composition of the present invention and a reinforcing filler, may be subjected to a vulcanization reaction (i.e., a crosslinking reaction) in the presence of a vulcanizing agent to produce a vulcanized composition. Examples of vulcanizing agents include a radical generator, such as an organic peroxide and an azo compound, an oxime compound, a nitroso compound, a polyamine compound, sulfur, a sulfur-containing compound (such as sulfur monochloride, sulfur dichloride, a disulfide compound and a polymeric polysulfide compound). The vulcanizing agent is generally used in an amount of from 0.01 to 20 parts by weight, preferably 0.1 to 15 parts by weight, relative to 100 parts by weight of the hydrogenated copolymer or the hydrogenated copolymer composition.

Examples of organic peroxides (hereinafter, referred to as "component (e)") used as the vulcanizing agent, which are preferred from the viewpoint of low odor and scorch stability (i.e., a property such that a crosslinking reaction does not occur when the components for the composition are mixed with each other, but occurs rapidly when the resultant mixture is placed under conditions suitable for effecting a crosslinking reacting), include 2,5-dimethyl-2,5-di(tert-butylperoxy)hexane, 2,5-dimethyl-2,5-di(tert-butylperoxy)hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate, and di-tert-butyl peroxide. Further examples of organic peroxides which can be used as the vulcanizing agent include dicumyl peroxide, benzoyl peroxide, p-chlorobenzoyl peroxide, 2,4-dichlorobenzoyl peroxide, tert-butyl peroxybenzoate, tert-butylperoxyisopropyl carbonate, diacetyl peroxide, lauroyl peroxide and tert-butyl cumyl peroxide.

In the above-mentioned vulcanization reaction, a vulcanization accelerator (hereinafter, frequently referred to as "component (f)") may be used in a desired amount. Examples of vulcanization accelerators include a sulphenic amide type accelerator, a guanidine type accelerator, a thiuram type accelerator, an aldehyde-amine type accelerator, an aldehyde-ammonia type accelerator, a thiazole type accelerator, a thiourea type accelerator and a dithiocarbamate type accelerator.

An auxiliary vulcanizing agent, such as zinc oxide and stearic acid, may also be used in a desired amount.

Further, especially when the above-mentioned organic peroxide is used for crosslinking (vulcanizing) the reinforcing filler-containing composition, it is preferred to use a vulcanization accelerator in combination with the organic peroxide. Examples of vulcanization accelerators which may be used in combination with the organic peroxide include sulfur; auxiliaries (hereinafter, frequently referred to as "component (g)") for a peroxide crosslinking agent, such as p-quinone dioxime, p,p'-dibenzoylquinonedioxime, N-methyl-N-4-dinitrosoaniline, nitrosobenzene, diphenylguanidine and trimethylolpropane-N,N'-m-phenylene dimaleimide; divinyl benzene; triallyl cyanurate; multifunctional methacrylate monomers, such as ethyleneglycol dimethacrylate, diethyleneglycol dimethacrylate, polyethyleneglycol dimethacrylate, trimethylol propane trimethacrylate and allyl methacrylate; multifunctional vinyl monomers (hereinafter, frequently referred to as "component (h)"), such as vinyl butylate and vinyl stearate. The vulcanization accelerator as mentioned above is generally used in an amount of from 0.01 to 20 parts by weight, preferably from 0.1 to 15 parts by weight, relative to 100 parts by weight of the hydrogenated copolymer or the hydrogenated copolymer composition.

The above-mentioned vulcanization reaction can be performed by a conventional method. For example, with respect to the reaction temperature, the vulcanization reaction may be conducted at 120 to 200° C., more preferably 140 to 180° C. The vulcanized reinforcing filler-containing composition has excellent properties, such as high heat resistance, flexibility and oil resistance.

In the present invention, for improving the processability of the reinforcing filler-containing composition, a rubber-softening agent (hereinafter, frequently referred to as "component (i)") may be added. As the rubber-softening agent, it is suitable to use a mineral oil, or a liquid or low molecular weight synthetic softening agent. It is especially preferred to use a naphthene type and/or paraffin type process oil(s) or extender oil(s), which is/are generally used for softening a rubber, for increasing the volume of a rubber or for improving the processability of a rubber. The mineral oil type softening agent is a mixture of an aromatic compound, a naphthene and a chain paraffin. With respect to the mineral oil type softening agents, a softening agent in which the number of carbon atoms constituting the paraffin chains is 50% or more (based on the total number of carbon atoms present in the softening agent) is generally referred to as a "paraffin type softening agent"; a softening agent in which the number of carbon atoms constituting the naphthene rings is 30 to 45% (based on the total number of carbon atoms present in the softening agent) is generally referred to as a "naphthene type softening agent"; and a softening agent in which the number of carbon atoms constituting the aromatic rings is more than 30% (based on the total number of carbon atoms present in the softening agent) is generally referred to as an "aromatic type softening agent". The reinforcing filler-containing composition may also contain a synthetic softening agent, such as a polybutene, a low molecular weight polybutadiene and a liquid paraffin. However, the above-mentioned mineral oil type softening agent is more preferred. The amount of the rubber-softening agent used in the reinforcing filler-containing composition is generally in the range of from 0 to 100 parts by weight, preferably from 10 to 90 parts by weight, more preferably from 30 to 90 parts by weight, relative to 100 parts by weight of the hydrogenated copolymer or the hydrogenated copolymer composition. When the amount of the rubber-softening agent exceeds 100 parts by weight, the rubber-softening agent is likely to bleed out from the composition, thereby leading to a danger that the surface tack of the composition occurs.

The reinforcing filler-containing composition, which comprises the hydrogenated copolymer or hydrogenated copolymer composition of the present invention and a reinforcing filler, may be used as a building material, an electric wire coating material, a vibration damping material and the like. Further, the vulcanized product of the reinforcing filler-containing composition may be used for producing a tire, a rubber cushion, a belt, an industrial article, a footwear, a foam and the like, taking advantage of its characteristics.

(ii) Crosslinked Product

The hydrogenated copolymer or hydrogenated copolymer composition of the present invention can be crosslinked in the presence of a vulcanizing agent, to obtain a crosslinked product (i.e. a crosslinked hydrogenated copolymer or a crosslinked hydrogenated copolymer composition). By crosslinking the hydrogenated copolymer or hydrogenated copolymer composition of the present invention, it is possible to improve the heat resistance (as evaluated in terms of high temperature C-Set (compression set)) and flexibility of the hydrogenated copolymer or the hydrogenated copolymer composition. When the hydrogenated copolymer composition of the present invention (comprising the hydrogenated copolymer (a), and the thermoplastic resin (b) and/or the rubbery polymer (b)) is used for producing the crosslinked product, the component (a)/component (b) weight ratio in the hydrogenated copolymer composition is generally in the range of from 10/90 to 100/0, preferably from 20/80 to 90/10, more preferably from 30/70 to 80/20.

In the present invention, there is no particular limitation with respect to the method for crosslinking the hydrogenated copolymer or the hydrogenated copolymer composition. However, it is preferred to employ the so-called "dynamic crosslinking" method. In the dynamic crosslinking method, components (including a crosslinking agent) for a desired crosslinked product are melt-kneaded at a temperature at which a crosslinking reaction occurs, so as to effect the mixing of components and the crosslinking reaction simultaneously. The details of this method are described in A. Y. Coran et al, Rub. Chem. and Technol. vol. 53., 141 (1980).

In the dynamic crosslinking method, the crosslinking reaction is performed by using an enclosed kneader, such as a Banbury mixer or a pressurizing kneader, or a single-screw or twin-screw extruder. The kneading is generally conducted at 130 to 300° C., preferably 150 to 250° C., for 1 to 30 minutes. In the dynamic crosslinking method, an organic peroxide or a phenol resin type crosslinking agent is generally used as the vulcanizing agent. The amount of the vulcanizing agent is generally in the range of from 0.01 to 15 parts by weight, preferably from 0.04 to 10 parts by weight, relative to 100 parts by weight of the hydrogenated copolymer or the hydrogenated copolymer composition.

As the organic peroxide used as the vulcanizing agent in the dynamic crosslinking method, it is possible to use the above-mentioned component (e). When the crosslinking reaction is performed using the organic peroxide, the above-mentioned component (f) may be used as a vulcanization accelerator, if desired, in combination with the above-mentioned component (g) and/or the above-mentioned component (h). The amount of the crosslinking agent is generally in the range of from 0.01 to 20 parts by weight, preferably 0.1 to 15 parts by weight, relative to 100 parts by weight of the hydrogenated copolymer or the hydrogenated copolymer composition.

The crosslinked product of the present invention, if desired, may further contain an additive so long as the properties of the crosslinked product are not harmfully affected. Examples of additives include a softening agent, a thermal stabilizer, an antistatic agent, a weathering stabilizer, an antioxidant, a filler, a coloring agent and a lubricant. The above-mentioned component (i) may be used as a softening agent for controlling the hardness and fluidity of the final product. The softening agent may be added just before or during the kneading of the components for the crosslinked product, or may be incorporated into the hydrogenated copolymer during the production thereof so as to obtain the hydrogenated copolymer in the form of an oil extended rubber. The amount of the softening agent is generally in the range of from 0 to 200 parts by weight, preferably 10 to 150 parts by weight, more preferably 20 to 100 parts by weight, relative to 100 parts by weight of the hydrogenated copolymer or the hydrogenated copolymer composition. Further, the above-mentioned component (c) may be used as the filler in the crosslinked product. The amount of the filler is generally in the range of from 0 to 200 parts by weight, preferably 10 to 150 parts by weight, more preferably 20 to 100 parts by weight, relative to 100 parts by weight of the hydrogenated copolymer or the hydrogenated copolymer composition.

In the present invention, it is recommended that the dynamic crosslinking is performed so that the content of gel (exclusive of inherently insoluble components, such as the inorganic filler) is 5 to 80% by weight, preferably 10 to 70% by weight, more preferably 20 to 60% by weight, based on the weight of the crosslinked product. The gel content is determined by the following method. A sample (1 g) of a crosslinked product is refluxed in a Soxhlet's extractor for 10 hours using boiled xylene. The resultant residue is filtered through an 80-mesh wire mesh. The dry weight (g) of the insoluble matters remaining on the filter is measured, and the ratio (% by weight) of the obtained dry weight to the weight of the sample is calculated. The obtained ratio is defined as the gel content of the crosslinked product. The gel content may be controlled by changing the type and amount of the vulcanizing agent, and the crosslinking reaction conditions (such as temperature, residence time and shearing force).

As in the case of the vulcanized product of the reinforcing filler-containing composition of item (i) above, the crosslinked product of the present invention can be advantageously used for producing a tire, a rubber cushion, a belt, an industrial article, a footwear, a foam and the like. Further, the crosslinked product can also be advantageously used as a material for medical instruments and food packages.

(iii) Foam

The hydrogenated copolymer and hydrogenated copolymer composition of the present invention can also be used in the form of a foam. In this case, generally, the foam is produced by foaming a composition (which is, hereinafter, frequently referred to as a "foaming composition") containing the hydrogenated copolymer or hydrogenated copolymer composition of the present invention and a filler (which is, hereinafter, frequently referred to as "component (j)"). For producing the foam using the hydrogenated copolymer composition of the present invention, it is suitable to use the hydrogenated copolymer composition containing the component (b) (i.e., a thermoplastic resin and/or the rubbery copolymer) in an amount of from 5 to 95% by weight, preferably 5 to 90% by weight, more preferably 5 to 80% by weight, based on the weight of the hydrogenated copolymer (a).

Further, the amount of the filler (j) is generally in the range of from 5 to 95% by weight, preferably 10 to 80% by weight, more preferably 20 to 70% by weight, based on the weight of the above-mentioned foaming composition.

Examples of fillers (j) used for producing the foam of the present invention include inorganic fillers, such as the above-mentioned reinforcing filler (component (c)), calcium sulfate, barium sulfate, potassium titanate whisker, mica, graphite and a carbon fiber; and organic fillers, such as a wood chip, a wood powder and a pulp. There is no particular limitation with respect to the form of the filler. The filler may be in the form of a scale, a sphere, a granule or a powder, or may have an irregular configuration. If desired, at least two different types of the above-mentioned fillers may be used in combination. The filler may be treated with a silane coupling agent prior to use.

The foaming for obtaining the foam of the present invention can be conducted by a chemical method or a physical method. In each of these methods, bubbles are formed throughout the composition by addition of a chemical foaming agent (such as an organic foaming agent or an inorganic foaming agent) or a physical foaming agent (hereinafter, both of the above-mentioned chemical and physical foaming agent is frequently referred to as "component (k)").

The foam of the hydrogenated copolymer and hydrogenated copolymer composition of the present invention can be advantageously used for producing a shaped article having a light weight, an improved flexibility, an improved design, and the like. Examples of inorganic foaming agents include sodium bicarbonate, ammonium carbonate, ammonium bicarbonate, ammonium nitrite, an azide compound, sodium borohydride and a metal powder. Examples of organic foaming agents include azodicarbonamide, azobisformamide, azobisisobutylonitrile, azo-barium dicarbonate, N,N'-dinitrosopentamethylene-tetramine, N,N'-dinitroso-N,N'-dimethylterephtalamide, benzene sulfonylhydrazide, p-toluenesulfonyl hydrazide, p,p'-oxybisbenzenesulfonyl hydrazide and p-toluene-sulfonyl semicarbazide. Examples of physical foaming agents include a hydrocarbon, such as pentane, butane or hexane; a halogenated hydrocarbon, such as methyl chloride or methylene chloride; a gas, such as nitrogen gas or air; and a fluoridated hydrocarbon, such as trichlorofluoromethane, dichlorodifluoromethane, trichlorotrifluoroethane, chlorodifluoroethane or a hydrofluoro carbon. The foaming agents mentioned above may be used individually or in any combination. The amount of the foaming agent used for producing the foam of the present invention is generally in the range of from 0.1 to 8 parts by weight, preferably from 0.3 to 6 parts by weight, more preferably from 0.5 to 5 parts by weight, relative to 100 parts by weight of the hydrogenated copolymer or hydrogenated copolymer composition of the present invention.

The foam of the present invention, if desired, may further contain an additive in an appropriate amount. There is no limitation with respect to the type of the additive, and any additives which are conventionally used in thermoplastic resins or rubbery polymers can be used. As examples of additives, there can be mentioned various additives described in the above-mentioned "Gomu Purasuchikku Haigou Yakuhin (Additives for Rubber and Plastic)" (Rubber Digest Co., Ltd., Japan).

Further, if desired, the foam of the present invention may be crosslinked. As examples of the method for crosslinking, there can be mentioned a chemical crosslinking method in which a crosslinking agent (such as a peroxide or sulfur) and optionally an auxiliary crosslinking agent are added to the above-mentioned foaming composition; and a physical crosslinking method which utilizes an electron beam, a radiation or the like. The crosslinking may be conducted either in a static manner in which the crosslinking reaction is caused by irradiation without stirring the reaction system, or in a dynamic manner in which the crosslinking reaction system is stirred. Specifically, for example, the crosslinked foam can be produced as follows. A mixture of the hydrogenated copolymer or the hydrogenated copolymer composition, a foaming agent and a crosslinking agent is applied to a substrate to form a sheet. The obtained sheet is heated at approximately 160° C. to cause foaming and crosslinking simultaneously, thereby obtaining a crosslinked foam. As the crosslinking agent, the above-mentioned component (e) (organic peroxide) and the above-mentioned component (f) (vulcanization accelerator) may be used. Further, the above-mentioned components (g) and (h) (auxiliaries for a peroxide crosslinking agent) may also be used in combination with the crosslinking agent. The amount of the crosslinking agent is generally in the range of from 0.01 to 20 parts by weight, preferably from 0.1 to 15 parts by weight, relative to 100 parts by weight of the hydrogenated copolymer or the hydrogenated copolymer composition.

The foam of the present invention can be advantageously used as various molded articles, such as an injection-molded article, a blow-molded article, an air-pressure-molded article, a vacuum-molded article and an extrusion-molded article, which may have various shapes, such as a sheet and a film. Especially, the foam can be advantageously used as a wrapping material or container for food (such as a wrapping material for fruits or eggs, a meat tray or a lunch box), which is required to exhibit high flexibility. As an example of the foam which can be used as a wrapping material or container for food, there can be mentioned a foam produced by foaming a composition comprising a plurality of resins or polymers, namely, an olefin resin, such as PP (polypropylene); a vinyl aromatic polymer, such as PS (polystyrene), or a rubber-modified styrene resin, such as HIPS; and the hydrogenated copolymer of the present invention or a modified product thereof; and optionally a block copolymer of a conjugated diene and a vinyl aromatic compound, or a hydrogenation product thereof (other than the hydrogenated copolymer of the present invention).

Further, the foam of the present invention can be used in a cushioning hybrid article which comprises a hard resin molded article in combination with the foam. The cushioning hybrid article is produced by injection molding method, such as an insert/mold cavity expansion method disclosed in Unexamined Japanese Patent Application Laid-Open Specification No. Hei 6-234133.

(iv) Multilayer Film and a Multilayer Sheet

The hydrogenated copolymer or hydrogenated copolymer composition of the present invention can also be used as a multilayer film and a multilayer sheet. The film of the hydrogenated copolymer or hydrogenated copolymer composition of the present invention has various excellent properties, such as high heat resistance, shrinking property, heat sealability, transparency and fog resistance. While maintaining these excellent properties of the film or sheet of the present invention, another resin layer can be formed on the film or sheet of the present invention, so that various additional properties can be imparted. By such lamination, it becomes possible to provide various forms of the multilayer film and sheet of the present invention, which are excellent with respect to various properties, such as pressure-sensitiveness, tear growth resistance, pierce resistance, mechanical strength (such as elongation at break), extensibility, roll property (i.e., a property such that a rolled film or sheet can be easily unrolled), elasticity recovery, pierce-induced tear resistance, tear resistance, distortion recovery and gas barrier properties. The above-mentioned multilayer film and multilayer sheet can be used as a wrapping material composed of a non-vinyl chloride stretch film, which is used for wrapping by means of a hand wrapper or a stretch package machine. Examples of multilayer films or multilayer sheets which comprise a layer of the hydrogenated copolymer or hydrogenated copolymer composition of the present invention include:

a). a multilayer film or multilayer sheet which comprises at least one layer of the hydrogenated copolymer or hydrogenated copolymer composition of the present invention;

b). the multilayer film or multilayer sheet of item a) above, wherein at least one of the two outermost layers (i.e., layers forming the surfaces of the film or the sheet) is composed of an adhesive resin (for example, an ethylene/vinyl acetate copolymer (EVA));

c). the multilayer film or multilayer sheet of item a) above, which comprises at least one layer composed of a polyolefin resin;

d). the multilayer film or multilayer sheet of item a) above, which comprises at least one layer composed of a gas barrier resin (for example, an ethylene/vinyl alcohol copolymer (EVOH), polyvinylidene chloride (PVDC) or a polyamide resin), wherein the layer composed of the gas barrier resin has a width of 25 $\mu$m and an oxygen permeability of 100 cc/m$^2$·24 hrs·atm or less, as measured at 23° C. under a humidity of 65% RH;

e). the multilayer film or multilayer sheet of item a) above, which comprises at least one layer composed of a heat sealing resin (for example, polyethylene, polypropylene, a nylon resin, an ethylene/vinyl acetate copolymer (EVA), an ethylene/ethyl acrylate copolymer (EEA), an ethylene/methyl methacrylate copolymer (EMMA), an $\alpha$-olefin copolymer or a hydrogenated copolymer);

f). the multilayer film or multilayer sheet of any one of items a), b), c), d) and e) above, wherein at least one of the two outermost layers of the multilayered film or the multilayered sheet is composed of an adhesive resin;

g). the multilayer film or multilayer sheet of any one of items a), b), c), d), e) and f) above, which is a stretched film or sheet; and h). the multilayer film or multilayer sheet of any one of items a), b), c), d) e), f) and g) above, which is a heat shrinkable, uniaxially stretched film or sheet, or is a heat shrinkable, biaxially stretched film or sheet.

Hereinbelow, the multilayer film or multilayer sheet of the present invention is described in detail.

The multilayer film or multilayer sheet of the present invention, if desired, may further contain a filler, a stabilizer, an antioxidant, a weatherability improver, an ultraviolet absorbing agent, a plasticizer, a softening agent, a lubricant, a processing aid, a coloring agent, a pigment, an antistatic agent, a flame retardant, an anti-fogging agent, an anti-blocking agent, a nucleating agent, a foaming agent and the like. Among the above-mentioned additives, the anti-blocking agent is effective for suppressing the blocking of the film or the sheet. Examples of anti-blocking agents include erucic acid amide, oleic acid amid, stearic acid monoglyceride and a petroleum wax (such as micro crystalline wax). There is no particular limitation with respect to the amount of the above-mentioned additives. However, in view of the balance of the properties of the film or sheet and the cost, the amount of the additive is preferably 10 parts by weight or less, more preferably 5 parts by weight or less, relative to 100 parts by weight of the multilayer film or multilayer sheet. However, in the case of an additive which exhibits desired effects only when used in a large amount, such an additive may be used in an amount larger than mentioned above. Each of the above-mentioned additives can be added to the hydrogenated copolymer or the hydrogenated copolymer composition before producing the film or sheet.

When the hydrogenated copolymer composition of the present invention (comprising the hydrogenated copolymer (a), and the thermoplastic resin (b) and/or the rubbery polymer (b)) is used for producing the multilayer film or the multilayer sheet, it is recommended that the component (a)/component (b) weight ratio in the hydrogenated copolymer composition is in the range of from 100/0 to 5/95, preferably 100/0 to 20/80, more preferably 100/0 to 40/60.

The multilayer film or multilayer sheet of the present invention, if desired, may be subjected to surface treatment with corona, ozone, plasma or the like, or may be coated with an anti-fog agent, a lubricant, or may be printed. The multilayer film or multilayer sheet of the present invention, if desired, may also be subjected to a uniaxial orientation or a biaxial orientation. Further, the films or sheets constituting the multilayer film or multilayer sheet may be strongly bonded to each other by bonding treatment (such as welding by heat, supersonic waves, high frequency waves and the like, and adhesion by using a solvent), and any other shaped articles of a thermoplastic resin and the like may also be bonded to the multilayer film or multilayer sheet by the above-mentioned bonding treatment.

There is no limitation with respect to the thickness of the multilayer film or multilayer sheet. However, the thickness of the multilayer film is preferably in the range of from 3 $\mu$m to 0.3 mm, more preferably from 10 $\mu$m to 0.2 mm, and the thickness of the multilayer sheet is preferably more than 0.3 mm and 3 mm or less, more preferably in the range of from 0.5 mm to 1 mm. When the multilayer film of the present invention is used as a stretched film or heat shrinkable, uniaxially or biaxially stretched film, the thickness of the film is preferably in the range of from 5 to 100 $\mu$m, more preferably from 10 to 50 $\mu$m. When such a film is used as a stretched film wrapping for food, the wrapping of food can be easily effected by means of an automatic wrapping machine or a manual wrapping machine. On the other hand, when the multilayer film of the present invention is used as a stretched film for producing a container, it is preferred that the thickness of the film is 100 $\mu$m or more. The multilayer film or multilayer sheet of the present invention may be formulated into a container or tray for packing food or electronic products by heat molding method, such as vacuum molding, compression molding or air-pressure molding.

The hydrogenated copolymer of the present invention per se has pressure-sensitiveness and adhesive properties to some extent. However, when the multilayer film or multilayer sheet of the present invention is required to exhibit a strong pressure-sensitiveness, the multilayer film or multilayer sheet of the present invention may have an adhesive layer which exhibits a strong pressure-sensitiveness. For forming such an adhesive layer, it is preferred to use an ethylene/vinyl acetate copolymer (EVA) resin. With respect to the EVA, it is preferred to use one which has a vinyl acetate content of from 5 to 25% by weight, more advantageously from 10 to 20% by weight, and has a melt flow rate (MFR) of from 0.1 to 30 g/min, more advantageously from 0.3 to 10 g/min, as measured at 230° C. under a load of 2.16 kgf. Further, the adhesive layer may be formed by using a mixture of the hydrogenated copolymer or hydrogenated copolymer composition of the present invention with a suitable amount of an adhesive property imparting agent.

In addition to the layer(s) of the hydrogenated copolymer or hydrogenated copolymer composition of the present invention, the multilayer film or multilayer sheet of the present invention may comprise any of various other layers (such as layers of a olefin polymer resin, a styrene polymer resin and polyethylene terephthalate) so as to improve the desired properties of the film or sheet. Examples of olefin polymer resins include an isotactic polypropylene, a syndiotactic polypropylene, an atactic polypropylene, a linear low density polyethylene (L-LDPE), a low density polyethylene (LDPE), a high density polyethylene (HDPE), a block or random copolymer of ethylene and/or propylene with an α-olefin (such as butene, hexene and octene), and polymethylpentene.

The multilayer film or multilayer sheet of the present invention may comprise a heat seal layer. The heat seal layer is a resin layer which adheres to other resins when heated and, if desired, pressurized. When the heat seal layer per se does not have satisfactory properties, or when the optimum sealing conditions are limited, it is preferred to form an auxiliary seal layer such that the auxiliary seal layer directly faces the heat seal layer in the multilayer film or sheet. For forming the heat seal layer, a composition composed mainly of an olefin resin can be used. With respect to such a composition, the olefin resin content is preferably in the range of from 50 to 100% by weight, based on the weight of the composition. Examples of olefin resins contained in the heat seal layer include an ethylene polymer resin, a propylene polymer resin and a butene polymer resin. As an especially preferred example of the ethylene polymer resin, there can be mentioned an ethylene/α-olefin copolymer. Examples of α-olefins include those which have 3 to 10 carbon atoms, such as propylene, 1-butene, 1-pentene, 4-methyl-1-pentene, 1hexene, 1-octene. Specific examples of ethylene polymer resins include a linear low density polyethylene (L-LDPE), a linear medium density polyethylene (M-LDPE) and a very low density polyethylene (VLDPE). The hydrogenated copolymer of the present invention may also be used for forming the heat seal layer.

Further, the heat seal layer may further contain an additive so as to improve heat seal strength, peeling property and the like. When the heat seal layer is required to have heat resistance, a nylon resin and/or an ethylene/ester copolymer may be used for forming the heat seal layer. Examples of ethylene/ester copolymers include an ethylene/vinyl acetate copolymer (EVA), an ethylene/ethyl acrylate copolymer (EEA) and an ethylene/methyl methacrylate copolymer (EMA). When an auxiliary seal layer is used, it is preferred that the crystalline melting point of the resin used in the seal layer is higher than the crystalline melting point of the resin used in the auxiliary seal layer.

If the adhesion between the layers of the multilayer film or multilayer sheet of the present invention is not satisfactory, an adhesive layer may be formed between the layers. Examples of materials for forming the adhesive layer include an ethylene/vinyl acetate copolymer; an ethylene/ethyl acrylate copolymer; an unsaturated carboxylic acid-modified thermoplastic copolymer (such as an olefin copolymer modified with maleic acid, maleic anhydride, acrylic acid, methacrylic acid, itaconic acid or the like) or a metal-modified product thereof, and a mixture containing any combinations of the above-exemplified unsaturated carboxylic acid-modified thermoplastic copolymers and/or the metal-modified products thereof; and a resin blend containing a thermoplastic polyurethane elastomer. There is no limitation with respect to the thickness of the adhesive layer, and the thickness may be appropriately selected depending on the purpose and use of the layer. However, the thickness of the adhesive layer is preferably in the range of from 0.1 to 100 μm, more preferably from 0.5 to 50 μm.

The multilayer film or multilayer sheet of the present invention may comprise a gas barrier resin layer (a gas barrier layer). As an example of gas barrier resins, there can be mentioned a resin which, in the form of a film having a thickness of 25 μm, exhibits an oxygen permeability of 100 $cc/m^2 \cdot 24$ hr·atm or less, preferably 50 $cc/m^2 \cdot 24$ hr·atm or less, as measured at 23° C. under a relative humidity of 65%. Specific examples of gas barrier resins include a vinylidene chloride copolymer (PVDC), an ethylene/vinyl alcohol copolymer (EVOH), an aromatic nylon and an amorphous nylon (such as a polyamide produced from meta-xylylenediamine), and a copolymer composed of mainly of acrylonitrile. Further examples of gas barrier resins include a vinylidene chloride copolymer resin composition which is composed mainly of a vinylidene chloride copolymer and which further contains at least one copolymer (such as a copolymer of ethylene with vinyl acetate, or an unsaturated acid, e.g., acrylic acid or methacrylic acid; a copolymer of ethylene with an alkyl ester of such an unsaturated acid; or at least one copolymer of an MBS (methylmethacrylate/butadiene/styrene) resin) other than the vinylidene chloride copolymer; a resin composition which is composed mainly of an ethylene/vinyl alcohol copolymer having a saponification ratio of 95 mol % or more (an ethylene/vinyl alcohol copolymer is produced by saponification of an ethylene/vinyl acetate resin, and the saponification ratio means the mol % of the vinyl acetate monomer units which are saponified), and which further contains at least one polymer (such as a polyester elastomer, a polyamide elastomer, an ethylene/vinyl acetate copolymer, an ethylene/acrylic ester copolymer, and an ethylene/vinyl alcohol copolymer having a saponification ratio of less than 95 mol %) other than the ethylene-vinyl alcohol copolymer having a saponification ratio of 95 mol % or more; and a resin composition comprising the above-mentioned aromatic nylon or amorphous nylon, and an aliphatic nylon. Further, when the gas barrier layer is required to have flexibility, it is especially preferred to use an ethylene/vinyl alcohol copolymer.

When it is necessary to improve the adhesion between the gas barrier layer and an adjacent layer, an adhesive layer may be formed between the gas barrier layer and the adjacent layer.

There is no particular limitation with respect to the thickness of the gas barrier layer, and the thickness may be appropriately selected depending on type of the article to be wrapped or packaged by the multilayer film or sheet, or the purpose of the use of the multilayer film or sheet. However, the thickness of the gas barrier layer is generally in the range of from 0.1 to 500 μm, preferably 1 to 100 μm, more preferably 5 to 50 μm. For example, when the multilayer film or sheet having a gas barrier layer composed of polyvinylidene chloride is produced by co-extrusion, it is preferred that the thickness of the gas barrier layer is 30% or less, based on the thickness of the film, from the viewpoint of heat stability and low temperature resistance of the multilayer film or sheet. Specifically, for example, with respect to a multilayer film which is composed of a layer of the hydrogenated copolymer of the present invention and a layer of polyvinylidene chloride, and which multilayer film has a thickness of 100 μm, the thickness of the polyvinylidene chloride layer may be approximately 20 μm.

The multilayer film or multilayer sheet of the present invention, which comprises the gas barrier layer, exhibits not only the above-mentioned excellent properties of the hydrogenated copolymer of the present invention, but also oxygen barrier property. By wrapping or packaging food, a precise machine and the like with the above-mentioned multilayer film or multilayer sheet comprising the gas barrier layer, it becomes possible to alleviate the quality lowering (degradation, decay, oxidization and the like) of food, a precise machine and the like. The above-mentioned multilayer film or multilayer sheet can be formulated into a container which has oxygen barrier property.

With respect to the multilayer film of the present invention which is used as a heat shrinkable film, it is preferred that the multilayer film exhibits a heat shrinkage ratio of from 20 to 200%, as measured in at least one direction selected from the lengthwise direction and widthwise direction of the film at a specific temperature selected from the range of from 40 to 100° C. When the heat shrinkage ratio is less than 20%, the low temperature shrinkability of the film becomes unsatisfactory, so that the film is likely to suffer wrinkling and sagging after the shrinking treatment. On the other hand, when the heat shrinkage ratio exceeds 200%, the heat shrinkable film is likely to shrink during the storage of the film, thereby causing a change in the dimension of the film.

The multilayer film or multilayer sheet of the present invention is generally produced by molding method, such as co-extrusion method using an inflation film production apparatus, a T-die film production apparatus or the like, or extrusion coating method (which is also referred to as "extrusion lamination method"). The multilayer film or multilayer sheet of the present invention can also be produced by laminating together single-layer or multilayer films or sheets (which are obtained by using any of the above-mentioned apparatuses) by conventional method, such as dry lamination method, sandwich lamination method or hot melt lamination method. Further, when the multilayer film or multilayer sheet of the present invention is a heat shrinkable film, there is no particular limitation with respect to the method for producing the film, and any of the conventional methods for producing a stretched film may be employed. Specifically, for example, a heat shrinkable film can be obtained by stretching a multilayer film or sheet (produced by T-die extrusion method, tubular extrusion method, inflation extrusion method or the like) by stretching method, such as uniaxial stretching, biaxial stretching or multiaxial stretching. Specific examples of methods for the uniaxial stretching include a method in which an extruded sheet is stretched in a direction perpendicular to an extrusion direction using a tenter, and a method in which an extruded tubular film is stretched in a radial direction as viewed from the central axis of the tubular film. Specific examples of methods for the biaxial stretching include a method in which an extruded sheet is stretched in an extrusion direction using a roll, followed by stretching in a direction perpendicular to the extrusion direction using a tenter, and a method in which an extruded tubular film is stretched in a radial direction (as viewed from the central axis of the tubular film) and in an extrusion direction simultaneously or in a stepwise manner. If desired, the obtained multilayer film or multilayer sheet may be subjected to treatment, such as heat setting, corona treatment and plasma treatment.

Further, at least one layer of the multilayer film or multilayer sheet of the present invention may be crosslinked. The crosslinking can be effected by conventional method using an electron beam, a γ-ray or a peroxide. In the production of the multilayer film or the multilayer sheet, the lamination of the component films or sheets may be conducted after the crosslinking of a component sheet or film.

There is no limitation with respect to the use of the multilayer film or multilayer sheet of the present invention. For example, the multilayer film or multilayer sheet of the present invention can be used for producing a wrapping film, a bag, a pouch and the like. In the case of a multilayer film having excellent stretch property, such a multilayer film can be advantageously used as a stretched film for wrapping foods, a palette stretch film, a protective film and the like. In the case of a multilayer film having a gas barrier property, such a multilayer film can be advantageously used for forming a package for foods, beverages, precision machines, drugs and the like. In the case of a heat shrinkable multilayer film, such a multilayer film can be advantageously used as a shrink wrap, a shrink label and the like.

(v) Building Material

The hydrogenated copolymer or hydrogenated copolymer composition of the present invention can also be used as a building material. In this case, it is preferred to add a filler and/or a flame retardant to the hydrogenated copolymer or hydrogenated copolymer composition of the present invention. The building material comprising the hydrogenated copolymer or hydrogenated copolymer composition of the present invention has excellent properties, such as high abrasion resistance, scratch resistance and tensile property. Particularly, the building material of the present invention can be advantageously used as a flooring material, a wall material, a ceiling material, a sealing material and the like. Further, the building material of the present invention can also be advantageously used as a shaped foam.

When the hydrogenated copolymer composition of the present invention (comprising the hydrogenated copolymer (a), and the thermoplastic resin (b) and/or the rubbery polymer (b)) is used for producing the building material, the component (a)/component (b) weight ratio in the hydrogenated copolymer composition is generally in the range of from 100/0 to 5/95, preferably from 95/5 to 10/90, more preferably from 95/5 to 20/80.

The building material of the present invention may contain a filler. As the filler, any of those which are exemplified as component (j) in item (iii) above for the "foam" may be used.

The building material of the present invention may contain a flame retardant (hereinafter, frequently referred to as "component (l)"). Examples of flame retardants include a halogen type flame retardant, such as a bromine-containing compound; a phosphorus type flame retardant, such as a phosphorus-containing aromatic compound; and an inorganic flame retardant, such as a metal hydroxide.

Examples of halogen type flame retardants include tetrabromoethane, octabromodiphenyl oxide, decabromodiphenyl oxide, hexabromocyclododecane, tribromoneopentyl alcohol, hexabromobenzene, decabromodiphenylethane, tris (tribromophenoxy) S-triazine, tris (2,3-dibromopropyl) isocyanurate, bis (tribromophenoxy) ethane, ethylenebis (tetrabromophthalimide), hexabromobenzene, pentabromoethylbenzene, hexabromobiphenyl, decabromodiphenyl oxide, pentabromochiorocyclohexane, a tetrabromobisphenol A-carbonate oligomer, a tetrabromobisphenol A-bisphenol A oligomer, tetrabromobisphenol S, tris(2,3-dibromopropyl-1-)isocyanurate, 2,2-bis-[4-(2,3-dibromopropoxy)-3,5-dibromophenyl]propane, a halogenated epoxy resin, antimony silicon oxide, tris(chloroethyl) phosphate, tris(monochloropropyl) phosphate, tris (dichloropropyl) phosphate, bis (2,3-dibromopropyl) phosphate, tris(2-bromo-3-chloropropyl) phosphate, tris (bromocresyl) phosphate, tris(tribromophenyl) phosphate, tris(dibromophenyl) , tris(tribromoneopentyl) phosphate, diethyl-N,N-bis (2-hydroxyethyl) aminomethyl phosphate, a halogenated phosphoric ester, a chlorinated paraffin, a chlorinated polyethylene, perchlorocyclopentadecanone, tetrabromobisphenol A, tetrabromophtahalic anhydride, dibromoneopentyl alcohol, tribromophenol, pentabromobenzyl polyacrylate, chlorendic acid, dibromocresyl glycidyl ether, di-bromophenyl glycidyl ether, chloretone acid anhydride, and tetrachlorophthalic anhydride.

However, in the present invention, it is preferred to use a flame retardant which contains substantially no halogen.

Specific examples of such flame retardants include phosphorus type flame retardants, such as triphenyl phosphate, tricresyl phosphate, trixylenyl phosphate, cresyldiphenyl phosphate, xylenyldiphenyl phosphate, resorcinol-bis (diphenyl phosphate), 2-ethylhexyldiphenyl phosphate, dimethylmethyl phosphate, triallyl phosphate, condensation products of these phosphates, ammonium phosphate or a condensation product thereof, diethyl N,N-bis(2-hydroxyethyl) aminomethyl phosphonate, magnesium hydroxide, aluminum hydroxide, zinc borate, barium borate, kaolin-clay, calcium carbonate, alunite, basic magnesium carbonate, calcium hydroxide, red phosphorus, a guanidine compound, a melamine compound, antimony trioxide, antimony pentoxide, sodium antimonate and a silicone resin.

In recent years, in order to avoid environmental problems, inorganic flame retardants are mainly used as the flame retardant. Representative examples of preferred inorganic flame retardants include water-containing metal compounds, such as metal hydroxides (e.g., magnesium hydroxide, aluminum hydroxide and calcium hydroxide), zinc borate and barium borate, calcium carbonate, clay, basic magnesium carbonate and hydrotalcite. Among the above-exemplified inorganic flame retardants, a metal hydroxide, such as magnesium hydroxide, is preferred for effectively improving the flame retardancy of the building material. Further, the above-exemplified flame retardants include the so-called auxiliary flame retardant, which per se has the poor ability to improve flame retardancy, but exhibits a synergistic effect when used in combination with the flame retardant.

Each of the filler and the flame retardant which are used in the building material of the present invention may be surface-treated with a silane coupling agent or the like before it is mixed with other components for the building material.

The amount of the filler and/or the flame retardant is generally in the range of from 5 to 95% by weight, preferably from 10 to 80% by weight, more preferably from 20 to 70% by weight, based on the weight of the hydrogenated copolymer or the hydrogenated copolymer composition. If desired, two or more different fillers may be used in combination, and two or more different flame retardants may be used in combination. Further, the filler and the flame retardant may be used in combination. When the filler and the flame retardant are used in combination, it is preferred that the total amount of the filler and the flame retardant is within the above-mentioned range.

The building material of the present invention, if desired, may further contain any of the conventional additives other than mentioned above. There is no limitation with respect to the type of the additive so long as it is an additive which is generally used in combination with a thermoplastic resin or a rubbery polymer. Examples of additives include a pigment or a coloring agent, such as carbon black or titanium oxide; a lubricant, such as stearic acid, behenic acid, zinc stearate, calcium stearate, magnesium stearate or etylenebisstearoamide; a mold release agent; an organic polysiloxane; an aliphatic acid ester, such as a phthalic ester, an adipic ester and an azelaic ester; a plasticizer, such as a mineral oil; an antioxidant, such as a hindered phenol type antioxidant and a phosphorus type antioxidant; a hindered amine type light stabilizer; a benzotriazole type ultraviolet absorber; an antistatic agent; a reinforcing filler, such as an organic fiber, a glass fiber, a carbon fiber and a metal whisker; and mixtures thereof.

The building material of the present invention, if desired, may be crosslinked using a crosslinking agent. Examples of methods for the crosslinking include a chemical method which uses a crosslinking agent, such as peroxide and sulfur, and optionally an auxiliary crosslinking agent, and a physical method which uses an electron beam or a radiation. The crosslinking may be conducted either in a static manner in which the crosslinking reaction is caused by irradiation without stirring the reaction system, or in a dynamic manner in which the crosslinking reaction system is stirred. As the crosslinking agent, it is possible to use any of the organic peroxides mentioned above as component (e). Further, it is also possible to use the above-mentioned component (f) as a vulcanization accelerator, optionally in combination with the above-mentioned component (g) and/or component (h). The crosslinking agent is generally used in an amount of from 0.01 to 20 parts by weight, preferably from 0.1 to 15 parts by weight, relative to 100 parts by weight of the hydrogenated copolymer or the hydrogenated copolymer composition.

Furthermore, the building material of the present invention may be in the form of a foam (i.e., a foamed building material). The foamed building material is advantageous in that it has a light weight, an improved flexibility, an improved design and the like. Examples of methods for obtaining a foamed building material include a chemical method which uses a chemical foaming agent, such as an inorganic foaming agent and an organic foaming agent; and a physical method which uses a physical foaming agent. In each of these methods, bubbles are formed throughout the building material by addition of a foaming agent. As the foaming agent, it is Possible to use any of those which are mentioned as component (k) in item (iii) above for the "foam". The amount of the foaming agent is generally in the range of from 0.1 to 8 parts by weight, Preferably from 0.3 to 6 parts by weight, more Preferably from 0.5 to 5 parts by weight, relative to 100 parts by weight of the hydrogenated copolymer or the hydrogenated copolymer composition.

The building material of the present invention can be advantageously used as various molded articles, such as an injection-molded article, a blow-molded article, an air-pressure-molded article, a vacuum-molded article and an extrusion-molded article, which may have various shapes, such as a sheet and a film. For improving the various properties (such as appearance, abrasion resistance, weatherability and scratch resistance) of the molded article of the building material of the present invention, the surface of the molded article may be treated by printing, coating, embossing or the like.

The building material of the present invention is suitable for printing and coating (that is, the building material has excellent printing property and coating property), as compared to a resin produced only from olefin monomers. However, for further improving the printing property and coating property of the building material, the building material may be subjected to surface treatment. Examples of surface treatments include a corona discharge treatment, an ozone treatment, a plasma treatment, a flame treatment, and acid/alkali treatment. Among these treatments, a corona discharge treatment is preferred from the viewpoint of ease in practice and cost, and in view of the fact that the corona discharge treatment can be conducted in a continuous manner.

When the building material of the present invention is in the form of a shaped article having a planar structure, such as a film, a sheet, a tile or a board, which is used as a flooring material, a wall material, a ceiling material or the like, the building material may have a monolayer structure or a multilayer structure. Also when the building material of the present invention is in the form of a shaped article other than mentioned above, the building material, if desired, may have a multilayer structure. When the building material has a multilayer structure, for example, the building material may have layers which are different with respect to the composition, distribution of components, molecular weight and molecular weight distribution of the hydrogenated copolymer or hydrogenated copolymer composition of the present invention, and/or with respect to the type and amount of the filler or flame retardant used in the building material of the present invention. Such a multilayer building material may further comprise a layer of a resin or resin composition other than the hydrogenated copolymer or hydrogenated copolymer composition of the present invention and/or a layer of a material other than the building material of the present invention.

There is no limitation with respect to the use of the building material of the present invention. For example, when the building material is used as a flooring material, a wall material or a ceiling material, the building material may be used in the form of a coating material for coating the surface of a structural material made of a concrete, a metal, a wood or the like. In such a case, the building material of the present invention is provided in the form of a sheet, a film, a tile, a board or the like, and the building material is bonded to a substrate, such as a structural material, by using an adhesive agent, an adhesive material, a nail, a screw or the like. Further, the building material of the present invention may be used as a sealing material (such as a gasket). Specifically, for example, the building material of the present invention can be used as a flooring material, such as a tile, an inner wall material, a material for an inner wall of a ceiling, and a window frame gasket, which are used in general housings, office buildings, commercial or public facilities, and the like.

(vi) Vibration Damping, Soundproofing Material

The hydrogenated copolymer or hydrogenated copolymer composition of the present invention can also be advantageously used as a vibration damping, soundproofing material. When the hydrogenated copolymer or hydrogenated copolymer composition is used as the vibration damping, soundproofing material, it is preferred to add a filler and/or a flame retardant to the hydrogenated copolymer or hydrogenated copolymer composition of the present invention. The vibration damping, soundproofing material of the present invention not only has excellent flexibility, but also has various other excellent properties, such as high vibration damping property, soundproofing property, abrasion resistance, scratch resistance, and strength.

When the hydrogenated copolymer composition of the present invention (comprising the hydrogenated copolymer (a), and the thermoplastic resin (b) and/or the rubbery polymer (b)) is used for producing the vibration damping, soundproofing material, the component (a)/component (b) weight ratio in the hydrogenated copolymer composition is generally in the range of from 100/0 to 5/95, preferably from 95/5 to 10/90, more preferably from 95/5 to 20/80.

The vibration damping, soundproofing material of the present invention may further contain a filler and/or a flame retardant. As the filler, it is possible to use any of those which are exemplified as component (j) in item (iii) above for the "foam". As the flame retardant, it is possible to use any of those which are exemplified as component (l) in item (iv) for the "building material". The preferred flame retardants are also the same as mentioned above in connection with the building material.

Each of the filler and the flame retardant which are used in the vibration damping, soundproofing material of the present invention may be surface-treated with a silane coupling agent or the like before it is mixed with other components for the vibration damping, soundproofing material.

The amount of the filler and/or the flame retardant is generally in the range of from 5 to 95% by weight, preferably from 10 to 80% by weight, more preferably from 20 to 70%, based on the weight of the hydrogenated copolymer or the hydrogenated copolymer composition. If desired, two or more different fillers may be used in combination, and two or more different flame retardants may be used in combination. Further, the filler and the flame retardant may be used in combination. When the filler and the flame retardant are used in combination, it is preferred that the total amount of the filler and the flame retardant is within the above-mentioned range.

The vibration damping, soundproofing material of the present invention, if desired, may further contain any of the conventional additives other than mentioned above. There is no limitation with respect to the type of the additive so long as it is an additive which is generally used in combination with a thermoplastic resin or a rubbery polymer. As examples of additives, there can be mentioned various additives described in the above-mentioned "Gomu Purasuchikku Haigou Yakuhin (Additives for Rubber and Plastic)" (Rubber Digest Co., Ltd., Japan).

The vibration damping, soundproofing material of the present invention, if desired, may be crosslinked. As examples of methods for crosslinking, there can be mentioned a chemical crosslinking method which uses a crosslinking agent (such as a peroxide or sulfur) and optionally an auxiliary crosslinking agent; and a physical crosslinking method which uses an electron beam, a radiation or the like. The crosslinking may be conducted either in a static manner in which the crosslinking reaction is caused by irradiation without stirring the reaction system, or in a dynamic manner in which the crosslinking reaction system is stirred. As the crosslinking agent, it is possible to use any of the organic peroxides mentioned above as component (e). Further, it is also possible to use the above-mentioned component (f) as a vulcanization accelerator, optionally in combination with the above-mentioned component (g) and/or component (h). The crosslinking agent is generally used in an amount of from 0.01 to 20 parts by weight, preferably from 0.1 to 15 parts by weight, relative to 100 parts by weight of the hydrogenated copolymer or the hydrogenated copolymer composition.

Further, the vibration damping, soundproofing material of the present invention may be in the form of a foam (i.e., a foamed, vibration damping, soundproofing material). The foamed, vibration damping, soundproofing material is advantageous in that it has a light weight, an improved flexibility, an improved design and the like. Examples of methods for obtaining a foamed, vibration damping, soundproofing material include a chemical method which uses a chemical foaming agent, such as an inorganic foaming agent and an organic foaming agent; and a physical method which uses a physical foaming agent. In each of these methods, bubbles are formed throughout the vibration damping, soundproofing material by addition of a foaming agent. As the foaming agent, it is possible to use any of those which are mentioned as component (k) in item (iii) above for the "foam". The amount of the foaming agent is generally in the range of from 0.1 to 8 parts by weight, preferably from 0.3 to 6 parts by weight, more preferably from 0.5 to 5 parts by weight, relative to 100 parts by weight of the hydrogenated copolymer or hydrogenated copolymer composition of the present invention.

The vibration damping, soundproofing material of the present invention can be advantageously used as various molded articles, such as an injection-molded article, a blow-molded article, an air-pressure-molded article, a vacuum-molded article and an extrusion-molded article, which may have various shapes, such as a sheet and a film. For improving the various properties (such as appearance, abrasion resistance, weatherability and scratch resistance) of the molded article of the vibration damping, soundproofing material of the present invention, the surface of the molded article may be treated by printing, coating, embossing or the like.

The vibration damping, soundproofing material of the present invention is suitable for printing and coating (that is, the vibration damping, soundproofing material has excellent printing property and coating property), as compared to a resin produced only from olefin monomers. However, for further improving the printing property and coating property of the vibration damping, soundproofing material, the surface of the vibration damping, soundproofing material may be subjected to preliminary treatment. Examples of preliminary treatments include a corona discharge treatment, an ozone treatment, a plasma treatment, a flame treatment, and acid/alkali treatment. Among these treatments, a corona discharge treatment is preferred from the viewpoint of ease in practice and cost, and in view of the fact that the corona discharge treatment can be conducted in a continuous manner.

When the vibration damping, soundproofing material of the present invention is in the form of a shaped article having a planar structure, such as a film, a sheet, a tile or a board, which is used as a flooring material, a wall material, a ceiling material or the like, the vibration damping, soundproofing material may have a single-layer structure or a multilayer structure. Also when the vibration damping, soundproofing material of the present invention is in the form of a shaped article other than mentioned above, the vibration damping, soundproofing material, if desired, may have a multilayer structure. When the vibration damping, soundproofing material has a multilayer structure, for example, the vibration damping, soundproofing material may have layers which are different with respect to the composition, distribution of components, molecular weight and molecular weight distribution of the hydrogenated copolymer or hydrogenated copolymer composition of the present invention, and/or with respect to the type and amount of the filler or flame retardant used in the vibration damping, soundproofing material of the present invention. Such a multilayer, vibration damping, soundproofing material may further comprise a layer of a resin or resin composition other than the hydrogenated copolymer or hydrogenated copolymer composition of the present invention and/or a layer of a material other than the vibration damping, soundproofing material of the present invention. By the use of such layers of different materials, the multilayer, vibration damping, soundproofing material exhibits excellent vibration damping property and soundproofing property within a wide temperature range.

(vii) Electric Wire Coating Material

The hydrogenated copolymer or hydrogenated copolymer composition of the present invention can be used as an electric wire coating material. In such use, it is preferred that the hydrogenated copolymer or hydrogenated copolymer composition contains a filler and/or a flame retardant. The electric wire coating material of the present invention has excellent insulating property, excellent flexibility and excellent peelability, so that the electric wire coating material of the present invention can be advantageously used as a coating material for an electric wire, a power cable, a communication cable, a power transmission line and the like.

In the electric wire coating material of the present invention, the weight ratio of the above-mentioned component (a) to the above-mentioned component (b) is generally from 100/0 to 5/95, preferably from 95/5 to 10/90, more preferably from 95/5 to 20/80.

As the filler for use in the electric wire coating material of the present invention, any one of the fillers (component (j)) which are exemplified in item (iii) above for the "foam" can be used. On the other hand, as the flame retardant for use in the electric wire coating material, any one of the flame retardants (component (l)) which are exemplified in item (v) above for the "building material" can be used. Preferred examples of flame retardants used in the electric wire coating material are the same as the preferred flame retardants exemplified in item (v) above for the "building material".

The filler and flame retardant used in the electric wire coating material of the present invention may be subjected, prior to use, to a surface treatment with a silane coupling agent or the like.

The amount of the filler and/or the flame retardant is generally in the range of from 5 to 95% by weight, preferably from 10 to 80% by weight, more preferably from 20 to 70% by weight, based on the weight of the hydrogenated copolymer or hydrogenated copolymer composition. If desired, two or more different fillers may be used in combination, and two or more different flame retardants may be used in combination. Further, the filler and the flame retardant may be used in combination. When the filler and the flame retardant are used in combination, the total amount of the filler and the flame retardant is preferably within the above-mentioned range.

If desired, the electric wire coating material of the present invention may optionally contain an additive. With respect to the additive, there is no particular limitation, and any additives which are conventionally used in thermoplastic resins or rubbery polymers can be used. For example, the additives as described in the above-mentioned "Gomu Purasuchikku Haigou Yakuhin (Additives for Rubber and Plastic)" (Rubber Digest Co., Ltd., Japan) can be used.

If desired, the electric wire coating material of the present invention may be crosslinked. The crosslinked, electric wire coating material is more advantageous than non-crosslinked, with respect to the following points. In the crosslinked, electric wire coating material, the lowering of the dielectric breakdown voltage due to an impulse current applied to the material is more effectively suppressed than in the case of the non-crosslinked electric wire coating material. Further, the crosslinked, electric wire coating material can stand a large number of impulse current applications thereto without suffering from dielectric breakdown, as compared to the case of the non-crosslinked electric wire coating material. As examples of methods for crosslinking the electric wire coating material, there can be mentioned a chemical crosslinking method comprising addition of a crosslinking agent (such as a peroxide or sulfur) and optionally an auxiliary crosslinking agent, and a physical crosslinking method which utilizes an electron beam, a radiation or the like. In the crosslinking of the electric wire coating material, either static crosslinking or dynamic crosslinking can be employed. Examples of crosslinking agents include an organic peroxide (i.e., the above-mentioned component (e)) and a vulcanization accelerator (i.e., the above-mentioned component (f)). Further, these crosslinking agents can be used in combination with the above-mentioned components (g) and (h). The amount of the crosslinking agent is generally from 0.01 to 20 parts by weight, preferably from 0.1 to 15 parts by weight, relative to 100 parts by weight of the hydrogenated copolymer or hydrogenated copolymer composition of the present invention.

Further, the electric wire coating material of the present invention can be processed into a foam (i.e., a foamed, electric wire coating material). The foamed, electric wire coating material is advantageous in that it has a light weight, an improved flexibility, an improved design and the like. Examples of methods for obtaining the foamed, electric wire coating material of the present invention include a chemical method using a chemical foaming agent (such as an inorganic foaming agent or an organic foaming agent), and a physical method using a physical foaming agent or the like. In each of these methods, bubbles can be formed throughout the electric wire coating material by addition of a foaming agent to the electric wire coating material. Specific examples of foaming agents include any one of the foaming agents (component (k)) exemplified in item (iii) above for the "foam". The amount of the foaming agent is generally from 0.1 to 8 parts by weight, preferably from 0.3 to 6 parts by weight, more preferably from 0.5 to 5 parts by weight, relative to 100 parts by weight of the hydrogenated copolymer or hydrogenated copolymer composition of the present invention.

(viii) High Frequency Welding Composition

By using the hydrogenated copolymer of the present invention, it is possible to prepare a high frequency welding composition having the following composition α or β:

α) 100 parts by weight of the hydrogenated copolymer of the present invention, and 1 to 50 parts by weight of at least one member selected from the group consisting of an ethylene/acrylate copolymer, an ethylene/vinyl acetate copolymer, and a polymeric compound having a hydroxyl group in a molecular chain thereof (hereinafter, this component is frequently referred to as "component (m)"), or;

β) 100 parts by weight of the hydrogenated copolymer of the present invention, 1 to 50 parts by weight of the component (m), and 5 to 150 parts by weight of at least one member selected from the group consisting of a thermoplastic resin other than the component (m) and a rubbery polymer other than the component (m).

In the present invention, the term "high frequency welding composition" means a composition which is susceptible to welding by the use of a high frequency wave or a microwave, that is, a composition which is effectively susceptible to a high frequency weld molding.

From the viewpoint of the flexibility and sealability, high frequency welding property and extrusion moldability of the high frequency welding composition (especially the high frequency welding property and extrusion moldability of the high frequency welding composition), it is preferred that the ethylene/acrylate copolymer used in the high frequency welding composition has an acrylate content of 5% by weight or more, more advantageously from 5 to 20% by weight. Specific examples of acrylates used in the ethylene/acrylate copolymer include methyl acrylate, ethyl acrylate, butyl acrylate and 2-ethylhexyl arcylate. Of these acrylates, ethyl acrylate is most preferred.

From the viewpoint of the flexibility and sealability, high frequency welding property and extrusion moldability of the high frequency welding composition (especially the high frequency welding property and extrusion moldability of the high frequency welding composition), it is preferred that the ethylene/vinyl acetate copolymer used in the high frequency welding composition has a vinyl acetate content of 5% by weight or more, more advantageously from 5 to 20% by weight.

Specific examples of compounds having a hydroxyl group in a molecular chain thereof include a polyhydric alcohol, a phenolic compound, a vinyl alcohol resin, a resin having a hydroxyl group at both terminals thereof, and a hydroxyl group-grafted polyolefin resin.

The term "polyhydric alcohol" means a compound having two or more hydroxyl groups in a molecule thereof. Specific examples of polyhydric alcohols include a polyethylene glycol, a polypropylene glycol, 1,3-propane diol, 1,6-hexanediol, 2,5-hexandiol, 3,4-hexanediol, pentaerythritol, dipentaerythritol, tripentaerythritol, glycerol, trimethylolethane, trimethylolpropane, ennea heptitol anhydride, 1,2,4-butanetriol, 1,2,6-hexanetriol, pentitols (e.g., ribitol, arabinitol, D-arabinitol, L-arabinitol, D,L-arabinitol and xylitol), hexitols (e.g., allitol, dulcitol, galactitol, glucitol, D-glucitol, L-glucitol, D,L-glucitol, D-mannitol, L-mannitol, D,L-mannitol, altritol, D-altritol, L-altritol, D,L-altritol, iditol, D-iditol and L-iditol), tetrytols (erythritol, threitol, D-threitol, L-threitol and D,L-threitol), maltitol and lactitol. Of these polyhydric alcohols, especially preferred are a polyethylene glycol, pentaerythritol, glycerol and trimethylolpropane.

The term "phenolic compound" means an aromatic compound having at least one hydroxyl group in a molecule thereof. Specific examples of phenolic compounds include phenol, o-cresol, m-cresol, p-cresol, 3,5-xylenol, carvacrol, thymol, α-naphthol, β-naphthol, catechol, resorcin, hydroquinone, dimethylolphenol, pyrogallol and phloroglucin. Of these phenolic compounds, preferred are dihydric phenols, such as catechol and dimethylolphenol, and trihydric phenols, such as pyrogallol.

Specific examples of vinyl alcohol resins include a polyvinyl alcohol resin (PVA) obtained by saponifying a vinyl acetate resin with caustic soda, caustic potash or the like; and an α-olefin/vinyl acetate copolymer saponification resin obtained by subjecting a copolymer of an α-olefin (such as ethylene or propylene) and vinyl acetate to a saponification reaction. In the production of the α-olefin/vinyl acetate copolymer saponification resin, from the viewpoint of easy polymerization, ethylene is generally used as the α-olefin. An ethylene/vinyl alcohol copolymer resin (EVOH) is well known and is obtained by subjecting an ethylene/vinyl acetate resin to substantially the same saponification reaction as in the production of the above-mentioned polyvinyl alcohol resin (PVA). With respect to the PVA, various types of this resin are commercially available. Examples of commercially available products of PVA's include "Poval" (trade name of PVA, manufactured and sold by Kuraray Co., Ltd., Japan) and "Gohsenol" (trade name of PVA, manufactured and sold by The Nippon Synthetic Chemical Industry Co., Ltd., Japan). With respect to the EVOH, as a preferred example of this resin, there can be mentioned a saponification resin having a saponification ratio of from 30 to 100%, which is obtained by subjecting an ethylene/vinyl acetate copolymer having an ethylene content of from 15 to 90 mol % to a saponification reaction. Such EVOH's are also commercially available. Examples of commercially available products of such EVOH's include "EVAL" (trade name of EVOH, manufactured and sold by Kuraray Co., Ltd., Japan) and "SOARNOL" (trade name of EVOH, manufactured and sold by The Nippon Synthetic Chemical Industry Co., Ltd., Japan).

The term "resin having hydroxyl groups at both terminals thereof" means a hydrocarbon polymer (such as a polybutadiene, a polyisoprene or a petroleum resin) having a hydroxyl group or a carboxyl group at both terminals thereof. The molecular weight of the resin is preferably 10,000 or less, more preferably 5,000 or less. Various types of such resin are commercially available. Examples of commercially available products of such resins include "Polytail H" (trade name thereof, manufactured and sold by Mitsubishi Chemical Corporation, Japan) and "Epol" (trade name thereof, manufactured and sold by Idemitsu Petrochemical Co., Ltd., Japan).

The term "hydroxyl group-grafted polyolefin resin" means a graft modified polyolefin obtained by grafting a hydroxyl group onto a polyolefin (such as a polypropylene) by using an organic peroxide or the like. Examples of commercially available products of hydroxyl group-grafted polyolefin resins include "Umex" (trade name thereof, manufactured and sold by Sanyo Chemical Industries, Ltd., Japan).

The above-mentioned components (m) can be used individually or in combination.

If desired, the high frequency welding composition of the present invention may optionally contain an additive. With respect to the additive, there is no particular limitation, and any additives which are conventionally used in thermoplastic resins or rubbery polymers can be used. For example, the additives as described in the above-mentioned "Gomu Purasuchikku Haigou Yakuhin (Additives for Rubber and Plastic)" (Rubber Digest Co., Ltd., Japan) can be used.

The high frequency welding composition of the present invention not only has excellent flexibility, abrasion resistance and scratch resistance, but also is susceptible to welding by the use of a high frequency wave or a microwave. The high frequency welding composition (which may or may not contain an additive) can be advantageously used as various shaped articles (such as a sheet, a film, a nonwoven fabric shaped article, and a fibrous shaped article) produced by a method selected from the group consisting of an injection molding, a blow molding, air-pressure molding, a vacuum molding and an extrusion molding. The shaped articles can be used in various fields, such as materials for food packages; material for medical instruments; home electric appliances and parts thereof; raw materials for automobile parts, industrial components, household goods and toys; and raw materials for footwear. In the use of the shaped articles, the shaped articles can be welded to substrates by high frequency welding.

(ix) Slush Molding Material

The hydrogenated copolymer or hydrogenated copolymer composition of the present invention can be used as a slush molding material. More specifically, the hydrogenated copolymer or hydrogenated copolymer composition of the present invention can be used as a slush molding material having excellent processability and excellent scratch resistance, which can be advantageously used as a raw material for surface skins of car interior goods, such as an instrument panel. Further, a slush molding powder comprising the slush molding material, and a surface skin material comprising the slush molding material and the slush molding powder can be used in various fields.

As the slush molding material of the present invention, it is preferred to use the hydrogenated copolymer composition of the present invention, which comprises the hydrogenated copolymer (a) of the present invention and a thermoplastic resin (b) and/or a rubbery polymer (b). In the hydrogenated copolymer composition as the slush molding material, the component (a)/component (b) weight ratio is generally in the range of from 50/50 to 97/3, preferably from 70/30 to 95/5, more preferably from 80/20 to 90/10.

If desired, the slush molding material of the present invention may optionally contain an additive. With respect to the additive, there is no particular limitation, and any additives which are conventionally used in thermoplastic resins or rubbery polymers can be used. For example, the additives as described in the above-mentioned "Gomu Purasuchikku Haigou Yakuhin (Additives for Rubber and Plastic" (Rubber Digest Co., Ltd., Japan) can be used.

For the purpose of not only maintaining the moldability of the slush molding material, but also imparting excellent thermal resistance to the slush molding material, it is preferred to crosslink the hydrogenated copolymer composition (which comprises the components (a) and (b)) in the presence of a crosslinking agent, such as an organic peroxide, to obtain a crosslinked product. The gelation ratio of the crosslinked product is preferably in the range of from 50 to 98%, more preferably from 70 to 95%. In the present invention, the gelation ratio of the crosslinked product is obtained as follows. A sample of the crosslinked product is placed in a bottle in an amount of 5 mg (this weight is hereinafter referred to as $W_1$). To the bottle is added 50 ml of toluene. The resultant mixture in the bottle is heated at 120° C. for 12 hours by using an aluminum block bath, thereby effecting extraction. Then, the resultant mixture in the bottle is subjected to filtration using a stainless steel wire net to thereby obtain a filtration residue on the stainless steel wire net. The filtration residue is dried at 105° C. for five hours to obtain a dried residue. The dried residue is accurately weighed (this weight is hereinafter referred to as $W_2$). The gelation ratio of the crosslinked product is calculated by the following formula:

$$\text{Gelation ratio } (\%) = (W_2/W_1) \times 100$$

The crosslinking agent is used for introducing a crosslinked structure into the hydrogenated copolymer composition, thereby imparting excellent thermal resistance to the hydrogenated copolymer composition. Examples of crosslinking agents include an organic peroxide (i.e., the above-mentioned component (e)) and a vulcanization accelerator (i.e., the above-mentioned component (f)). Further, these crosslinking agents can be used in combination with the above-mentioned components (g) and (h). The amount of the crosslinking agent (such as an organic peroxide) is generally from 0.1 to 7 parts by weight, preferably from 0.5 to 5 parts by weight, relative to 100 parts by weight of the hydrogenated copolymer composition. The amount of the auxiliary crosslinking agent (such as the component (g)) is generally from 0.03 to 5 parts by weight, preferably from 0.05 to 4 parts by weight, relative to 100 parts by weight of the hydrogenated copolymer composition.

Examples of methods for introducing a crosslinked structure into the hydrogenated copolymer composition include a method in which the hydrogenated copolymer composition, a crosslinking agent (such as an organic peroxide) and optionally an auxiliary crosslinking agent are dry blended, and the resultant mixture is either melt-kneaded at a temperature of from 120 to 230° C. by using a pressuring kneader, or melt-kneaded using a twin-screw extruder in a continuous manner.

It is preferred that the slush molding material of the present invention is used in the form of a powder having an average particle diameter of from 50 to 500 μm, more advantageously from 60 to 450 μm. Such a powder can be obtained by finely grinding the slush molding material by using a grinder, such as a turbo mill, a pin mill or a hammer mill. Generally, the fine grinding of the slush molding material is conducted at room temperature; however, the slush molding material can also be mechanically pulverized while lowering the temperature of the slush molding material to −60° C. or lower by using a refrigeration medium or a refrigeration equipment. When the slush molding material is in the form of a powder having an average particle diameter of from 50 to 500 μm, the fluidity of the powder is improved, so that a shaped article obtained by molding the powder has a smooth surface free of a pinhole. When the average particle diameter of the slush molding material powder is less than 50 μm, the fluidity of such too fine a powder is poor, and a shaped article obtained by molding such powder exhibits a poor appearance. On the other hand, when the average particle diameter of the slush molding material powder is more than 500 μm, the moldability of such too coarse a powder is poor, so that a shaped article obtained by molding such powder tends to suffer a marked occurrence of pinholes.

In the present invention, a surface skin material can be produced by subjecting the slush molding material to a molding, such as a compression molding, a roll forming, an extrusion molding or an injection molding. Alternatively, a surface skin material also can be produced by grinding or pulverizing the slush molding material and subjecting the resultant slush molding material powder to a powder slush molding.

With respect to the powder slush molding, a detailed explanation is made below, referring to FIG. 2(a) to FIG. 2(d). A raw material powder of the hydrogenated copolymer composition (i.e., hydrogenated copolymer composition powder 5) for the powder slush molding is fed to box type container 3 made of stainless steel (hereinafter, this container is referred to as "powder feeding box 3"), which is connected to a single-shaft rotational powder slush molding device equipped with single-shaft rotation handle 1. To the top of powder feeding box 3 is attached an electroformed nickel mold 4 by using a clamp, wherein the mold has an undercut portion (i.e., a portion functioning as a hitch in the direction of the opening and closing of the mold) and has been preheated to a temperature of from 180 to 300° C., preferably from 200 to 280° C. (see FIG. 2(d)). By rotating single-shaft rotation handle 1 which is connected to and can rotate on revolution shaft 2 of the molding device, powder feeding box 3 and electroformed nickel mold 4 are caused to simultaneously rotate in a clockwise direction and in a counterclockwise direction alternately every five times, thereby introducing powder 5 into mold 4. Mold 4 is knocked several times using a wooden hammer or the like to remove an excess amount of powder 5 from mold 4. Then, mold 4 (which contains hydrogenated copolymer composition powder 5) is removed from powder feeding box 3, placed in a heating furnace and heated at a temperature of from 250 to 450° C., preferably from 300 to 430° C., for a period of from 5 to 60 seconds, preferably from 10 to 30 seconds, thereby melting hydrogenated copolymer composition powder 5 in mold 4. Mold 4 is cooled using water to thereby obtain a shaped article of the hydrogenated copolymer composition. The obtained shaped article is taken out from mold 4.

A surface skin material produced using the slush molding material of the present invention or the slush molding powder comprising the slush molding material can be advantageously used as surface skin materials for car interior goods (e.g., an instrument panel, a ceiling, a door, a seat, a pillar, a steering wheel, a handle) and inner linings for furniture, miscellaneous goods or buildings.

(x) Adhesive Composition

By adding an adhesive property imparting agent (hereinafter, frequently referred to as "component (n)") to the hydrogenated copolymer or hydrogenated copolymer composition of the present invention, an adhesive composition can be prepared. The adhesive composition exhibits an excellent balance of adhesive properties (such as adhesion strength) and exhibits an excellent stability in melt viscosity at high temperatures, so that the adhesive composition can be advantageously used not only as a material for an adhesive layer of an adhesive tape, an adhesive sheet or film, and a surface protection sheet or film for an adhesive label, but also as an adhesive.

When the adhesive composition is prepared using the hydrogenated copolymer composition of the present invention, the component (a)/component (b) weight ratio is generally from 50/50 to 97/3, preferably from 60/40 to 95/5, more preferably from 70/30 to 90/10.

With respect to the adhesive property imparting agent, there is no particular limitation, and it is possible to use any conventional adhesion property imparting resins, such as a polyterpene resin, a hydrogenated rosin terpene resin, a terpene/phenol resin and an alicyclic hydrocarbon resin. These agents can be used individually or in combination. Specific examples of adhesive property imparting agents include those which are described in the above-mentioned "Gomu Purasuchikku Haigou Yakuhin (Additives for Rubber and Plastic)" (Rubber Digest Co., Ltd., Japan), such as Clearon P105 (polyterpene resin), Clearon P125 (polyterpene resin), Arkon P-90 (alicyclic hydrocarbon resin) and Arkon P-115 (alicyclic hydrocarbon resin). The amount of the adhesive property imparting agent is generally from 20 to 400 parts by weight, preferably from 50 to 350 parts by weight, relative to 100 parts by weight of the hydrogenated copolymer or hydrogenated copolymer composition of the present invention. When the amount of the adhesive property imparting agent is less than 20 parts by weight, it is unlikely that the adhesive composition exhibits satisfactory adhesion. On the other hand, when the amount of the adhesive property imparting agent is more than 400 parts by weight, the softening point of the adhesive composition becomes lower. Therefore, in either case, the adhesive properties of the adhesive composition tend to be impaired.

The adhesive composition may contain a conventional softening agent, such as a naphthenic process oil, a paraffinic process oil, or a mixture thereof. Specific examples of softening agents include any one of the rubber-softening agent (i.e., component (i)) which are exemplified in item (i) above for the "reinforcing filler-containing composition". The addition of a softening agent to the adhesive composition is advantageous in that the viscosity of the adhesive composition is reduced, so that the processability and adhesive property of the adhesive composition are improved. The amount of the softening agent is preferably from 0 to 200 parts by weight, more preferably from 0 to 150 parts by weight, relative to 100 parts by weight of the hydrogenated copolymer or hydrogenated copolymer composition of the present invention. When the amount of the softening agent is more than 200 parts by weight, the retention of the adhesive property of the adhesive composition tends to be markedly impaired.

Further, if desired, the adhesive composition may contain a stabilizer, such as an antioxidant, a light stabilizer or an ultraviolet light absorbent, each of which is described in the above-mentioned "Gomu Purasuchikku Haigou Yakuhin (Additives for Rubber and Plastic)" (Rubber Digest Co., Ltd., Japan). Also, the adhesive composition may contain at least one member selected from the group consisting of pigments (such as red iron oxide and titanium dioxide); waxes (such as a paraffin wax, a microcrystalline wax, and a low molecular weight polyethylene wax); thermoplastic resins (such as polyolefin thermoplastic resins (e.g., amorphous polyolefin and an ethylene/ethylacrylate copolymer) and low molecular weight vinyl aromatic thermoplastic resins); natural rubbers; synthetic rubbers, such as a polyisoprene rubber, a polybutadiene rubber, a styrene/butadiene rubber, an ethylene/propylene rubber, a chloroprene rubber, an acrylic rubber, an isoprene/isobutylene rubber, a polypentenamer rubber, a styrene/butadiene block copolymer, a hydrogenated block copolymer obtained by hydrogenating a styrene/butadiene block copolymer, a styrene/isoprene block copolymer, and a hydrogenated block copolymer obtained by hydrogenating a styrene/isoprene block copolymer.

With respect to the method for producing the adhesive composition, there is no particular limitation. For example, the adhesive composition can be produced by a method in which the above-mentioned components for the adhesive composition is uniformly mixed using a conventional mixer or kneader while heating.

The adhesive composition exhibits not only excellent melt viscosity and excellent adhesive strength, but also excellent stability in melt viscosity. That is, the adhesive composition exhibits excellent balance adhesion properties. By virtue of these excellent properties, the adhesive composition can be advantageously used as a material for an adhesive tape and label, a pressure-sensitive lamina, a pressure-sensitive sheet, a surface protection sheet and film; a back adhesive for fixing a lightweight plastic shaped article, a back adhesive for fixing a carpet or tile, and an adhesive. Especially, the adhesive composition can be advantageously used as a material for an adhesive tape, an adhesive sheet and film, an adhesive label, a surface protection sheet and film, and an adhesive.

(xi) Asphalt Composition

By adding asphalt (hereinafter, referred to as "component (o)") to the hydrogenated copolymer of the present invention, an asphalt composition can be prepared. The asphalt composition exhibits excellent balance of asphalt properties, such as ductility, and storage stability at high temperatures. By virtue of these excellent properties, the asphalt composition can be advantageously used as a material for road paving, a roofing sheet, a waterproof sheet, and a sealant.

Examples of asphalts for use in the asphalt composition of the present invention include a petroleum asphalt (i.e., asphalt by-produced by oil refining), a mixture thereof with petroleum, natural asphalt, and a mixture thereof with petroleum. Each of the above-mentioned asphalts contains bitumen as the main component thereof. Specific examples of asphalts include a straight asphalt, a semi-blown asphalt, a blown asphalt, tar, pitch, a cutback asphalt (i.e., a mixture of asphalt with oil), and an asphalt emulsion. These asphalts can be used individually or in combination.

As a preferred asphalt, there can be mentioned a straight asphalt having a penetration ratio of from 30 to 300, preferably from 40 to 200, more preferably from 45 to 150, wherein the penetration ratio of the asphalt is measured in accordance with JIS K2207. The amount of the hydrogenated copolymer of the present invention contained in the asphalt composition is generally from 0.5 to 50 parts by weight, preferably from 1 to 30 parts by weight, more preferably from 3 to 20 parts by weight, relative to 100 parts by weight of the asphalt contained in the asphalt composition.

If desired, the asphalt composition may contain an additive. Examples of additives include inorganic fillers, such as calcium carbonate, magnesium carbonate, talc, silica, alumina, titanium oxide, glass fiber, and glass beads; organic reinforcing agents, such as organic fiber and a coumarone/indene resin; crosslinking agents, such as an organic peroxide and an inorganic peroxide; pigments, such as titanium white, carbon black, and iron oxide; dyes; flame retardants; antioxidants; ultraviolet absorbents; antistatic agents; lubricants; softening agents, such as a paraffinic process oil, a naphthenic process oil, an aromatic process oil, a paraffin, an organic polysiloxane, and mineral oil; plasticizers; adhesion imparting resins, such as a coumarone/indene resin and a terpene resin.

Further examples of additives for the asphalt composition include polyolefin resins, such as an atactic polypropylene, and an ethylene/ethyl acrylate copolymer; low molecular weight vinyl aromatic thermoplastic resins; natural rubbers; synthetic rubbers, such as a polyisoprene rubber, an ethylene/propylene rubber, a chloroprene rubber, an acrylic rubber, an isoprene/isobutylene rubber, a styrene/butadiene block copolymer other than the hydrogenated copolymer of the present invention, a hydrogenation product obtained by hydrogenating a styrene/butadiene block copolymer, and a styrene/isoprene block copolymer other than the hydrogenated copolymer of the present invention, and a hydrogenation product obtained by hydrogenating a styrene/isoprene block copolymer; vulcanizing agents, such as sulfur; auxiliary vulcanizing agents; and fillers. These additives can be used individually or in combination. When it is intended to use the asphalt composition as a material for road paving, the composition is generally used in the form of a mixture thereof with an aggregate, such as mineral type crushed stone, sand or slag.

As mentioned above, the hydrogenated copolymer or hydrogenated copolymer composition of the present invention can be used in various fields. When it is intended to use the hydrogenated copolymer or hydrogenated copolymer composition in the form of a shaped article, the molding of the hydrogenated copolymer or hydrogenated copolymer composition can be conducted by a method selected from the group consisting of an extrusion molding, an injection molding, a blow molding, air-pressure molding, a vacuum molding, a foam molding, a multilayer extrusion molding, a multilayer injection molding, a high frequency weld molding and a slush molding. Examples of shaped articles include a sheet, a film, a tube, a nonwoven fabric, a fibrous shaped article, and a synthetic leather substitute. The shaped articles of the hydrogenated copolymer or hydrogenated copolymer composition of the present invention can be advantageously used in various fields, such as a material for food packages; a material for medical instruments; a raw material for home electric appliances and parts thereof, electronic devices and parts thereof, automobile parts, industrial parts, household utensils and toys; a raw material for footwear, fiber and an adhesive; and an asphalt modifier. Specific examples of automobile parts include a side mall, a grommet, a knob, a weatherstrip, a window frame and a sealant therefor, an armrest, a door grip, a steering wheel grip, a console box, a headrest, an instrument panel, a bumper, a spoiler, and a storage cover for an air-bag device. Specific examples of medical instruments include a blood bag, a bag for storing platelets, a transfusion bag, a bag for artificial dialysis, a medical tubing, and a catheter. Further, the hydrogenated copolymer or hydrogenated copolymer composition of the present invention can be used in a substrate for an adhesive tape, sheet or film; a substrate for a surface protection film, an adhesive for a surface protection film; an adhesive for a carpet; a stretch wrapping film; a heat shrinkable film; a coating material for a coated steel pipe; and a sealant.

In the above, the use of the compositions disclosed in the present invention is explained mainly in connection with various shaped articles of the compositions. Hereinbelow, a detailed explanation on the shaped articles of the present invention is made, taking as examples the multilayer extrusion molded articles and the multilayer injection molded articles.

Multilayer Extrusion Molded Article

The multilayer extrusion molded article of the present invention is produced by a method in which the hydrogenated copolymer or hydrogenated copolymer composition of the present invention, or a composition (such as the above-mentioned reinforcing filler composition, the above-mentioned crosslinking product or the above-mentioned building material) (other than the above-mentioned hydrogenated copolymer composition) of the present invention is subjected to a coextrusion with a thermoplastic resin and/or a rubbery polymer to thereby produce a multilayer sheet, and the produced multilayer sheet is subjected to heat forming. A shaped article obtained by subjecting the above-mentioned film or sheet to heat forming is also a multilayer extrusion molded article.

The above-mentioned coextrusion is conducted using two or more extruders having one die in common as follows. The hydrogenated copolymer or hydrogenated copolymer composition of the present invention, or the composition (other than the hydrogenated copolymer composition) of the present invention is fed to at least one of the extruders, and the thermoplastic resin and/or the rubbery polymer are/is fed to the other extruder(s). By extruding these components through the die, a multilayer sheet is produced. The produced multilayer sheet is subjected to heat forming, such as a vacuum molding or air-pressure molding, to obtain a multilayer extrusion molded article. Examples of dies used for the coextrusion include a multimanifold die, a combining, an adapter die and a multislot die. A multislot die and the like can also be used for producing a multilayer blow molded article or a multilayer tubular article.

Examples of thermoplastic resins include those which are exemplified above for the "component (b)" used in the hydrogenated copolymer composition of the present invention. Also, examples of rubbery polymers include those which are exemplified above for the "component (b)" used in the hydrogenated copolymer composition of the present invention.

The multilayer extrusion molded article of the present invention can be used as a material for interior and exterior parts of automobiles, parts of furnishings, household electrical appliances, parts of office automation apparatuses, materials for food packages, containers, and materials for medical instruments. Especially, the multilayer tubular extrusion molded article can be used as a material for tubes for medical instruments (such as a blood circuit tube, a drip transfusion tube and a catheter), household hoses (such as a garden hose), tubes for a vending machine, and the like.

Multilayer Injection Molded Article

The multilayer injection molded article of the present invention is produced by a method in which the hydrogenated copolymer or hydrogenated copolymer composition of the present invention, or a composition (such as a reinforcing filler composition, a crosslinking product or a building material) (other than the above-mentioned hydrogenated copolymer composition) of the present invention is subjected, together with a thermoplastic resin and/or a rubbery polymer, to two-color injection molding or multilayer insert injection molding.

The multilayer injection molding is conducted using two or more injection molding machines as follows. The hydrogenated copolymer or hydrogenated copolymer composition of the present invention or the composition (other than the above-mentioned hydrogenated copolymer composition) of the present invention is fed to at least one of the injection molding machines, and the thermoplastic resin and/or the rubbery polymer are/is fed to the other injection molding machines. First, the thermoplastic resin and/or the rubbery polymer are/is molded to obtain a molded article of the thermoplastic resin and/or the rubbery polymer, and the molded article is inserted into a mold into which the copolymer or composition is to be injected. Then, the copolymer or composition is injected into the mold to form a molded article of the copolymer or composition, thereby obtaining a multilayer injection molded article comprising a layer of the copolymer or composition and a layer of the thermoplastic resin and/or the rubbery polymer.

In the production of the multilayer injection molded article of the present invention, a two-color injection molding machine and an insert injection molding machine can be used individually or in combination. Preferred examples of two-color injection molding machines include a two-color injection molding machine equipped with a core-back mold which is generally used in the art, and a two-color injection molding machine equipped with a mold having the ability to rotate in 180 degrees (this injection molding machine is called "of DC type"). Preferred examples of insert injection molding machines include a vertical system molding machine, that is, a composite automatic molding machine, equipped with an automatic insertion unit and a product-drawing unit, which has the ability to conduct pretreatment and after-processing.

Examples of thermoplastic resins include those which are exemplified above for the "component (b)" used in the hydrogenated copolymer composition of the present invention. Also, examples of rubbery polymers include those which are exemplified above for the "component (b)" used in the hydrogenated copolymer composition of the present invention.

Also, in the present invention, as a multilayer injection molded article, a molded article containing a metal part can be obtained. With respect to the type and shape of the metal part, there is no particular limitation. Representative examples of metal parts include a bolt and a metal core, each of which is made of iron, stainless steel, copper, brass, nickel or the like.

The multilayer injection molded article of the present invention has excellent adherence with respect to mutually adjacent constituent layers thereof. The multilayer injection molded article can be widely used in various fields, such as fields of interior or exterior parts of automobiles, parts of furnishings, household electrical appliances, and parts of office automation apparatuses.

BEST MODE FOR CARRYING OUT THE INVENTION

Hereinbelow, the present invention will be described in more detail with reference to the following Reference Examples, Examples and Comparative Examples, which should not be construed as limiting the scope of the present invention.

I. Hydrogenated Copolymer

In Examples 1 to 6 and Comparative Examples 1 to 8, unhydrogenated copolymers were produced, and the unhydrogenated copolymers were then hydrogenated to thereby obtain hydrogenated copolymers.

The characteristics and properties of the unhydrogenated copolymers and hydrogenated copolymers were determined by the following methods.

I-1) Styrene Content

The styrene contents of the unhydrogenated copolymer and the unhydrogenated homopolymer were determined using an ultraviolet spectrophotometer (trade name: UV-2450; manufactured and sold by Shimadzu Corporation, Japan).

I-2) Polystyrene Block (H) Content (Os Value)

The polystyrene block (H) content of the unhydrogenated copolymer was determined by the osmium tetraoxide degradation method described in I. M. Kolthoff, et al., J. Polym. Sci. 1, 429 (1946). For the decomposition of the unhydrogenated copolymer, a solution obtained by dissolving 0.1 g of osmic acid in 125 ml of tertiary butanol was used. (Hereinafter, the polystyrene block content obtained by the above-mentioned method is referred to as the "Os value").

The polystyrene block (H) content of the hydrogenated copolymer was measured by the method described in Y. Tanaka, et al., RUBBER CHEMISTRY and TECHNOLOGY 54, 685 (1981), using a nuclear magnetic resonance (NMR) apparatus (trade name: JMN-270WB; manufactured and sold by JEOL LTD., Japan). Specifically, a sample solution is prepared by dissolving 30 mg of the hydrogenated copolymer in 1 g of deuterated chloroform, and the sample solution is subjected to $^1$H-NMR spectrometry to obtain the $^1$H-NMR spectrum of the hydrogenated copolymer. From the $^1$H-NMR spectrum, the total integral value, the integral value of the chemical shifts in the range of from 6.9 to 6.3 ppm, and the integral value of the chemical shifts in the range of from 7.5 to 6.9 ppm are obtained. Using these integral values, the polystyrene block content (Ns value) of the hydrogenated copolymer is obtained. The Ns value was then converted to the Os value. The Os value is obtained by the following calculation:

Block styrene ($St$) intensity=((6.9 to 6.3 ppm) integral value)/2

Random styrene ($St$) intensity =
((7.5 to 6.9 ppm) integral value − 3 (block styrene intensity))

Ethylene/butylene ($EB$) intensity =
((total integral value − 3 ((block $St$ intensity) + (random $St$ intensity)))/8

Polystyrene block content ($Ns$ value) = 104 (block $St$ intensity)/
(104 ((block $St$ intensity) + (random $St$ intensity)) +
56 ($EB$ intensity))

Os value=−0.012$(Ns)^2$+1.8$(Ns)$−13.0

I-3) Vinyl Bond Contents of the Unhydrogenated Copolymer and Unhydrogenated Homopolymer The vinyl bond contents of the unhydrogenated copolymer and unhydrogenated homopolymer were respectively calculated by the Hampton method and the Morello method, using an infrared spectrophotometer (trade name: FT/IR-230; manufactured and sold by Japan Spectroscopic Co., Ltd., Japan).

I-4) Hydrogenation Ratio of the Double Bonds in Conjugated Diene Monomer Units

The hydrogenation ratio was measured by means of a nuclear magnetic resonance (NMR) apparatus (trade name: DPX-400; manufactured and sold by BRUKER, Germany).

I-5) Weight Average Molecular Weight and Molecular Weight Distribution

The weight average and number average molecular weights of the hydrogenated copolymer and the hydrogenated homopolymer, and the molecular weight distributions of the hydrogenated copolymer and the hydrogenated homopolymer were measured by gel permeation chromatography (GPC) using a GPC apparatus (manufactured and sold by Waters Corporation, U.S.A.) under conditions wherein tetrahydrofuran was used as a solvent and the column temperature was 35° C. With respect to each of the hydrogenated copolymer and the hydrogenated homopolymer, the weight average molecular weight thereof was determined from a GPC chromatogram (obtained by GPC) showing the peak molecular weight thereof, using a calibration curve obtained with respect to commercially available monodisperse standard polystyrene samples. The number average molecular weights of the hydrogenated copolymer and the hydrogenated homopolymer were determined in substantially the same manner as mentioned above. With respect to each of the hydrogenated copolymer and the hydrogenated homopolymer, the molecular weight distribution thereof is defined as the ratio (Mw/Mn) of the weight average molecular weight (Mw) thereof to the number average molecular weight (Mn) thereof.

I-6) Crystallization Peak and Quantity of Heat at the Crystallization Peak

The crystallization peak of the hydrogenated copolymer and the quantity of heat at the crystallization peak of the hydrogenated copolymer were measured by means of a differential scanning calorimeter (trade name: DSC3200S; manufactured and sold by MAC Science Co., Ltd., Japan). Specifically, the hydrogenated copolymer is fed into the differential scanning calorimeter. The internal temperature of the differential scanning calorimeter is elevated at a rate of 30° C./min from room temperature to 150° C. and, then, lowered at a rate of 10° C./min from 150° C. to −100° C., thereby obtaining a DSC chart (i.e., crystallization curve) with respect to the hydrogenated copolymer. From the obtained DSC chart, whether or not the crystallization peak is present is confirmed. When a crystallization peak is observed in the DSC chart, the temperature at which the crystallization peak is observed is defined as the crystallization peak temperature of the hydrogenated copolymer, and the quantity of heat at the crystallization peak is measured.

I-7) Dunlop Impact Resilience

The Dunlop impact resilience was measured at 23° C. in accordance with the Dunlop impact resilience test prescribed in BS 903.

I-8) Scratch Resistance (Pencil Scratch Test)

The scratch resistance of the hydrogenated copolymer was measured in accordance with the pencil scratch test prescribed in JIS K 5400. Specifically, a sample of the hydrogenated copolymer is scratched using an HB pencil at 23° C. under a load of 200 g. After the pencil scratch test, the appearance of the sample of the hydrogenated copolymer is visually observed and evaluated by the following criteria.

| | Appearance of the sample after the pencil scratch test |
|---|---|
| ⊚ | Scratch is not observed |
| Δ | Slight scratch is observed |
| X | Conspicuous scratch is observed |

I-9) Anti-Blocking Property of the Hydrogenated Copolymer

The anti-blocking property of the hydrogenated copolymer was evaluated by the following method. In a metal cylinder having a diameter of 5 cm is placed 60 g of a sample of the hydrogenated copolymer in the form of pellets, wherein each pellet has the form of a cylinder having a diameter of about 3 mm and a height of about 3 mm. On the sample pellets is placed 1,160 g of a weight. Then, the metal cylinder containing the sample pellets and the weight was heated in a gear oven having a temperature of 42° C. for 20 hours. Then, the adhesion state of the pellets in the metal cylinder is observed as follows. When the mass of the pellets is taken out from the metal cylinder, the mass crumbles to pieces (it should be noted, however, that when the hydrogenated copolymer has poor anti-blocking property, the mass of the pellets does not crumble). The total weight of the pieces consisting of three or more pellets is measured, and the ratio (%) of the total weight of the pieces consisting of three or more pellets to the weight (60 g) of the hydrogenated copolymer is calculated. The antiblocking property of the hydrogenated copolymer is evaluated by the following criteria. (In the above, the evaluation is made with respect to a sample having incorporated thereinto 1,500 ppm by weight, based on the weight of the hydrogenated copolymer, of calcium stearate.)

| | Adhesion state of the pellets | |
|---|---|---|
| ⊚ | The mass of the pellets crumbles | The ratio (%) of the total weight of the pieces consisting three or more pellets to the weight of the hydrogenated copolymer is less than 50%. |
| Δ | The mass of the pellets crumbles | The ratio (%) of the total weight of the pieces consisting three or more pellets to the weight of the hydrogenated copolymer is 50% or more. |
| X | The mass of the pellets does not crumble | |

I-10) 100% Modulus

The 100% modulus is used as an index for flexibility. The tensile property of a compression-molded specimen of the hydrogenated copolymer is measured in accordance with JIS K 6251 to obtain the stress sustained by the specimen when the specimen is stretched by 100% (hereinafter, this stress value is referred to as the "100% modulus" of the hydrogenated copolymer). The smaller the 100% modulus of the hydrogenated copolymer, the better the flexibility of the hydrogenated copolymer. It is preferred that the 100% modulus of the hydrogenated copolymer is 120 kg/cm$^2$ or less.

I-10) Anti-Impact Scratch Property

To a compression-molded specimen (sheet) of a hydrogenated copolymer (thickness: 2 mm) is dropped a wedge (weight: 500 g) having a tip having a length of 10 mm and a width of 1 mm, wherein the wedge is dropped from the point which is 10 cm above the specimen, thereby forming a scratch on the specimen. The surface of the compression-molded specimen is scanned with a laser by means of a surface texture measuring instrument (manufactured and sold by TOKYO SEIMITSU CO., Japan) to thereby measure the depth (unit: μm) of the scratch on the specimen. When the depth (unit: μm) of the scratch on the specimen is 40 μm or less, this means that the hydrogenated copolymer exhibits excellent anti-impact scratch property.

Reference Example 1

<Preparation of a Hydrogenation Catalyst>

A hydrogenation catalyst used in the hydrogenation reactions of unhydrogenated copolymers and unhydrogenated homopolymers in the following Examples and Comparative Examples was prepared by the following method.

A reaction vessel was purged with nitrogen. To the reaction vessel was fed one liter of dried, purified cyclohexane, followed by addition of 100 mmol of bis($\eta^5$-cyclopentadienyl)titanium dichloride. While satisfactorily stirring the resultant mixture in the reaction vessel, a n-hexane solution containing 200 mmol of trimethylaluminum was fed to the reaction vessel, thereby effecting a reaction at room temperature for about 3 days to obtain a hydrogenation catalyst containing titanium.

Example 1

An unhydrogenated copolymer was produced by performing a continuous polymerization by the following method in which two reaction vessels (i.e., a first reaction vessel and a second reaction vessel), each of which has an internal volume of 10 liters and is equipped with a stirrer and a jacket, were used.

A cyclohexane solution of butadiene (butadiene concentration: 24% by weight), a cyclohexane solution of styrene (styrene concentration: 24% by weight), and a cyclohexane solution of n-butyllithium (which solution contained 0.077 part by weight of n-butyllithium, relative to 100 parts by weight of the total of the monomers (i.e., the total of the above-mentioned butadiene and the above-mentioned styrene) were fed to the bottom portion of the first reaction vessel at rates of 4.51 liter/hr, 5.97 liter/hr and 2.0 liter/hr, respectively. A cyclohexane solution of N,N,N',N'-tetramethylethylenediamine was further fed to the bottom portion of the first reaction vessel at a rate wherein the amount of N,N,N',N'-tetramethylethylenediamine fed to the reaction vessel was 0.44 mole, per mole of the above-mentioned n-butyllithium, to thereby perform a continuous polymerization at 90° C. The reaction temperature was adjusted by controlling a jacket temperature. The temperature around the bottom portion of the first reaction vessel was about 88° C. and the temperature around the top of the first reaction vessel was about 90° C. The average residence time of a polymerization reaction mixture in the first reaction vessel was about 45 minutes. The conversion of butadiene was approximately 100% and the conversion of styrene was 99%.

From the first reaction vessel, a polymer solution was withdrawn, and fed to the bottom portion of the second reaction vessel. Simultaneously with the feeding of the polymer solution, a cyclohexane solution of styrene (concentration of styrene: 24% by weight) was fed to the bottom portion of the second reaction vessel at 2.38 liter/hr. In the second reaction vessel, a continuous polymerization was performed at 90° C. to thereby produce a copolymer (unhydrogenated copolymer). The conversion of styrene as measured at the outlet of the second reaction vessel was 98%.

The unhydrogenated copolymer was analyzed by the above-mentioned methods. As a result, it was found that the unhydrogenated copolymer had a styrene content of 67% by weight, a polystyrene block (H) content (Os value) of 20% by weight and a vinyl bond content (as measured with respect to the butadiene monomer units in the copolymer) of 14% by weight.

Then, to the obtained unhydrogenated copolymer was added the above-mentioned hydrogenation catalyst in an amount of 100 ppm by weight, in terms of the amount of titanium, based on the weight of the unhydrogenated copolymer, thereby performing a hydrogenation reaction under conditions wherein the hydrogen pressure was 0.7 MPa and the reaction temperature was 65° C. After completion of the hydrogenation reaction, methanol was added to the second reaction vessel, followed by addition of, as a stabilizer, octadecyl-3-(3,5-di-t-butyl-4-hydroxyphenyl) propionate (0.3 part by weight, relative to 100 parts by weight of the unhydrogenated copolymer), to thereby obtain a hydrogenated copolymer (polymer 1).

Polymer 1 had a hydrogenation ratio of 99%, a weight average molecular weight of 200,000 and a molecular weight distribution of 1.9. The Ns value of polymer 1 (measured by the above-mentioned NMR method) was 21% by weight, and the polystyrene block content (Os value) calculated from the Ns value by the above-mentioned method was 20% by weight. Further, the styrene content of polymer 1 was measured by the above-mentioned NMR method, and found to be 67% by weight. In a DSC chart obtained with respect of polymer 1, no crystallization peak was observed. The characteristics and properties of polymer 1 are shown in Table 1.

Example 2

An unhydrogenated copolymer was produced by performing substantially the same continuous polymerization as in Example 1, except that the feeding rate of the cyclohexane solution of butadiene to the first reaction vessel was changed to 3.38 liter/hr, the feeding rate of the cyclohexane solution of styrene to the first reaction vessel was changed to 6.87 liter/hr, and the feeding rate of the cyclohexane solution of styrene to the second reaction vessel was changed to 2.95 liter/hr. Using the produced unhydrogenated copolymer, a hydrogenated copolymer (polymer 2) was produced in substantially the same manner as in Example 1 (i.e., hydrogenation, addition of methanol, and addition of the stabilizer were conducted in substantially the same manner as in Example 1). The characteristics and properties of polymer 2 were measured by the above-mentioned methods. The results are shown in Table 1.

Example 3

An unhydrogenated copolymer was produced by performing substantially the same continuous polymerization as in Example 1, except that the amount of n-butyllithium contained in the solution thereof in cyclohexane was changed to 0.067 part by weight, relative to 100 parts by weight of the total of the butadiene and styrene monomers. Using the produced unhydrogenated copolymer, a hydrogenated copolymer (polymer 3) was produced in substantially the same manner as in Example 1. The characteristics and properties of polymer 3 were measured by the above-mentioned methods. The results are shown in Table 1.

Comparative Example 1

An unhydrogenated copolymer was produced by performing substantially the same continuous polymerization as in Example 1, except that the feeding rate of the cyclohexane solution of styrene to the first reaction vessel was changed to 2.06 liter/hr, and the feeding rate of the cyclohexane solution of styrene to the second reaction vessel was changed to 1.37 liter/hr. Using the produced unhydrogenated copolymer, a hydrogenated copolymer (polymer 4) was produced in substantially the same manner as in Example 1. The characteristics and properties of polymer 4 were measured by the above-mentioned methods. The results are shown in Table 1.

Comparative Example 2

A commercially available styrene-butadiene random copolymer (trade name: Asaprene 6500; manufactured and sold by Japan Elastomer Co., Ltd., Japan) was provided. Using this copolymer, a hydrogenated copolymer (polymer 5) was produced in substantially the same manner as in Example 1. The characteristics and properties of polymer 5 were measured by the above-mentioned methods. The results are shown in Table 1. It should be noted that, in a DSC chart obtained with respect to polymer 5, a crystallization peak was observed at 35° C., and the amount of the heat at the crystallization peak was found to be 4.7 J/g.

Comparative Example 3

An unhydrogenated copolymer was produced by performing substantially the same continuous polymerization as in Example 1, except that the feeding rate of the cyclohexane solution of butadiene to the first reaction vessel was changed to 1 liter/hr, the feeding rate of the cyclohexane solution of styrene to the first reaction vessel was changed to 10 liter/hr, and the feeding rate of the cyclohexane solution of styrene to the second reaction vessel was changed to 1 liter/hr. Using the produced unhydrogenated copolymer, a hydrogenated copolymer (polymer 6) was produced in substantially the same manner as in Example 1. The characteristics and properties of polymer 6 were measured by the above-mentioned methods. The results are shown in Table 1.

Comparative Example 4

An unhydrogenated copolymer was produced by performing substantially the same continuous polymerization as in Example 1, except that the amount of n-butyllithium contained in the solution thereof in cyclohexane was changed to 0.2 part by weight, relative to 100 parts by weight of the total of the butadiene and styrene monomers. Using the produced unhydrogenated copolymer, a hydrogenated copolymer (polymer 7) was produced in substantially the same manner as in Example 1. The characteristics and properties of polymer 7 were measured by the above-mentioned methods. The results are shown in Table 1.

Comparative Example 5

Substantially the same continuous polymerization as in Example 1 was performed to obtain an unhydrogenated copolymer. Using the produced unhydrogenated copolymer, a hydrogenated copolymer (polymer 8) was produced in substantially the same manner as in Example 1, except that the reaction conditions were changed so as for the produced polymer 8 to have a hydrogenation ratio 80%. The characteristics and properties of polymer 8 were measured by the above-mentioned methods. The results are shown in Table 1.

Example 4

An unhydrogenated copolymer was produced by performing a continuous polymerization by the following method in which a reaction vessel which has an internal volume of 10 liters and is equipped with a stirrer and a jacket was used.

A cyclohexane solution which contained, as monomers, butadiene and styrene (butadiene/styrene weight ratio: 30/70; total concentration of the butadiene and styrene monomers: 22% by weight), and a cyclohexane solution of n-butyllithium (which solution contained 0.067 part by weight of n-butyllithium, relative to 100 parts by weight of the total of the butadiene and styrene monomers) were fed to the bottom portion of the reaction vessel at rates of 13.3 liter/hr and 1.0 liter/hr, respectively. A cyclohexane solution of N,N,N',N'-tetramethylethylenediamine was further fed to the bottom portion of the reaction vessel at a rate wherein the amount of N,N,N',N'-tetramethylethylenediamine fed to the reaction vessel was 0.82 mole, per mole of the above-mentioned n-butyllithium, to thereby perform a continuous polymerization at 90° C., thereby producing a copolymer (an unhydrogenated copolymer). In the production of the unhydrogenated copolymer, the reaction temperature was adjusted by controlling a jacket temperature. The temperature around the bottom portion of the reaction vessel was about 87° C. and the temperature around the top of the reaction vessel was about 90° C. The average residence time of a polymerization reaction mixture in the reaction vessel was about 45 minutes. The conversion of butadiene was approximately 100% and the conversion of styrene was approximately 96%.

The unhydrogenated copolymer was analyzed by the above-mentioned methods. As a result, it was found that the unhydrogenated copolymer had a styrene content of 67% by weight, a polystyrene block (H) content (Os value) of 1% by weight and a vinyl bond content (as measured with respect to the butadiene monomer units in the copolymer) of 14% by weight.

Then, to the unhydrogenated copolymer was added the above-mentioned hydrogenation catalyst in an amount of 100 ppm by weight, in terms of the amount of titanium, based on the weight of the unhydrogenated copolymer, thereby performing a hydrogenation reaction under conditions wherein the hydrogen pressure was 0.7 MPa and the reaction temperature was 65° C. After completion of the hydrogenation reaction, methanol was added to the reaction vessel, followed by addition of, as a stabilizer, octadecyl-3-(3,5-di-t-butyl-4-hydroxyphenyl)propionate (0.3 part by weight, relative to 100 parts by weight of the unhydrogenated copolymer), to thereby obtain a hydrogenated copolymer (polymer 9).

Polymer 9 had a hydrogenation ratio of 99%, a weight average molecular weight of 190,000 and a molecular weight distribution of 1.9. The Ns value of polymer 9 (measured by the above-mentioned NMR method) was 8.2% by weight, and the polystyrene block content (Os value) calculated from the Ns value by the above-mentioned method was 1% by weight. In a DSC chart obtained with respect to polymer 9, no crystallization peak was observed. The characteristics and properties of polymer 9 are shown in Table 1.

Example 5

An unhydrogenated copolymer was produced by performing substantially the same continuous polymerization as in Example 4, except that, the butadiene/styrene weight ratio of the cyclohexane solution containing butadiene and styrene monomers was changed to 23/77. Using the produced unhy drogenated copolymer, a hydrogenated copolymer (polymer 10) was produced in substantially the same manner as in Example 4 (i.e., hydrogenation, addition of methanol, and addition of the stabilizer were conducted in substantially the same manner as in Example 4). The characteristics and properties of polymer 10 were measured by the above-mentioned methods. The results are shown in Table 1.

Example 6

An unhydrogenated copolymer was produced by performing a batch polymerization by the following method in which a reaction vessel which has an internal volume of 10 liters and is equipped with a stirrer and a jacket was used.

To the reaction vessel were fed 3.3 liters of cyclohexane, 16 ml of a cyclohexane solution of n-butyllithium (n-butyllithium concentration: 15% by weight), and N,N,N', N'-tetramethylethylenediamine (0.82 mole, per mole of the above-mentioned n-butyllithium). The internal temperature of the reaction vessel was adjusted to 90° C. Then, to the reaction vessel was fed a cyclohexane solution which contained, as monomers, butadiene and styrene (butadiene/styrene weight ratio: 35/65; monomer concentration: 30% by weight), thereby performing a batch polymerization for 1 hour to produce a copolymer (an unhydrogenated copolymer). The feeding of the monomers was stopped when the amount of the monomers in the reaction vessel reached 790 g. The polymerization temperature was controlled within the range of 90±2° C. At the point in time of approximately 30 minutes after the start of the batch polymerization, each of the conversions of butadiene and styrene was approximately 100%.

The unhydrogenated copolymer was analyzed by the above-mentioned methods. As a result, it was found that the unhydrogenated copolymer had a styrene content of 65% by weight, a polystyrene block (H) content (Os value) of 8% by weight and a vinyl bond content (as measured with respect to the butadiene monomer units in the copolymer) of 13% by weight.

Using the unhydrogenated copolymer, a hydrogenated copolymer (polymer 11) was produced in substantially the same manner as in Example 4. The characteristics and properties of polymer 11 were measured by the above-mentioned methods. The results are shown in Table 1.

TABLE 1

| | | Characteristics of the hydrogenated copolymer | | | | | | | Properties of the hydrogenated copolymer | | | | |
|---|---|---|---|---|---|---|---|---|---|---|---|---|---|
| | Hydrogenated copolymer | Styrene content (% by weight) | Polystyrene block (H) content (% by weight) | Vinyl bond content (% by weight) | Degree of hydrogenation (%) | Weight average molecular weight (× 10,000) | Molecular weight distribution (Mw/Mn) | Crystallization peak (J/g)*1 | Block configuration*2 | Impact resistance (%) | Scratch resistance | Antiblocking property | 100% modulus | Antiimpact scratch property |
| Ex.1 | Polymer 1 | 67 | 20 | 14 | 99 | 20.0 | 1.9 | no | S-H | 15 | ⊙ | ⊙ | nd | nd |
| Ex.2 | Polymer 2 | 75 | 26 | 12 | 99 | 19.1 | 1.9 | no | | 13 | ⊙ | ⊙ | nd | nd |
| Ex.3 | Polymer 3 | 66 | 18 | 14 | 97 | 23.2 | 1.9 | no | | 17 | ⊙ | ⊙ | nd | nd |
| Comp. Ex.1 | Polymer 4 | 45 | 18 | 15 | 98 | 20.2 | 1.9 | no | | 59 | X | X | nd | nd |
| Comp. Ex.2 | Polymer 5 | 65 | 8 | 15 | 97 | 18.5 | 1.1 | 4.7 | Unknown*3 | 3 | ⊙ | Δ | 160 | 98 |
| Comp. Ex.3 | Polymer 6 | 91 | 25 | 12 | 98 | 21.4 | 1.9 | no | S-H | 2 | ⊙ | ⊙ | nd | nd |
| Comp. Ex.4 | Polymer 7 | 66 | 19 | 14 | 99 | 7.5 | 1.8 | no | | 7 | Δ | X | nd | nd |
| Comp. Ex.5 | Polymer 8 | 65 | 20 | 14 | 80 | 20.4 | 1.9 | no | | 13 | X | X | nd | nd |
| Ex.4 | Polymer 9 | 67 | 1 | 14 | 99 | 19.0 | 1.9 | no | | Nd | ⊙ | nd | 27 | 0 |
| Ex.5 | Polymer 10 | 73 | 3 | 13 | 99 | 18.3 | 1.9 | no | | Nd | ⊙ | nd | 42 | 0 |
| Ex.6 | Polymer 11 | 65 | 8 | 13 | 97 | 21.2 | 1.1 | no | | Nd | ⊙ | nd | 24 | 10 |

*1When a crystallization peak was observed, the temperature at which the crystallization peak was observed is defined as the crystallization peak temperature, and the quality of heat (J/g) at the crystallization peak temperature was measured.
*2The block configuration was presumed from the method for producing the hydrogenated copolymer. S represents a random copolymer block comprising conjugated diene (butadiene) monomer units and vinyl aromatic (styrene) monomer units. H represents a polymer block comprising vinyl aromatic (styrene) monomer units.
*3The block configuration of the hydrogenated copolymer is unknown because that of the commercially available unhydrogenated copolymer used for producing the hydrogenated copolymer is unknown.
nd: "nd" means that the measurement was not conducted.

Comparative Example 6

Using one of the reaction vessels employed in Example 1, an unhydrogenated copolymer was produced as follows. To the reaction vessel was fed a 24% by weight solution of styrene in cyclohexane, which solution contained 6.5 parts by weight of styrene. Then, to the reaction vessel were fed a 15% by weight solution of n-butyllithium in cyclohexane, which solution contained 0.070% by weight of n-butyllithium, based on the weight of the above-mentioned styrene, and tetramethylethylenediamine (1.1 mole, per mole of the above-mentioned n-butyllithium), thereby performing a first polymerization at 50° C. for 1 hour. To the reaction vessel was fed a 24% by weight solution of butadiene in cyclohexane, which solution contained 87 parts by weight of butadiene, thereby performing a second polymerization at 50° C. for 1 hour. Further, to the reaction vessel was fed a 24% by weight solution of styrene in cyclohexane, which solution contained 6.5 parts by weight of styrene, thereby performing a third polymerization at 50° C. for 1 hour to produce a copolymer (an unhydrogenated copolymer).

Using the unhydrogenated copolymer, a hydrogenated copolymer (polymer 12) was produced in substantially the same manner as in Example 1. Polymer 12 had a block configuration represented by the formula: H—B—H, wherein H represents a polystyrene block and B represents a hydrogenated polybutadiene block.

Polymer 12 had a weight average molecular weight of 210,000, a molecular weight distribution of 1.1, a styrene content of 13% by weight, a polystyrene block content (Os value) of 13% by weight, a vinyl bond content (as measured with respect to the butadiene monomer units in the copolymer) of 73% by weight, and a hydrogenation ratio of 99%. Since the found value of the styrene content and the found value of the polystyrene block content are the same (i.e., 13% by weight), it was confirmed that polymer 12 had a styrene block ratio of 100%.

Comparative Example 7

Using one of the reaction vessels employed in Example 1, an unhydrogenated copolymer was produced as follows. A cyclohexane solution of butadiene (butadiene concentration: 24% by weight), and a cyclohexane solution of n-butyllithium (which solution contained 0.160 part by weight of n-butyllithium, relative to 100 parts by weight of the above-mentioned butadiene) were fed to the bottom portion of the reaction vessel at rates of 13.0 liter/hr and 1.0 liter/hr, respectively. A cyclohexane solution of N,N,N',N'-tetramethylethylenediamine was further fed to the bottom portion of the reaction vessel at a rate wherein the amount of N,N,N',N'-tetramethylethylenediamine fed to the reaction vessel was 1.1 moles, per mole of the above-mentioned n-butyllithium, to thereby perform a continuous polymerization, thereby producing a polymer (an unhydrogenated polymer). In the production of the unhydrogenated polymer, the reaction temperature was adjusted by controlling a jacket temperature. The temperature around the top of the reaction vessel was about 90° C. The average residence time of a polymerization reaction mixture in the reaction vessel was about 45 minutes. The conversion of butadiene was approximately 100%.

Using the unhydrogenated copolymer, a hydrogenated copolymer (polymer 13) was produced in substantially the same manner as in Example 1.

Polymer 13 had a weight average molecular weight of 180,000, a molecular weight distribution of 1.9, a styrene content of 0% by weight and a vinyl bond content (as measured with respect to the butadiene monomer units in the polymer) of 22% by weight.

Comparative Example 8

Using a reaction vessel which has an internal volume of 10 liters and is equipped with a stirrer and a jacket, an unhydrogenated copolymer was produced as follows. To a reaction vessel was fed a 20% by weight solution of styrene in cyclohexane, which solution contained 33.5 parts by weight of styrene. To the reaction vessel was fed a 15% by weight solution of n-butyllithium in cyclohexane (which solution contained 0.170% by weight of n-butyllithium, based on the weight of the above-mentioned styrene), and tetramethylethylenediamine (0.35 mole, per mole of the above-mentioned n-butyllithium), thereby performing a first polymerization at 70° C. for 30 minutes. To the reaction vessel was fed a 20% by weight solution of butadiene in cyclohexane, which solution contained 33 parts by weight of butadiene, thereby performing a second polymerization at 70° C. for 1 hour. Further, to the reaction vessel was fed a 20% by weight solution of styrene in cyclohexane, which solution contained 33.5 parts by weight of styrene, thereby performing a third polymerization at 70° C. for 30 minutes to thereby produce a block copolymer (an unhydrogenated copolymer). The thus obtained block copolymer had a styrene content of 67% by weight, a polystyrene block (H) content (Os value) of 65% by weight and a vinyl bond content (as measured with respect to the butadiene monomer units in the copolymer) of 40% by weight. From the found values of the styrene content and the polystyrene block content, it was found that the block copolymer had a styrene block ratio of 97%.

Then, to the unhydrogenated copolymer was added the above-mentioned hydrogenation catalyst in an amount of 100 ppm by weight, in terms of the amount of titanium, based on the weight of the unhydrogenated copolymer, to perform a hydrogenation reaction under conditions wherein the hydrogen pressure was 0.7 MPa and the reaction temperature was 65° C., thereby producing a hydrogenated copolymer (polymer 14) having a block configuration represented by the formula: H—B—H, wherein H represents a polystyrene block and B represents a hydrogenated polybutadiene block.

Polymer 14 had a hydrogenation ratio of 98%, a weight average molecular weight of 70,000 and a molecular weight distribution of 1.1.

II. Resinous Polymer Composition

In Examples 7 to 9 and Comparative Examples 9 to 12, resinous polymer compositions (namely, compositions which exhibit properties possessed by a resin) were produced.

The properties of the resinous polymer compositions were measured and evaluated by the following methods.

II-1) Izod Impact Strength (Index for Impact Resistance)

The Izod impact strength (notched Izod impact strength) was measured in accordance with JIS K 7110 at 23° C.

II-2) Moldability

The appearance of an injection-molded article obtained using the resinous polymer composition is visually observed and evaluated by the following criteria:

◯: The injection-molded article has good appearance

×: A flow mark is observed on the surface of the injection-molded article.

II-3) Tensile Properties (Tensile Strength and Tensile Elongation)

The tensile properties were measured in accordance with ASTM D638 under conditions wherein the pulling rate was 5 mm/min.

Examples 7 and 8 and Comparative Examples 9 to 11

In each of Examples 7 and 8 and Comparative Examples 9 to 11, a polymer composition having a composition indicated in Table 2 was produced.

In these examples, a PPE and a HIPS were used as a thermoplastic resin, and polymers 1, 9, 5 and 6 were used as a hydrogenated copolymer. The "PPE" means a polyphenylene ether having a reduced viscosity of 0.43, which was obtained by subjecting 2,6-xylenol to oxidative polymerization. The "HIPS" means a high impact polystyrene (trade name: 475D; manufactured and sold by A&M STYRENE CO., LTD., Japan). In each of Examples 7 and 8 and Comparative Examples 9 to 11, the components indicated in Table 2 were kneaded and extruded by means of a twin-screw extruder (trade name: PCM30; manufactured and sold by Ikegai Corporation, Japan) under conditions wherein the cylinder temperature was 300° C. and the screw revolution rate was 150 rpm, thereby obtaining a polymer composition in the form of pellets.

The obtained composition was subjected to injection molding to prepare a test specimen. Using the test specimen, the above-mentioned properties of the polymer composition were measured and evaluated. The results are shown in Table 2.

TABLE 2

| | Composition | | | Properties | |
|---|---|---|---|---|---|
| | Thermoplastic resin | | Hydrogenated copolymer | | |
| | Type | Amount (part by weight) | Type | Amount (part by weight) | Izod impact strength (J/m) | Moldability |
| Ex.7 | PPE | 50 | Polymer 1 | 50 | NB | ◯ |
| Ex.8 | PPE | 50 | Polymer 9 | 50 | NB | ◯ |
| Comp. Ex.9 | PPE | 50 | Polymer 5 | 50 | NB | X |
| Comp. Ex.10 | PPE | 50 | Polymer 6 | 50 | 40 | ◯ |
| Comp. Ex.11 | PPE HIPS | 50 50 | — | — | 320 | X |

Note:
"NB" means that the test specimen was not broken.

Example 9 and Comparative Example 12

In Example 9 and Comparative Example 12, a HIPS and a PP were used as a thermoplastic resin, and polymer 1 was used as a hydrogenated copolymer. The "HIPS" means a high impact polystyrene (trade name: 475D; manufactured and sold by A&M STYRENE CO., LTD., Japan). The "PP" means a polypropylene (i.e., propylene homopolymer) (trade name: L500A; manufactured and sold by Montell SDK Sunrise Ltd., Japan).

In Example 9, the HIPS (70 parts by weight), the PP (30 parts by weight) and polymer 1 (6 parts by weight) were kneaded and extruded by means of a twin-screw extruder (trade name: PCM30; manufactured and sold by Ikegai Corporation, Japan) under conditions wherein the cylinder temperature was 220° C. and the screw revolution rate was 250 rpm, thereby obtaining a polymer composition in the form of pellets. In Comparative Example 12, a polymer composition was produced in substantially the same manner as in Example 9, except that a hydrogenated copolymer was not used. In each of Example 9 and Comparative Example 12, the obtained composition was subjected to injection molding to prepare a test specimen. Using the test specimen, the above-mentioned properties of the polymer composition were measured.

As a result, it was found that the composition produced in Example 9 using a hydrogenated copolymer exhibited excellent properties. Specifically, the composition produced in Example 9 had a tensile strength of 300 Kg/cm$^2$ and an elongation of 13%. On the other hand, the composition produced in Comparative Example 12 without use of a hydrogenated copolymer exhibited poor properties. Specifically, the composition produced in Comparative Example 12 had a tensile strength of 270 Kg/cm$^2$ and an elongation of only 3%.

III. Rubbery Polymer Composition

In Examples 10 to 21 and Comparative Examples 13 to 19, rubbery polymer compositions (namely, compositions which exhibit properties possessed by rubbers) were produced.

The properties of the rubbery polymer compositions were measured and evaluated by the following methods.

III-1) Hardness

In accordance with JIS K 6253, the hardness of a test specimen of the rubbery polymer composition was measured by means of a durometer (type A), 10 seconds after the thrusting of a needle into the test specimen.

III-2) Tensile Stress, Tensile Strength and Elongation at Break

In accordance with JIS K 6251 (in which a dumbbell No. 3 is used), the tensile stress, tensile strength and elongation at break were measured by means of a tensile tester (trade name: AGS-100D; manufactured and sold by Shimadzu Corporation, Japan) under conditions wherein the tensile rate was 500 mm/min.

III-3) Dunlop Impact Resilience

The Dunlop impact resilience was measured in substantially the same manner as in item I-6) above.

III-4) Scratch Resistance

Using a Color Fastness Rubbing Tester (trade name: AB-301; manufactured and sold by TESTER SANGYO CO., LTD., Japan), the surface (mirror surface) of a sheet obtained by molding the rubbery polymer composition is abraded 100 times with an abrading cloth (canequim No. 3) under a load of 500 g. The change in luster of the surface of the sheet before and after the abrasion of the sheet is measured by means of a luster meter. The change in luster of the surface of the molded sheet, which is caused by the abrasion of the sheet, i.e., (luster of the surface of the sheet after the abrasion)—(luster of the surface of the sheet before the abrasion), is used as a yardstick for the scratch resistance of the rubbery polymer composition. Specifically, the scratch resistance of the rubbery polymer composition is evaluated by the following criteria:

| | The change in luster of the surface of the sheet, which is caused by the abrasion of the sheet |
|---|---|
| ⊚ | From −5 to 0 |
| ◯ | From −10 to less than −5 |
| Δ | From −50 to less than −10 |
| X | Less than −50 |

III-5) Abrasion Resistance

Using a Color Fastness Rubbing Tester (trade name AB-301; manufactured and sold by TESTER SANGYO CO., LTD., Japan), the leather grained surface of a sheet obtained by molding the rubbery polymer composition is abraded 10,000 times with an abrading cloth (canequim No. 3) under a load of 500 g. The decrease in volume of the sheet, which is caused by the 10,000 times' abrasion of the sheet, is measured, and used as a yardstick for the abrasion resistance of the rubbery polymer composition. Specifically, the abrasion resistance of the rubbery polymer composition is evaluated by the following criteria:

|   | Decrease in volume of the sheet, which is caused by the 10,000 times' abrasion of the sheet |
|---|---|
| ⊚ | 0.01 ml or less |
| ○ | From more than 0.01 ml to 0.05 ml |
| Δ | From more than 0.05 ml to 0.10 ml |
| X | More than 0.10 ml |

III-6) Heat Distortion

A sheet obtained by molding the rubbery polymer composition is subjected to a heat distortion test in accordance with JIS K 6723. The smaller the heat distortion ratio (%) of the sheet, the better the heat resistance of the rubbery polymer composition.

Examples 10 to 13

In Examples 10 to 13, rubbery polymer compositions having formulations indicated in Table 3 were produced, using the following component rubbery polymers:

SEBS: a hydrogenation product of a styrene/butadiene block copolymer (trade name: TUFTEC H1221; manufactured and sold by ASAHI KASEI CORPORATION, Japan);
SIS: a styrene/isoprene block copolymer (trade name: HY-BRAR 5127; manufactured and sold by Kuraray Co., Ltd., Japan);
SEPS: a hydrogenation product of a styrene/isoprene block copolymer (trade name: HYBRAR 7125; manufactured and sold by Kuraray Co., Ltd., Japan); and
TPO: an olefin elastomer (trade name: Sumitomo TPE820; manufactured and sold by Sumitomo Chemical Co., Ltd., Japan).

In Examples 10 to 13, polymer 1 was used as a hydrogenated copolymer.

In each of Examples 10 to 13, polymer 1 (70 parts by weight) and a component rubbery polymer (30 parts by weight) were kneaded and extruded by means of a twin-screw extruder (trade name: PCM30; manufactured and sold by Ikegai Corporation, Japan) under conditions wherein the cylinder temperature was 230° C. and the screw revolution rate was 300 rpm, thereby obtaining a rubbery polymer composition in the form of pellets. The obtained rubbery polymer composition was subjected to compression molding, thereby obtaining a test specimen.

Using the test specimen, the tensile properties of the rubbery polymer composition were measured by the methods described in items I-10) and III-2) above. The results are shown in Table 3.

TABLE 3

|  |  | Ex.10 | Ex.11 | Ex.12 | Ex.13 |
|---|---|---|---|---|---|
| Formulation (part by weight) | | | | | |
| Hydrogenated copolymer | Polymer 1 | 70 | 70 | 70 | 70 |
| Component rubbery polymer | SEBS | 30 | — | — | — |
|  | SIS | — | 30 | — | — |
|  | SEPS | — | — | 30 | — |
|  | TPO | — | — | — | 30 |
| Tensile properties | | | | | |
| 100% modulus (kg/cm²) | | 26 | 46 | 43 | 44 |
| Tensile strength (kg/cm²) | | 170 | 180 | 150 | 120 |
| Elongation (%) | | 600 | 500 | 450 | 500 |

Examples 14 to 18 and Comparative Examples 13 to 19

In Examples 14 to 18 and Comparative Examples 13 to 19, the following compounds which are indicated in Table 4 were used:
PVC: a polyvinyl chloride elastomer (trade name: SUMIFLEX K580CF1; manufactured and sold by Sumitomo Bakelite Co., Ltd., Japan);
PP: a polypropylene resin (trade name: PM801A; manufactured and sold by SunAllomer Ltd., Japan), which has an MFR of 13 g/min as measured at 230° C. under a load of 2.16 kg);
PPE: a polyphenylene ether resin (poly(2,6-dimethyl-1,4-phenylene)ether having a reduced viscosity of 0.54); and
Mg(OH)₂: magnesium hydroxide (trade name: KISUMA 5A; manufactured and sold by KYOWA CHEMICAL INDUSTRY Co., Ltd., Japan).

In Examples 15 to 18 and Comparative Examples 14 to 18, polymer compositions having formulations indicated in Table 4 were produced. Specifically, in each of these Examples, the components shown in Table 4 were mixed together by means of a Henschel mixer. The resultant mixture was melt-kneaded and extruded by means of a twin-screw extruder under conditions wherein the cylinder temperature was 230° C. (Examples 15, 17 and 18, and Comparative Examples 14 to 18) or at 270° C. (Example 16), and the screw revolution rate was 300 rpm, thereby obtaining a polymer composition in the form of pellets. In each of these Examples, for preventing occurrence of a blocking of the below-mentioned sheet, erucic acid amide and microcrystalline wax were incorporated in the hydrogenated copolymer in amounts of 1% by weight and 0.4% by weight, respectively, based on the weight of the hydrogenated copolymer. In each of Examples 14 to 18 and Comparative Examples 13 to 19, the obtained polymer composition in the form of pellets was subjected to compression molding to produce a sheet (test specimen) having a thickness of 2 mm.

On the other hand, in Example 14, Comparative Example 13 and Comparative Example 19, polymer 1, polymer 4 and the above-mentioned PVC (a polyvinyl chloride elastomer) were respectively used and individually subjected to a compression molding at 200° C., thereby obtaining sheets (test specimens) having a thickness of 2 mm.

In Examples 14 to 18 and Comparative Examples 13 to 19, using the test specimens, the properties of the polymers or polymer compositions were measured and evaluated by the above-mentioned methods. The results are shown in Table 4.

As apparent from Table 4, the hydrogenated copolymer of the present invention, and a rubbery polymer composition comprising the hydrogenated copolymer exhibit excellent scratch resistance and abrasion resistance and, hence, can be advantageously used as a building material and an electric wire coating material.

Further, with respect to the rubbery polymer composition produced in Example 18, the dynamic viscoelastic spectrum thereof was measured in the torsional mode (frequency: 1 Hz) using an ARES dynamic analyzer (trade name: ARES-2KFRTN1-FCO-STD; manufactured and sold by Rheometric Scientific FE, Japan). The dynamic viscoelastic spectrum is shown in FIG. 1.

As apparent from FIG. 1, the peak of the tan δ of the dynamic viscoelastic spectrum of the rubbery polymer composition produced in Example 18 is around room temperature. This means that the composition exhibits an excellent vibration-proof property. Such composition exhibiting excellent vibration-proof property can be advantageously used as a vibration damping, soundproofing material and a building material.

temperature was 230° C. and the screw revolution rate was 300 rpm, thereby obtaining a rubbery polymer composition in the form of pellets. The obtained composition was subjected to substantially the same compression molding as in Example 14, thereby obtaining a test specimen having a thickness of 2 mm. Using the obtained test specimen, the properties of the composition were measured. The results are shown in Table 5.

TABLE 4

|  |  | Ex.14 | Ex.15 | Ex.16 | Ex.17 | Ex.18 | Comp. Ex.13 | Comp. Ex.14 | Comp. Ex.15 | Comp. Ex.16 | Comp. Ex.17 | Comp. Ex.18 | Comp. Ex.19 |
|---|---|---|---|---|---|---|---|---|---|---|---|---|---|
| Formulation (Part by weight) | | | | | | | | | | | | | |
| Hydrogenated polymer | Polymer 1 | 100 | 80 | 80 | 80 | 60 | — | — | — | — | — | — | — |
| | Polymer 4 | — | — | — | — | — | 100 | 80 | — | — | — | — | — |
| | Polymer 12 | — | — | — | — | — | — | — | 80 | 60 | — | — | — |
| | Polymer 13 | — | — | — | — | — | — | — | — | — | 80 | 60 | — |
| Component(1) | (1) PVC | — | — | — | — | — | — | — | — | — | — | — | 100 |
| Component(2) | (2)-1 PP | — | 20 | — | — | — | — | 20 | — | — | — | — | — |
| | (2)-2 PPE | — | — | 20 | — | — | — | — | — | — | — | — | — |
| Component(3) | (3) $Mg(OH)_2$ | — | — | — | 20 | 40 | — | — | 20 | 40 | 20 | 40 | — |
| Properties | | | | | | | | | | | | | |
| Hardness | | 71 | 87 | 85 | 71 | 73 | 59 | 76 | 36 | 38 | 85 | 86 | 66 |
| 100% stress ($kg/cm^2$) | | 59 | 100 | 105 | 42 | 40 | 27 | 51 | 6 | 6 | 38 | 36 | 47 |
| 200% stress ($kg/cm^2$) | | 75 | 104 | 169 | 56 | 48 | 28 | 58 | 7 | 7 | 41 | 37 | 69 |
| 300% stress ($kg/cm^2$) | | 88 | 108 | — | 74 | 59 | 31 | 64 | 8 | 7 | 46 | 40 | 90 |
| Tensile strength ($kg/cm^2$) | | 112 | 127 | 202 | 117 | 97 | 48 | 77 | 52 | 27 | 136 | 134 | 114 |
| Elongation at break (%) | | 470 | 490 | 290 | 450 | 470 | 950 | 690 | 1220 | 1480 | 840 | 910 | 400 |
| Dunlop impact resilience (%) | | 15 | 16 | 16 | 11 | 11 | 59 | 48 | 46 | 33 | 56 | 48 | 22 |
| Scratch resistance | | ⊚ | ○ | ⊚ | ⊚ | ⊚ | Δ | Δ | X | X | X | X | Δ |
| Abrasion resistance | | ○ | ○ | ⊚ | ⊚ | ⊚ | X | X | X | X | X | X | ○ |
| Appearance properties*[1] | | | | | | | | | | | | | |
| Occurrence of bleeding | | nd | nd | nd | Not observed | Not observed | nd | nd | Not observed | Not observed | Bleeding | Bleeding | nd |
| Transparency | | nd | nd | nd | Transparent | Transparent | nd | nd | White-opaque | White-opaque | White-opaque | White-opaque | nd |

*[1]Appearance properties were observed by visual observation.
nd: "nd" means that the measurement was not conducted.

Examples 19 to 21

In Examples 19 to 21, rubbery polymer compositions having formulations indicated in Table 5 were produced, using the following components:
SEBS: a hydrogenation product of a styrene/butadiene block copolymer (trade name: TUFTEC H1221; manufactured and sold by ASAHI KASEI CORPORATION, Japan);
SEPS: a hydrogenation product of a styrene/isoprene block copolymer (trade name: SEPTON S4055, manufactured and sold by Kuraray Co., Ltd., Japan); random PP: a random polypropylene (trade name: PC630A; manufactured and sold by Montell SDK Sunrise Ltd., Japan); and softening agent: a process oil (trade name: PW-90; manufactured and sold by Idemitsu Kosan Co., Ltd., Japan).

In each of Examples 19 to 21, the hydrogenated polymer, the rubbery polymer (SEBS or SEPS), the thermoplastic. resin (PP) and optionally the softening agent were, respectively, used in amounts as indicated in Table 5, and kneaded and extruded by means of a twin-screw extruder (trade name: PCM30; manufactured and sold by Ikegai Corporation, Japan) under conditions wherein the cylinder

TABLE 5

| | | Example 19 | Example 20 | Example 21 |
|---|---|---|---|---|
| Formulation (part by weight) | | | | |
| Hydrogenated polymer | Polymer 1 | 70 | 30 | 40 |
| Rubbery polymer | SEBS | 15 | 35 | — |
| | SEPS | — | — | 30 |
| Thermoplastic resin | Random PP | 15 | 35 | 20 |
| Softening agent | Process oil | — | — | 10 |
| Tensile properties | | | | |
| 100% modulus ($kg/cm^2$) | | 53 | 54 | 25 |
| Tensile strength ($kg/cm^2$) | | 140 | 140 | 60 |
| Elongation (%) | | 500 | 700 | 700 |

TABLE 5-continued

|  | Example 19 | Example 20 | Example 21 |
|---|---|---|---|
| Heating distortion |  |  |  |
| 120° C. distortion ratio (%) | 17 | 2 | 15 |
| 150° C. distortion ratio (%) | 58 | 31 | 50 |

IV. Flame Retardant Composition

In Example 22, a flame retardant resin composition was produced.

Example 22

Polymer 1 was used as a hydrogenated copolymer and magnesium hydroxide (trade name: KISUMA 5A; manufactured and sold by KYOWA CHEMICAL INDUSTRY Co., Ltd., Japan) was used as a flame retardant. Polymer 1 (40 parts by weight) and the magnesium hydroxide (60 parts by weight) were mixed together by means of a Henschel mixer. The resultant mixture was melt-kneaded and extruded by means of a twin-screw extruder (trade name: PCM30; manufactured and sold by Ikegai Corporation, Japan) under conditions wherein the cylinder temperature was 220° C. and the screw revolution rate was 250 rpm, thereby obtaining a flame retardant composition in the form of pellets. The obtained composition was subjected to compression molding to produce a sheet (test specimen) having a thickness of 2 mm.

Using the test specimen, the hardness, tensile properties (the tensile strength and the elongation at break) and abrasion resistance of the flame retardant composition were measured by the methods described in III-1), III-2) and III-5) above, respectively. Further, the flame retardancy of the flame retardant composition was evaluated in accordance with UL94. Specifically, from the test specimen was cut out a rectangular sample (127 mm×12.7 mm). The rectangular sample was subjected to a flame retardancy test in accordance with UL94, and the flame retardancy of the composition was evaluated by the criteria prescribed in UL94. The results are shown in Table 6.

TABLE 6

| | | Example 22 |
|---|---|---|
| Formulation (part by weight) | Hydrogenated copolymer: polymer 1 | 40 |
| | Flame retardant: Mg(OH)$_2$ | 60 |
| Properties | Hardness | 80 |
| | Tensile strength (kg/cm$^2$) | 72 |
| | Elongation at break (%) | 500 |
| | Abrasion resistance | ⊙ |
| | Flame retardancy | V-0 |

The flame retardant composition produced in Example 22 can be advantageously used as a building material or an electric wire coating material, wherein such a material is required to exhibit excellent flame retardancy.

V. Crosslinked Hydrogenated Copolymer

In Examples 23 and 24, crosslinked hydrogenated copolymers were produced.

The properties of the crosslinked hydrogenated copolymers were measured by the following methods.

V-1) Hardness

The hardness was measured by the method described in item III-1) above.

V-2) Tensile Properties (Tensile Strength and Elongation at Break)

The tensile properties were measured by the method described in item III-2) above.

V-3) Compression Set

A compression set test was conducted at 70° C. for 22 hours in accordance with JIS K 6262.

V-4) Flexing Resistance

A flex cracking test is conducted in accordance with JIS K 6260. Specifically, provided is a sample sheet obtained by molding the crosslinked hydrogenated copolymer, which has a length of 150 mm, a width of 25 mm and a thickness of 6.3 mm. In the sample sheet is made a recess having a radius of 2.38 mm. The sample sheet is flexed 100,000 times. After the 100,000 times' flexing of the sample sheet, the length (mm) of the crack having occurred in the sample sheet is measured. The above test is conducted at 23° C.

Examples 23 and 24

In each of Examples 23 and 24, a hydrogenated copolymer was dynamically crosslinked in the presence of an organic peroxide indicated in Table 7 as a crosslinking agent, thereby producing a crosslinked hydrogenated copolymer. Polymer 1 was used as the hydrogenated copolymer, and PERHEXYNE 25B (trade name, manufactured and sold by NOF CORPORATION, Japan) and PERHEXA 25B (trade name, manufactured and sold by NOF CORPORATION, Japan) were used as an organic peroxide. In each of Examples 23 and 24, the hydrogenated copolymer and the organic peroxide were mixed together, and the resultant mixture was melt-kneaded by means of a twin-screw extruder (trade name: PCM30; manufactured and sold by Ikegai Corporation, Japan) under conditions wherein the cylinder temperature was 220° C. (Example 23) or 210° C. (Example 24), and the screw revolution rate was 250 rpm, thereby obtaining a crosslinked hydrogenated copolymer in the form of pellets. The obtained crosslinked hydrogenated copolymer was subjected to compression molding to produce a sheet (test specimen) having a thickness of 2 mm. Separately, a sheet having a thickness of 6.3 mm was produced, which was used as a test specimen for a flex cracking test. Using these test specimens, the properties of the crosslinked hydrogenated copolymer were measured. The results are shown in Table 7.

TABLE 7

| | | | Example 23 | Example 24 |
|---|---|---|---|---|
| Formulation (part by weight) | Hydrogenated copolymer | Polymer 1 | 100 | 100 |
| | Organic peroxide | PERHEXYNE 25B | 2 | — |
| | | PERHEXA 25B | — | 2 |
| Properties | Hardness | | 58 | 60 |
| | Tensile strength (kg/cm$^2$) | | 124 | 139 |
| | Elongation at break (%) | | 440 | 410 |
| | Compression set (70° C.) (%) | | 65 | 70 |
| | Flex resistance (mm) | | 1.2 | 1.3 |

VI. Foam

In Examples 25 to 27, foams were produced using the following components.

Thermoplastic resin: HIPS (trade name: STYRON 475D; manufactured and sold by A&M STYRENE CO., LTD., Japan);

talc: MICRO ACE P-4 (trade name, manufactured and sold by NIPPON TALC CO., LTD., Japan);

crosslinking agent: a peroxide (trade name: PERCUMYL D; manufactured and sold by NOF CORPORATION, Japan);

auxiliary crosslinking agent: trimethylolpropane/trimethacrylate (trade name: San Ester TMP; manufactured and sold by SANSHIN CHEMICAL INDUSTRY, Japan);

foaming agent (1): a mixed butane (i.e., a mixture comprising of 65% by weight of n-butane and 35% by weight of isobutane); and foaming agent (2): azodicarbonamido (trade name: VINYFOR AC#3; manufactured and sold by Eiwa Chemical Ind. Co., LTD., Japan).

Example 25

A foamed sheet was produced using polymer 1 as a hydrogenated copolymer. Specifically, polymer 1 (100 parts by weight), talc (2 parts by weight) and zinc stearate (0.3 part by weight) were mixed together using a mixer. The resultant mixture was fed to a single-screw extruder (L/D= 30) and melt-kneaded at 230° C. To the extruder containing the resultant melt-kneaded mixture was fed the above-mentioned mixed butane (i.e., the foaming agent (1)) in an amount of 3% by weight, based on the weight of the hydrogenated copolymer, through an inlet for a foaming agent, which inlet was provided at a middle portion of the extruder. The resultant mixture was moved and cooled to 160° C. at a forward portion of the extruder. The resultant cooled mixture was extruded through the die, thereby obtaining a foamed sheet.

Example 26

A composition comprising 50 parts by weight of polymer 1 and 50 parts by weight of a thermoplastic resin (HIPS) (trade name: STYRON 475D; manufactured and sold by A&M STYRENE CO., LTD., Japan) was subjected to an extrusion molding in the presence of the above-mentioned mixed butane (i.e., the foaming agent (1)) in substantially the same manner as in Example 25, thereby producing a foamed sheet.

Example 27

A crosslinked foam was produced as follows. Polymer 1 (100 parts by weight), talc (10 parts by weight), the above-mentioned crosslinking agent (i.e., peroxide) (0.7 part by weight), the above-mentioned auxiliary crosslinking agent (i.e., trimethylolpropane/trimethacrylate) (0.3 part by weight), zinc oxide (1.5 parts by weight) stearic acid (0.5 part by weight), zinc stearate (0.5 part by weight) and the above-mentioned foaming agent (2) (i.e., azodicarbonamido) (2.5 parts by weight) were mixed together by means of a Banbury mixer and then by means of a roller mill. Then, the resultant mixture was subjected to compression molding to thereby obtain a sheet having a thickness of 12 mm. The sheet was heated at 160° C. for 14 minutes to cause the sheet to foam, thereby obtaining a crosslinked foam. The crosslinked foam had an expansion ratio of about 4 times, which was calculated from the density of the crosslinked foam.

VII. Multilayer Film

In Examples 28 to 31, multilayer films were produced using the following components.

EVA: ethylene/vinyl acetate copolymer (trade name: NUC-3753; manufactured and sold by Nippon Unicar Co., Ltd., Japan);

EVOH: ethylene/vinyl alcohol copolymer;

PP: polypropylene (trade name: F-226D; manufactured and sold by Grand Polymer Co., Ltd., Japan); and adhesive polyolefin: Admer NF500 (trade name, manufactured and sold by Mitsui Chemicals Inc., Japan).

Various properties of the multilayer films produced in Examples 28 to 31 were measured by the following methods.

VII-1) Tensile Properties

In accordance with JIS K 6251 (in which a dumbbell No. 1 is used), the tensile strength at break, the elongation at break and the modulus in tension were measured by means of a tensile tester (trade name: AGS-100D; manufactured and sold by Shimadzu Corporation, Japan) under conditions wherein the pulling rate was 500 mm/min.

VII-2) Elastic Recovery

The elastic recovery was measured by the following method. The multilayer film is stretched by 10% in a widthwise direction to obtain a stretched film. A stick having a tip with a curvature radius of 12.5 mm is thrust into the surface portion of the stretched film having a diameter of 45 mm, to thereby form a recess in the stretched film and then, taken out. The recess is recovered to a certain depth in one minute, and the depth is measured five times. The average value of depth is obtained and defined as "elastic recovery".

VII-3) Total Light Transmittance and Haze

By means of a turbidimeter (unit name: NDH-2000; manufactured and sold by Nippon Denshoku Kogyo Co., Ltd., Japan), the total light transmittance and the haze were measured with respect to a test specimen having a thickness of 2 mm in accordance with JIS K 7361-1.

VII-4) Heat Shrinking Ratio

The heat shrinking ratio was measured by the following method. A stretched film (100 mm×100 mm) (obtained by stretching the multilayer film) as a test sample is placed in an air oven type thermostatic vessel having an internal temperature of 80° C., and allowed to stand for 10 minutes to cause the film to shrink. The shrinkage of the stretched film is measured. The heat shrinking ratio of the stretched film is defined as a percentage of the shrinkage of the stretched film, based on the stretched film before the shrinkage thereof. In the case of a uniaxial stretching, the heat shrinking ratio in the stretching direction is measured. On the other hand, in the case of biaxial stretching, the heat shrinking ratio in each of the longitudinal direction and a direction perpendicular thereto is measured.

VII-5) Oxygen Permeability

The oxygen permeability was measured in accordance with the B-method (isotactic method) prescribed in JIS K 7126.

VII-6) Peel Strength (Index for Sealability)

A T-type peel strength test is conducted as follows. Two sample multilayer films of the same type are heat sealed at 120° C. so that the sealed portion has a width of 15 mm. Then, the unsealed portions of the two films are chucked, and a pulling test is conducted under conditions wherein the pulling rate is 300 mm/min. The strength required for peeling off the sealed portion is measured, and defined as the peel strength of the film.

Example 28

Using a three-layer film extrusion molding machine (i.e. an extrusion molding machine obtained by combining a T-die for three-layer films and a single-screw extruder), a three-layer film was produced. The produced three-layer film had a thickness of 30 μm and comprised a first layer of the above-mentioned EVA, a second layer of polymer 1 and a third layer of the EVA (i.e., the film had a EVA/polymer 1/EVA layer structure), wherein the EVA/polymer 1/EVA thickness ratio was 20/60/20.

The properties of the three-layer film were measured by the above-mentioned methods. The results are shown in Table 8.

TABLE 8

|  | Example 28 |
| --- | --- |
| Thickness (μm) | 30 |
| Tensile strength at break (MPa) | |
| MD | 72 |
| TD | 51 |
| Elongation at break (%) | |
| MD | 480 |
| TD | 500 |
| Modulus in tension | |
| MD | 75 |
| TD | 55 |
| Haze | 3.4 |
| Total light transmittance (%) | 96 |
| Elastic recovery (mm) | 15 |

Notes:
"MD" means the machine direction (direction of extrusion), and "TD" means the traverse direction (direction perpendicular to the machine direction).

Example 29

Using a five-layer film extrusion molding machine (i.e. an extrusion molding machine obtained by combining a T-die for five-layer films and a single-screw extruder), a five-layer film was produced by extrusion molding. The five-layer film had a thickness of 60 μm and comprised a first layer of polymer 1, a second layer of the above-mentioned adhesive polyolefin, a third layer of the above-mentioned EVOH, a fourth layer of the adhesive polyolefin and a fifth layer of polymer 1 (i.e., the film had a polymer 1/adhesive polyolefin/EVOH/adhesive polyolefin/polymer 1 layer structure, wherein the polymer 1/adhesive polyolefin/EVOH/adhesive polyolefin/polymer 1 layer thickness ratio was 35/7.5/15/7.5/35. In the extrusion molding, for suppressing the blocking of the film, eruic acid amide and monoglyceride stearate were incorporated into polymer 1 each in an amount of 1% by weight, based on the weight of polymer 1. The film had an excellent oxygen permeability of 0.62 cc/m²·24 hr·atm.

Example 30

In substantially the same manner as in Example 28, a three-layer film precursor (i.e. a film from which a final film is obtained by processing) was produced. The produced three-layer film precursor comprised a first layer of the above-mentioned EVA, a second layer of polymer 1 and a third layer of the above-mentioned PP (i.e., the film precursor had an EVA/polymer 1/PP layer structure), wherein the EVA/polymer 1/PP layer thickness ratio was 20/60/20. The obtained film precursor was stretched 3.2 times in a longitudinal direction and 2.8 times in a direction perpendicular thereto, wherein the stretching in the longitudinal direction was conducted simultaneously with the stretching in the direction perpendicular thereto, thereby obtaining a film (stretched film) having a thickness of about 60 μm. The obtained film had a satisfactory heat shrinking ratio. Specifically, the film had a heat shrinking ratio of 45% in the longitudinal direction and of 40% in the direction perpendicular thereto.

Example 31

In substantially the same manner as in Example 28, two two-layer films (first and second films) were produced. Each of the first and second films had a thickness of 30 μm, and comprised a first layer of the above-mentioned PP and a second layer of polymer 1 (i.e., each of the films had a PP/polymer 1 layer structure), wherein, in each of the films, the PP/polymer 1 layer thickness ratio was 50/50. The first film was laid upon the second film so that the polymer 1 layer of the first film and the polymer 1 layer of the second film were contacted with each other. Then, the polymer 1 layer of the first film and the polymer 1 layer of the second film were heat sealed at 120° C. and at a width of 15 mm. The heat sealed films were subjected to the peel strength test. As a result, it was found that the peel strength was 2 kg, which shows that polymer 1 has a satisfactory sealability.

VIII High Frequency Welding Composition

In Examples 32 to 34, high frequency welding compositions were produced. The properties of the produced compositions were measured by the following methods.

VIII-1) Dielectric Properties

Using a sheet (thickness: 0.5 mm) obtained by molding the high frequency welding composition, the dielectric constant, dielectric loss tangent and dielectric loss factor of the high frequency welding composition were measured at a frequency of 100 MHz in accordance with ASTM D 150.

VIII-2) Transparency

The transparency of a sheet (thickness: 0.5 mm) obtained by molding the high frequency welding composition was evaluated by visual observation.

Examples 32 to 34

In Examples 32 to 34, high frequency welding compositions having formulations indicated in Table 9 were produced, using the following components:

PP: polypropylene resin (trade name: PL500A; manufactured and sold by Montell SDK Sunrise Ltd., Japan);
PEG: polyethylene glycol; and
EVA: ethylene/vinyl acetate copolymer (trade name: NUC-3195; Nippon Unicar Co., Ltd., Japan).

As a hydrogenated copolymer, polymer 1 was used.

In each of Examples 32 to 34, the components indicated in Table 9 were melt-kneaded and extruded by means of a 30 mm φ twin-screw extruder (trade name: PCM30; manufactured and sold by Ikegai Corporation, Japan) under conditions wherein the cylinder temperature was 210° C. and the screw revolution rate was 200 rpm, thereby obtaining a high frequency welding composition in the form of pellets. The obtained composition in the form of pellets was subjected to a compression molding by means of a compression molding machine under conditions wherein the press temperature was 200° C. and the compressing pressure was 100 kg/cm², thereby obtaining a sheet having a thickness of 0.5 mm. Using the sheet, the properties of the high frequency welding composition were measured. The results are as shown in Table 9.

TABLE 9

| | Example 32 | Example 33 | Example 34 |
| --- | --- | --- | --- |
| Formulation (part by weight) | | | |
| Polymer 1 | 100 | 100 | 100 |
| PP | 100 | 100 | 125 |

TABLE 9-continued

|  | Example 32 | Example 33 | Example 34 |
|---|---|---|---|
| PEG | 6 | 12 | 8 |
| EVA | 0 | 0 | 25 |
| Dielectric properties |  |  |  |
| Dielectric constant | 2.9 | 3.0 | 3.0 |
| Dielectric loss tangent | 0.004 | 0.009 | 0.004 |
| Dielectric loss factor | 0.013 | 0.026 | 0.011 |
| Transparency | Transparent | Transparent | Transparent |

IX Slash Molding Material

In Examples 35 and 36, slash molding materials were produced.

The properties of the slash molding materials were measured by the following methods.

IX-1) Gelation Ratio

A sample of the crosslinked slash molding material is placed in a sample bottle in an amount of 5 mg (this weight is hereinafter referred to as $W_1$). To the bottle is added 50 ml of toluene. The resultant mixture in the bottle is heated at 120° C. for 12 hours by using an aluminum block bath, thereby effecting extraction. Then, the resultant mixture in the bottle is subjected to filtration using a stainless steel wire net to thereby obtain a filtration residue on the stainless steel wire net. The filtration residue is dried at 105° C. for five hours to obtain a dried residue. The dried residue is accurately weighed (this weight is hereinafter referred to as $W_2$). Using the $W_1$ and $W_2$ values, the gelation ratio of the crosslinked slash molding material is calculated by the following formula:

Gelation ratio (%) = $(W_2/W_1) \times 100$

IX-2) Average Particle Diameter of a Powder

With respect to a powder which was obtained by mechanically pulverizing pellets of a hydrogenated copolymer composition, the average particle diameter thereof was measured as follows. The powder is taken in an amount of 100 g, and shaken for 15 minutes using a sieve shaker equipped with a hammer (manufactured and sold by Iida Manufacturing Co., Ltd., Japan) to sieve the powder by means of five different types of standard sieves (first, second, third, fourth and fifth sieves) prescribed in JIS Z 8801 (having a frame diameter of 200 mm and a depth of 45 mm), wherein sieve sizes of the first, second, third, fourth and fifth sieves are, respectively, $X_1$, $X_2$, $X_3$, $X_4$ and $X_5$. Then, the weights of the powder remaining in the first, second, third, fourth and fifth sieves are measured (hereinafter, these weights are referred to as $Y_1$, $Y_2$, $Y_3$, $Y_4$ and $Y_5$, respectively). The average particle diameter of the powder is calculated using the values of $X_1$ to $X_5$ and $Y_1$ to $Y_5$ by the following formula:

$$\text{(Average particle diameter)} = \frac{Y_1 \times X_1 + Y_2 \times X_2 + Y_3 \times X_3 + Y_4 \times X_4 + Y_5 \times X_5}{(Y_1 + Y_2 + Y_3 + Y_4 + Y_5)}$$

wherein:

$X_1$ is 500 μm (Tyler Standard 32 mesh);
$X_2$ is 250 μm (Tyler Standard 60 mesh);
$X_3$ is 180 μm (Tyler Standard 80 mesh);
$X_4$ is 106 μm (Tyler Standard 150 mesh);
$X_5$ is 75 μm (Tyler Standard 200 mesh); and
$Y_1$, $Y_2$, $Y_3$, $Y_4$ and $Y_5$ are, respectively, the weights of the powder remaining in the above-mentioned first, second, third, fourth and fifth sieves.

IX-3) Powder Slash Moldability

Figure 2A:
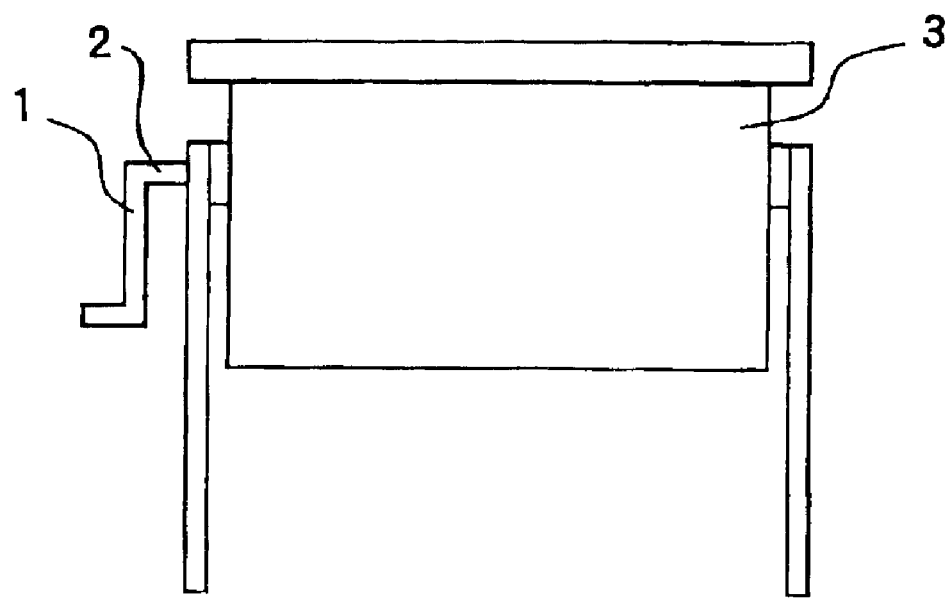
FIG. 2(*a*) is an explanatroy diagrammatic front view of a powder feeding box used in Examples 35 and 36 for conducting a slush molding.
Figure 2B:
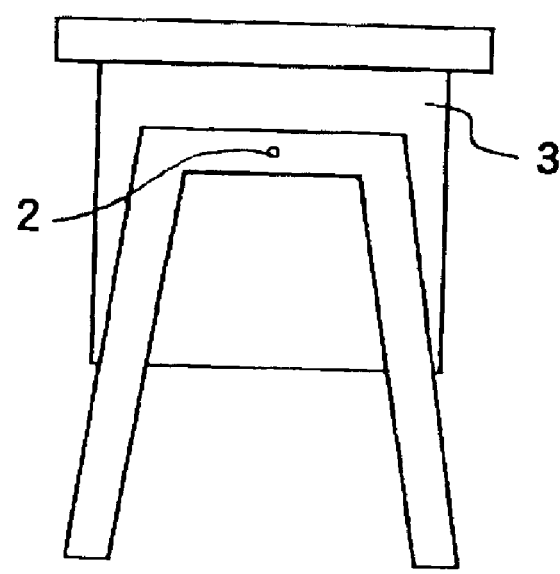
Figure 2C:
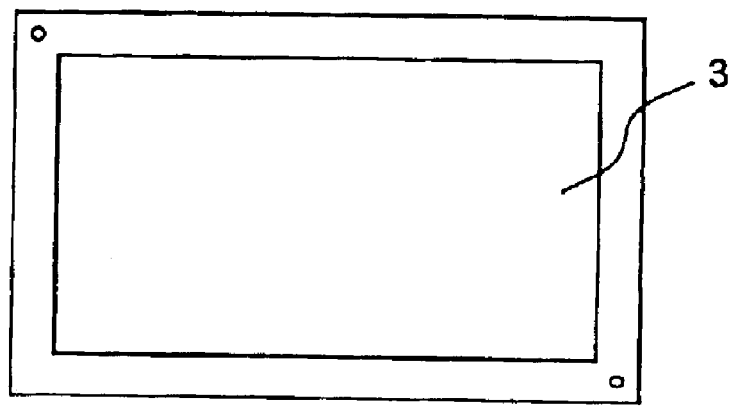
Figure 2D:
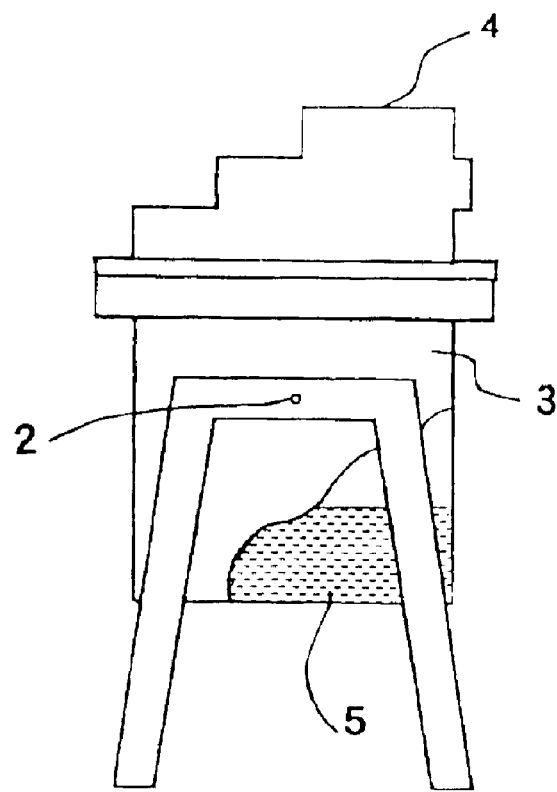
Figure 3:
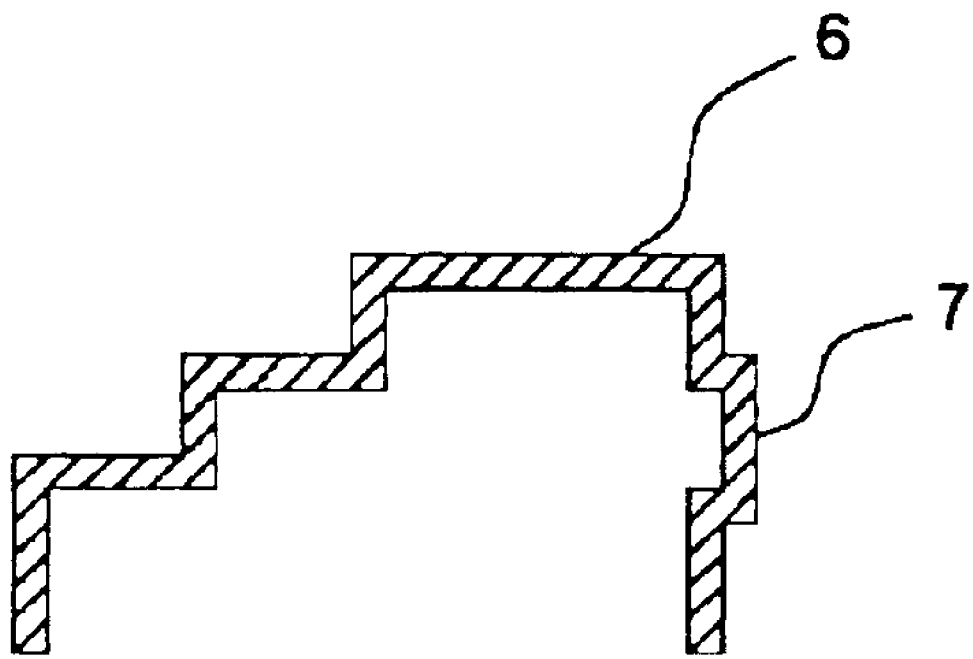
FIG. 3 is an explanatory diagramatic cross-sectional view of a powder slush molded article.

For evaluating the powder slash moldability of a hydrogenated copolymer composition, a powder slash molded article is produced, using a device shown in FIGS. 2(a) to 2(d). FIGS. 2(a) and 2(b) are explanatory diagrammatic front and side views of the below-mentioned powder feeding box. FIG. 2(c) is an explanatory diagrammatic view of the powder feeding box as viewed from above the powder feeding box. FIG. 2(d) is an explanatory diagrammatic view of the box, which contains a powder of a hydrogenated copolymer composition, and which has attached thereto an electroformed nickel mold (for slash molding) having a granulated inner surface. FIG. 3 is an explanatory diagrammatic cross-sectional view of a powder slash molded article.

The powder slash molded article is produced as follows.

A raw material powder (2 kg) of the hydrogenated copolymer composition (i.e., hydrogenated copolymer composition powder 5) for the powder slush molding is fed to box type container 3 made of stainless steel (hereinafter, this container is referred to as "powder feeding box 3"), which has a length of 300 mm, width of 300 mm and a depth of 200 mm, and is connected to a single-shaft rotational powder slush molding device equipped with single-shaft rotation handle 1. To the top of powder feeding box 3 is attached an electroformed nickel mold 4 by using a clamp, wherein the mold has an undercut portion (i.e., a portion functioning as a hitch in the direction of the opening and closing of the mold) and has been preheated to 230° C. (see FIG. 2(d)). By rotating single-shaft rotation handle 1 which is connected to and can rotate on revolution shaft 2 of the molding device, powder feeding box 3 and electroformed nickel mold 4 are caused to simultaneously rotate in a clockwise direction and in a counterclockwise direction alternately every five times, thereby introducing powder 5 into mold 4. Mold 4 is knocked two or three times using a wooden hammer or the like to remove an excess amount of powder 5 from mold 4. Then, mold 4 (which contains hydrogenated copolymer composition powder 5) is removed from powder feeding box 3, placed in a heating furnace and heated at 300° C. for 30 seconds, thereby melting hydrogenated copolymer composition powder 5 in mold 4. Mold 4 is cooled using water to thereby obtain shaped article 6 of the hydrogenated copolymer composition. The obtained shaped article 6 is taken out from mold 4 (see FIG. 3).

From the appearance of shaped article 6, the powder slash moldability of the hydrogenated copolymer composition is evaluated by the following criteria.

The Property of the Molded Article

◯: Molded article has no pinholes.

×: Molded article has a number of pinholes, and the interior surface of the molded article is rough.

IX-4) Heat Resistance Test

From the powder slash molded article obtained in item IX-3) above, a test sample (50 mm×50 mm) is cut out. The test sample is covered with three sheets of gauze, and the resultant is placed in an oven having a temperature of 115° C. and allowed to stand for 24 hours under a load of 40 mmφ×500 g. Then, the test sample is taken out from the oven, and the surface damage is examined to thereby evaluate the heat resistance by the following criteria.

Level of Damage

◯: The molded article has no trace of the gauze on its surface.

×: The molded article has a distinct trace of the gauze on its surface.

IX-5) Flexibility

A test sample (50 mm×50 mm) is cut out from the powder slash molded article obtained in item IX-3) above. The test sample is bent and folded, and the bent portion of the test sample is examined to thereby evaluate the flexibility by the following criteria.

○: The bent portion of the test sample is not whitened. marks.

×: The bent portion of the test sample is whitened.

Example 35

80 Parts by weight of the hydrogenated copolymer (polymer 1) and 20 parts by weight of a polypropylene (a crystalline polypropylene having an MFR of 50 g/min as measured at a 230° C.) (trade name: K7750; manufactured and sold by Chisso Corporation, Japan) were dry-blended. The resultant mixture was kneaded using a pressing kneader (DS3-7.5 MHH-E; manufactured and sold by Moriyama Manufacturing Co. Ltd., Japan), and the kneaded mixture was formed into a sheet using a roll, followed by pelletization. The resultant pellets were fed into a pulverizer (Turbo mill T-400; manufactured and sold by Turbo Kogyo Co., Ltd., Japan) together with liquid nitrogen, and subjected to freeze-pulverization, to thereby obtain a powder. The obtained powder was passed through a 32-mesh sieve. As a result, it was found that all (i.e., 100% by weight) of the powder passed through the 32-mesh sieve. The powder was subjected to slash molding, and the properties of the resultant slash molded article were evaluated. The obtained molded article had a weight of 260 g and a thickness of 1.1 mm, and had no pinholes. The obtained molded article had satisfactorily clear embossed patterns at an undercut portion (7 in FIG. 3) thereof as well as at a flat portion (6 in FIG. 3) thereof, and had excellent uniformity of thickness. The heat resistance of the molded article was excellent, since the molded article had no gauze trace. Further, the flexibility of the molded article was also excellent, since the bent portion of the molded article was not whitened. The results are shown in Table 10.

Example 36

80 Parts by weight of the hydrogenated copolymer (polymer 1), 20 parts by weight of an ethylene/vinyl acetate copolymer (which had an MFR of 20 g/10 min. as measured at a temperature of 190° C.) (trade name: Nipoflex 633; manufactured and sold by Tosoh Corporation, Japan) and 3.5 parts by weight of 2,5-dimethyl-2,5-di(t-butylperoxy) hexyne-3 (trade name: PERHEXYNE 25B-40; manufactured and sold by Nippon Oil and Fats Co. Ltd., Japan) as the organic peroxide were dry-blended. The resultant mixture was kneaded using a pressing kneader (trade name: DS3-7.5 MHH-E; manufactured and sold by Moriyama Manufacturing Co. Ltd., Japan), and the kneaded mixture was formed into a sheet using a roll, followed by pelletization to obtain pellets of a crosslinked composition. The crosslinked composition had a gel content of 88%. The resultant pellets were fed into a pulverizer (Turbo mill T-400; manufactured and sold by Turbo Kogyo Co., Ltd., Japan) together with liquid nitrogen, and subjected to freeze-pulverization, to thereby obtain a powder. The obtained powder was passed through a 32-mesh sieve. As a result, it was found that all (i.e., 100% by weight) of the powder passed through the 32-mesh sieve. The powder was subjected to slash molding, and the properties of the resultant slash molded article were evaluated. The obtained molded article had a weight of 260 g and a thickness of 1.1 mm, and had no pinholes. The obtained molded article had satisfactorily clear embossed patterns at an undercut portion (7 in FIG. 3) thereof as well as at a flat portion (6 in FIG. 3) thereof, and had excellent uniformity of thickness. The heat resistance of the molded article was excellent, since the molded article had no gauze trace. Further, the flexibility of the molded article was also excellent, since the bent portion of the molded article was not whitened. The results are shown in Table 10.

TABLE 10

| Evaluation items | Example 35 | Example 36 |
| --- | --- | --- |
| Average diameter (μm) of the powder | 160 | 165 |
| Powder moldability | ○ | ○ |
| Heat resistance | ○ | ○ |
| Flexibility | ○ | ○ |

X. Adhesive Composition

In Example 37, an adhesive composition was produced.

Properties of the adhesive composition were measured by the following methods.

X-1) Melt Viscosity (cP)

The melt viscosity of the adhesive composition was measured at 180° C. by means of a Brookfield viscometer.

X-2) Softening Point (Ring-and-Ball Method)

The softening point of the adhesive composition was measured in accordance with JIS K 2207. Specifically, the ring of a ring-and-ball apparatus as defined in JIS K 2207 (which comprises a ring, and a ring-supporting member having a bottom plate placed several centimeters below the ring) is filled with a sample of the adhesive composition so as to have the sample adhesive composition securely held in the hole of the ring. The ring-and-ball apparatus is immersed in water, and the ring is maintained level in water. Then, a ball having a weight of 3.5 g is placed at the center of the ring filled with the sample. The temperature of the water is elevated at a rate of 5° C./min, so as to soften the sample gradually. The central portion of the softening sample is gradually sagged under the weight of the ball, and the temperature (softening point) at which the sagged central portion of the sample reaches the bottom plate is measured.

X-3) Melt Viscosity Change Ratio

The melt viscosity change ratio is measured by means of a Brookfield viscometer. The melt viscosity of the adhesive composition just after kneading at 180° C. is defined as $\eta_0$ and the melt viscosity of the adhesive composition which has been allowed to stand still at 180° C. for 48 hours is defined as $\eta_1$. The melt viscosity change ratio is calculated by the formula below and used as a yardstick for heat stability.

$$\text{Melt viscosity change ratio } (\%) = \{(\eta_1 - \eta_0)/\eta_0\} \times 100.$$

X-4) Adhesiveness

The adhesive composition in a molten state is coated on a polyester film by means of an applicator, thereby forming an adhesive tape sample having a thickness of 50 μm. The adhesive tape sample having a width of 25 mm is attached to a stainless board and, then, peeled therefrom at a peeling rate of 300 mm/min to measure a peel strength (peel angle: 180°).

Example 37

Polymer 1 was used as a hydrogenated copolymer, clearon P-105 (trade name, manufactured and sold by YASUHARA CHEMICAL CO., LTD., Japan) was used as a adhesive property imparting agent., and Diana process oil PW-90 (trade name, manufactured and sold by Idemitsu Kosan Co., Ltd., Japan) was used as a softening agent. Polymer 1 (100 parts by weight), the adhesive property imparting agent (300 parts by weight) and the softening agent (100 parts by weight) were melt-kneaded at 180° C. for 2 hours by means of a vessel which has a volume of 1 liter and is equipped with a stirrer, thereby obtaining a hot-melt type adhesive composition. To the adhesive composition was added, as a stabilizer, 2-t-butyl-6-(3-t-butyl-2-hydroxy-5-methylbenzyl)-4-methylphenylacrylate in an amount of 1 part by weight, relative to 100 parts by weight of polymer 1.

With respect to the adhesive composition, the melt viscosity at 180° C. was 10,500, the softening point was 116° C., the melt viscosity change ratio (%) was 9.5% and the adhesion strength was 1,400 gf/10 mm.

XI. Asphalt Composition

In Example 38 and Comparative Example 20, asphalt compositions were produced.

The properties of the asphalt compositions were measured by the following methods.

XI-1) Softening Point

The softening point was measured in substantially the same manner as in item X-2) above, except that glycerol was used instead of water.

XI-2) Elongation

The elongation of an asphalt composition was measured in accordance with JIS K 2207. Specifically, a sample of the asphalt composition is poured into a mold to shape the sample in a prescribed form. Then, the shaped sample is placed in a thermostatic vessel and the temperature of the sample is maintained at 15° C. The resultant sample is pulled at a rate of 5 cm/min, and the elongation of the sample when the sample is broken was measured.

XI-3) High Temperature Storage Stability

An aluminum can having an internal diameter of 50 mm and a height of 130 mm is fully filled with an asphalt composition just after the production thereof. The aluminum can containing the asphalt composition is placed in an oven and heated at 180° C. for 24 hours. The aluminum can is taken out from the oven and allowed to stand so that the asphalt composition in the aluminum can cools to room temperature. As samples, upper and lower portions of the resultant solidified asphalt composition, which are a 4 cm-thick lower layer at a lower end portion and a 4 cm-thick upper layer at an upper end portion, are taken by cutting. The softening points of both the samples are measured. The difference in softening point between the samples is used as a yardstick for high temperature storage stability of the asphalt composition. The smaller the difference, the better the high temperature storage stability of the asphalt composition.

Example 38 and Comparative Example 20

In Example 38 and Comparative Example 20, asphalt compositions having formulations indicated in Table 11 were produced.

Specifically, in each of Example 38 and Comparative Example 20, 400 g of straight asphalt 60-80 (manufactured and sold by NIPPON OIL COMPANY, LIMITED, Japan) was fed to a metal can having a volume of 750 ml. The metal can containing the straight asphalt was put into an oil bath having a temperature of 180° C. so that the straight asphalt was satisfactorily heated, thereby melting the asphalt. Then, to the resultant molten asphalt was added a prescribed amount of the hydrogenated copolymer bit by bit while stirring. After completion of addition of the hydrogenated copolymer, the resultant mixture was stirred at a revolution rate of 5,000 rpm for 90 minutes, thereby obtaining an asphalt composition.

The properties of the asphalt composition are shown in Table 11.

TABLE 11

| | Block copolymer | Amount | | | High temperature storage |
|---|---|---|---|---|---|
| | Type | Amount (part by weight) | of asphalt (part by weight) | Softening point (° C.) | Elongation (cm) | stability (difference in softening point) (° C.) |
| Ex.38 | Polymer 1 | 8.5 | 100 | 83 | 30 | 3 |
| Comp. Ex.20 | Polymer 14 | 8.5 | 100 | 76 | 5 | 3 |

As apparent from Table 11, the asphalt composition of the present invention (which was produced in Example 38) exhibited an excellent balance of the softening point, the elongation and the high temperature storage stability. On the other hand, the elongation of the asphalt composition produced in Comparative Example 20 was extremely low.

INDUSTRIAL APPLICABILITY

The hydrogenated copolymer of the present invention not only has excellent flexibility, impact resilience and scratch resistance, but also has excellent handling property (antiblocking property). Further, the hydrogenated copolymer composition obtained by blending the above-mentioned hydrogenated copolymer with a thermoplastic resin other than the hydrogenated copolymer and/or a rubbery polymer other than the hydrogenated copolymer has excellent properties such as high impact resistance, tensile strength and moldability. By virtue of these excellent properties, the hydrogenated copolymer, the hydrogenated copolymer composition and crosslinked products thereof can be advantageously used as a reinforcing filler-containing composition, a foam, a multilayer film or multilayer sheet, a building material, a vibration damping, soundproofing material, an electric wire coating material, a high frequency welding composition, a slush molding material, an adhesive composition, an asphalt composition and the like. Also, various shaped articles obtained by subjecting the hydrogenated copolymer, the hydrogenated copolymer composition or the above-mentioned materials to injection molding, extrusion molding or the like can be advantageously used as a material for parts of automobiles (automobile interior and exterior parts), various containers (such as food packaging), household electrical appliances, medical appliances, industrial components, toys and the like.

What is claimed is:

1. A hydrogenated copolymer obtained by hydrogenating an unhydrogenated copolymer comprising conjugated diene monomer units and vinyl aromatic monomer units, said unhydrogenated copolymer having at least one polymer block (H) of vinyl aromatic monomer units, said hydrogenated copolymer having the following characteristics (1) to (5):

(1) a content of said vinyl aromatic monomer units of from more than 60% by weight to less than 90% by weight, based on the weight of said hydrogenated copolymer, (2) a content of said polymer block (H) of from 1 to 40% by weight, based on the weight of said unhydrogenated copolymer, (3) a weight average molecular weight of from more than 100,000 to 1,000,000, (4) a hydrogenation ratio of 85% or more, as measured with respect to the double bonds in said conjugated diene monomer units, and (5) substantially no crystallization peak observed at −50 to 100° C. in a differential scanning calorimetry (DSC) chart obtained with respect to said hydrogenated copolymer.

2. The hydrogenated copolymer according to claim 1, wherein said unhydrogenated copolymer is a block copolymer selected from the group consisting of block copolymers which are, respectively, represented by the following formulae:

$$S-H \quad (1),$$

$$S-H-S \quad (2),$$

$$(S-H)_m-X \quad (3) \text{ and}$$

$$(S-H)_n-X-(H)_p \quad (4),$$

wherein each S independently represents a random copolymer block comprised of said conjugated diene monomer units and said vinyl aromatic monomer units, each H independently represents a polymer block of vinyl aromatic monomer units, each X independently represents a residue of a coupling agent, m represents an integer of 2 or more, and each of n and p independently represents an integer of 1 or more.

3. The hydrogenated copolymer according to claim 2, wherein said unhydrogenated copolymer is a block copolymer represented by said formula (1).

4. The hydrogenated copolymer according to any one of claims 1 to 3, which is a foam.

5. The hydrogenated copolymer according to any one of claims 1 to 3, which is a shaped article.

6. The hydrogenated copolymer according to claim 5, which is a multilayer film or a multilayer sheet.

7. The hydrogenated copolymer according to claim 5, which is a shaped article produced by a method selected from the group consisting of an extrusion molding, an injection molding, a blow molding, air-pressure molding, a vacuum molding, a foam molding, a multilayer extrusion molding, a multilayer injection molding, a high frequency weld molding and a slush molding.

8. The hydrogenated copolymer according to any one of claims 1 to 3, which is a building material, a vibration damping, soundproofing material or an electric wire coating material.

9. A crosslinked hydrogenated copolymer obtained by subjecting the hydrogenated copolymer of any one of claims 1 to 3 to a crosslinking reaction in the presence of a vulcanizing agent.

10. A hydrogenated copolymer composition comprising:
   1 to 99 parts by weight of the hydrogenated copolymer (a) of claim 1, and
   99 to 1 part by weight of at least one polymer (b) selected from the group consisting of a thermoplastic resin other than the hydrogenated copolymer (a) and a rubbery polymer other than the hydrogenated copolymer (a).

11. The hydrogenated copolymer composition according to claim 10, which is a foam.

12. The hydrogenated copolymer composition according to claim 10, which is a shaped article.

13. The hydrogenated copolymer composition according to claim 12, which is a multilayer film or a multilayer sheet.

14. The hydrogenated copolymer composition according to claim 12, which is a shaped article produced by a method selected from the group consisting of an extrusion molding, an injection molding, a blow molding, air-pressure molding, a vacuum molding, a foam molding, a multilayer extrusion molding, a multilayer injection molding, a high frequency weld molding and a slush molding.

15. The hydrogenated copolymer composition according to claim 10, which is a building material, a vibration damping, soundproofing material or an electric wire coating material.

16. A crosslinked hydrogenated copolymer composition obtained by subjecting the hydrogenated copolymer composition of claim 10 to a crosslinking reaction in the presence of a vulcanizing agent.

* * * * *